United States Patent [19]

Nakajima et al.

[11] Patent Number: 5,650,861
[45] Date of Patent: Jul. 22, 1997

[54] IMAGE PROCESSING METHOD AND APPARATUS FOR APPLICATION TO AN IMAGE FILE OR IMAGE COMMUNICATION APPARATUS

[75] Inventors: Toshifumi Nakajima, Tokyo; Yasunori Hashimoto, Yokohama; Yasuyuki Nakamura, Kamakura, all of Japan

[73] Assignee: Canon Kabushiki Kaisha, Tokyo, Japan

[21] Appl. No.: 252,169

[22] Filed: May 31, 1994

[30] Foreign Application Priority Data

| May 31, 1993 | [JP] | Japan | 5-129585 |
| Jun. 25, 1993 | [JP] | Japan | 5-154904 |
| Aug. 31, 1993 | [JP] | Japan | 5-215640 |
| Aug. 31, 1993 | [JP] | Japan | 5-215642 |

[51] Int. Cl.$^6$ .................................................. H04N 1/415
[52] U.S. Cl. .......................... 358/433; 358/426; 358/462; 382/239
[58] Field of Search .................................. 358/433, 426, 358/461, 462, 464; 382/239, 250; H04N 1/415

[56] References Cited

U.S. PATENT DOCUMENTS

| 3,215,773 | 11/1965 | Chatten et al. . | |
| 3,483,317 | 12/1969 | De Groat . | |
| 3,992,572 | 11/1976 | Nakagome | 358/433 |
| 4,225,885 | 9/1980 | Lux et al. | 340/146.3 |
| 4,394,774 | 7/1983 | Widergren et al. | 382/56 |
| 4,546,385 | 10/1985 | Anastassiou | 358/133 |
| 4,772,956 | 9/1988 | Roche et al. . | |
| 4,920,426 | 4/1990 | Hatori et al. | 358/433 |
| 4,969,040 | 11/1990 | Gharavi | 358/136 |
| 5,040,233 | 8/1991 | Davey et al. | 382/56 |
| 5,047,852 | 9/1991 | Hanyu et al. | 358/133 |
| 5,063,608 | 11/1991 | Siegel | 382/56 |
| 5,073,820 | 12/1991 | Nakagawa et al. | 358/133 |
| 5,073,821 | 12/1991 | Juri | 358/133 |

(List continued on next page.)

FOREIGN PATENT DOCUMENTS

| 0469852 | 2/1992 | European Pat. Off. . | |
| 0487282 | 5/1992 | European Pat. Off. . | |
| 0510933 | 10/1992 | European Pat. Off. | H04N 1/41 |
| 62-075773 | 4/1987 | Japan . | |
| 2122763 | 5/1990 | Japan . | |
| 3276263 | 12/1991 | Japan . | |
| 2102240 | 1/1983 | United Kingdom . | |
| 2259824 | 3/1993 | United Kingdom . | |

OTHER PUBLICATIONS

ICASSP-89: 1989 International Conference on Acoustics, Speech and Signal Processing, Glasgow, UK, May 23-26, 1989, 1671-1674, vol. 3.
Saito et al., "Self-organizing pattern-matching coding for picture signals" p. 1962, left col., lines 2-33, Fig. 1.
Proceedings of the I.R.E., vol. 40, No. 9, Sep. 1952, pp. 1098-1101 Huffman D.A., "A method for the construction of Minimum-Redundancy Codes".
IEEE 1992 International Conference on Consumer Electronics, Digest of Technical Papers, ICCE, 2-4 Jun., 1992, Rosemont, Illinois (US); IEEE, 1992, pp. 386-387; K. Ogawa et al., "A Single Chip Compression Decompression LSI Based on JPEG".

*Primary Examiner*—Kim Vu
*Attorney, Agent, or Firm*—Fitzpatrick, Cella, Harper & Scinto

[57] ABSTRACT

A color image processing apparatus and method through which it is possible to realize high-speed encoding processing of image data containing data indicative of blank spaces. When encoding processing is executed, a CPU sets data, which is added on as a blank space or margin, in a blank-value setting memory, and a DSP for encoding processing reads in the set value before the start of encoding processing, effects a transformation of the color space to undergo encoding processing, and stores the resulting data in its own internal memory, whereby the data stored in the internal memory is used in encoding of blank areas to make possible high-speed encoding processing.

8 Claims, 41 Drawing Sheets

U.S. PATENT DOCUMENTS

| | | | |
|---|---|---|---|
| 5,086,439 | 2/1992 | Asai et al. | 375/122 |
| 5,086,488 | 2/1992 | Kato et al. | 382/56 |
| 5,101,280 | 3/1992 | Moronaga et al. | 358/426 |
| 5,109,451 | 4/1992 | Aono et al. | 382/56 |
| 5,148,271 | 9/1992 | Kato et al. | 358/133 |
| 5,162,923 | 11/1992 | Yoshida et al. | 358/433 |
| 5,204,756 | 4/1993 | Chevion et al. | 358/426 |
| 5,216,518 | 6/1993 | Yamagami | 358/426 |
| 5,243,420 | 9/1993 | Hibi | 358/136 |
| 5,249,053 | 9/1993 | Jain | 358/209 |
| 5,249,066 | 9/1993 | Fukuda et al. | 358/433 |
| 5,253,075 | 10/1993 | Sugiyama | 358/261.2 |
| 5,301,040 | 4/1994 | Hoshi et al. | 358/465 |
| 5,307,163 | 4/1994 | Hatano et al. | 348/415 |
| 5,309,525 | 5/1994 | Shimomura et al. | 382/50 |
| 5,367,629 | 11/1994 | Chu | 395/162 |
| 5,379,070 | 1/1995 | Retter | 348/403 |
| 5,416,603 | 5/1995 | Suzuki et al. | 358/433 |
| 5,517,327 | 5/1996 | Nakatani et al. | 358/462 |
| 5,588,075 | 12/1996 | Chiba et al. | 358/433 |

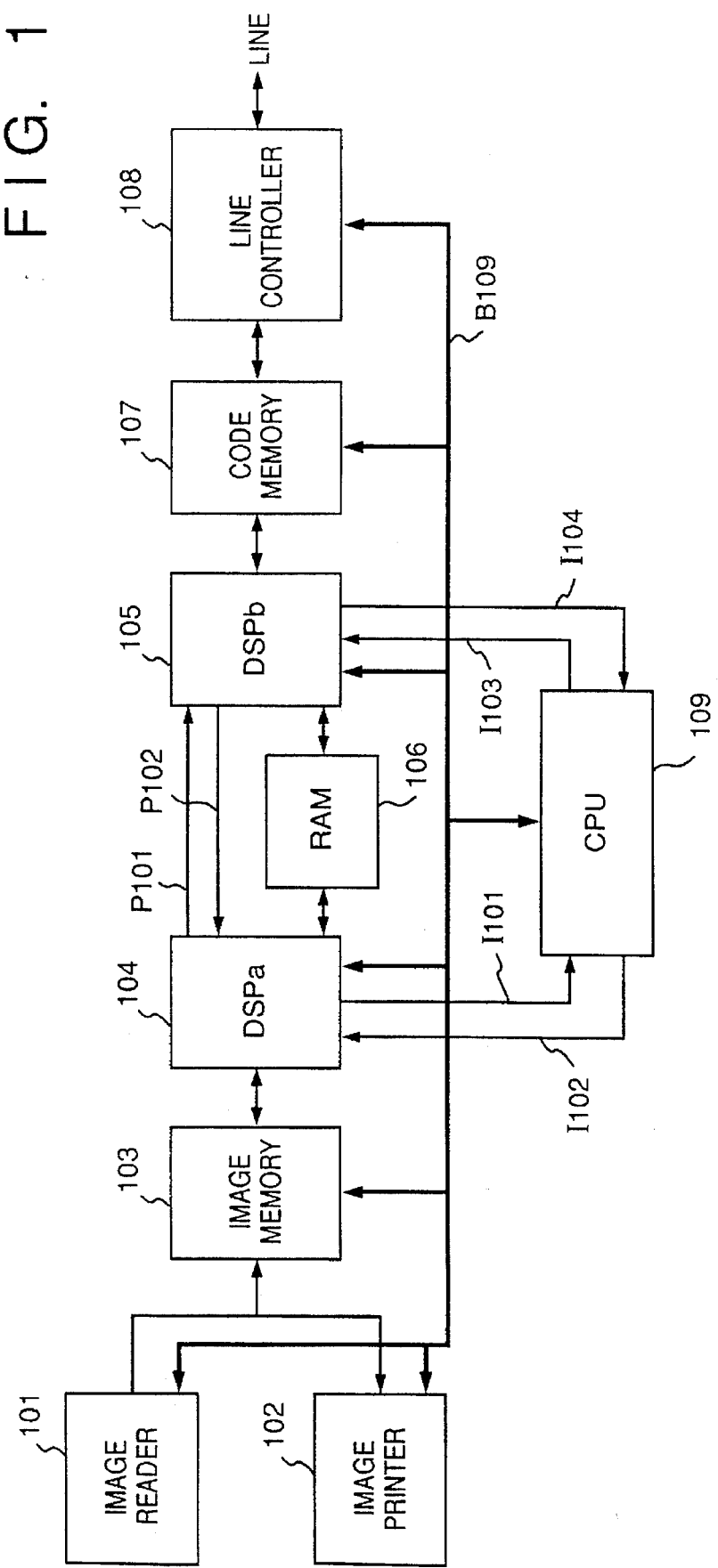

FIG. 4A

| | a | b | c | d | e | f | g | h |
|---|---|---|---|---|---|---|---|---|
| 0 | 16 | 11 | 10 | 16 | 24 | 40 | 51 | 61 |
| 1 | 12 | 12 | 14 | 19 | 26 | 58 | 60 | 55 |
| 2 | 14 | 13 | 16 | 24 | 40 | 57 | 69 | 56 |
| 3 | 14 | 17 | 22 | 29 | 51 | 87 | 80 | 62 |
| 4 | 18 | 22 | 37 | 58 | 68 | 109 | 103 | 77 |
| 5 | 24 | 35 | 55 | 64 | 81 | 104 | 113 | 92 |
| 6 | 49 | 64 | 78 | 87 | 103 | 121 | 120 | 101 |
| 7 | 72 | 92 | 95 | 98 | 112 | 100 | 103 | 99 |

FIG. 4B

| | a | b | c | d | e | f | g | h |
|---|---|---|---|---|---|---|---|---|
| 0 | 17 | 18 | 24 | 47 | 99 | 99 | 99 | 99 |
| 1 | 18 | 21 | 26 | 66 | 99 | 99 | 99 | 99 |
| 2 | 24 | 26 | 56 | 99 | 99 | 99 | 99 | 99 |
| 3 | 47 | 66 | 99 | 99 | 99 | 99 | 99 | 99 |
| 4 | 99 | 99 | 99 | 99 | 99 | 99 | 99 | 99 |
| 5 | 99 | 99 | 99 | 99 | 99 | 99 | 99 | 99 |
| 6 | 99 | 99 | 99 | 99 | 99 | 99 | 99 | 99 |
| 7 | 99 | 99 | 99 | 99 | 99 | 99 | 99 | 99 |

FIG. 5

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 6

| SSSS GROUP NO. | DC DIFFERENCE | NUMBER OF ADD-ON BITS |
|---|---|---|
| 0 | 0 | 0 |
| 1 | -1, 1 | 1 |
| 2 | -3, -2, 2, 3 | 2 |
| 3 | -7...-4, 4...7 | 3 |
| 4 | -15...-8, 8...15 | 4 |
| 5 | -31...-16, 16...31 | 5 |
| 6 | -63...-32, 32...63 | 6 |
| 7 | -127...-64, 64...127 | 7 |
| 8 | -255...-128, 128...255 | 8 |
| 9 | -511...-256, 256...511 | 9 |
| 10 | -1023...-512, 512...1023 | 10 |
| 11 | -2047...-1024, 1024...2047 | 11 |

FIG. 7

| SSSS GROUP NO. | AC COEFFICIENTS | NUMBER OF ADD-ON BITS |
|---|---|---|
| 1 | -1, 1 | 1 |
| 2 | -3, -2, 2, 3 | 2 |
| 3 | -7..-4, 4..7 | 3 |
| 4 | -15..-8, 8..15 | 4 |
| 5 | -31..-16, 16..31 | 5 |
| 6 | -63..-32, 32..63 | 6 |
| 7 | -127..-64, 64..127 | 7 |
| 8 | -255..-128, 128..255 | 8 |
| 9 | -511..-256, 256..511 | 9 |
| 10 | -1023..-512, 512..1023 | 10 |

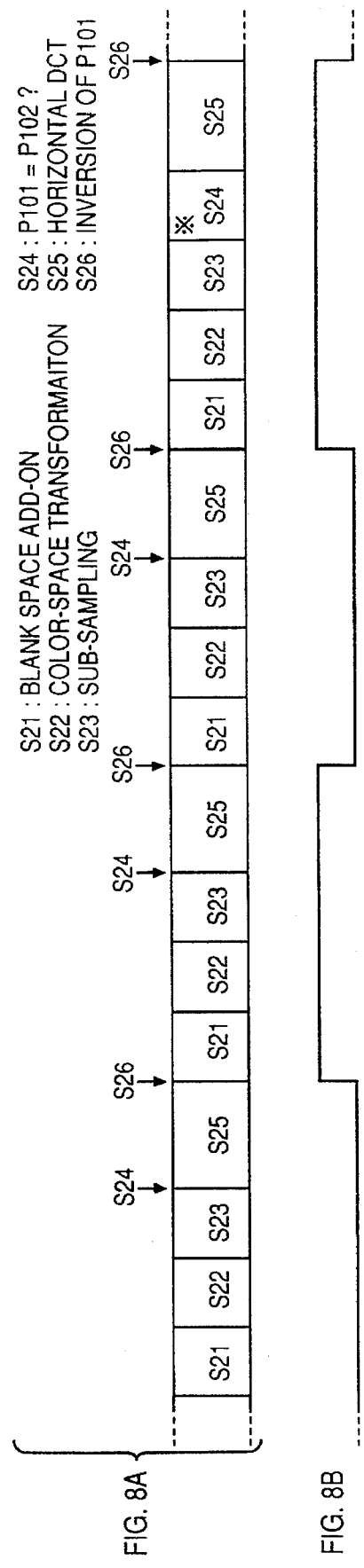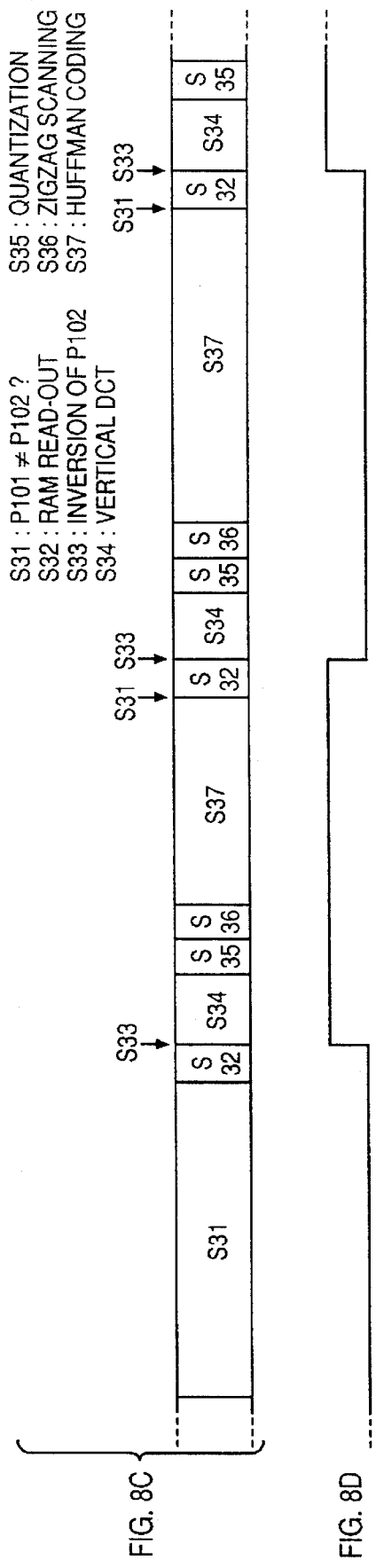

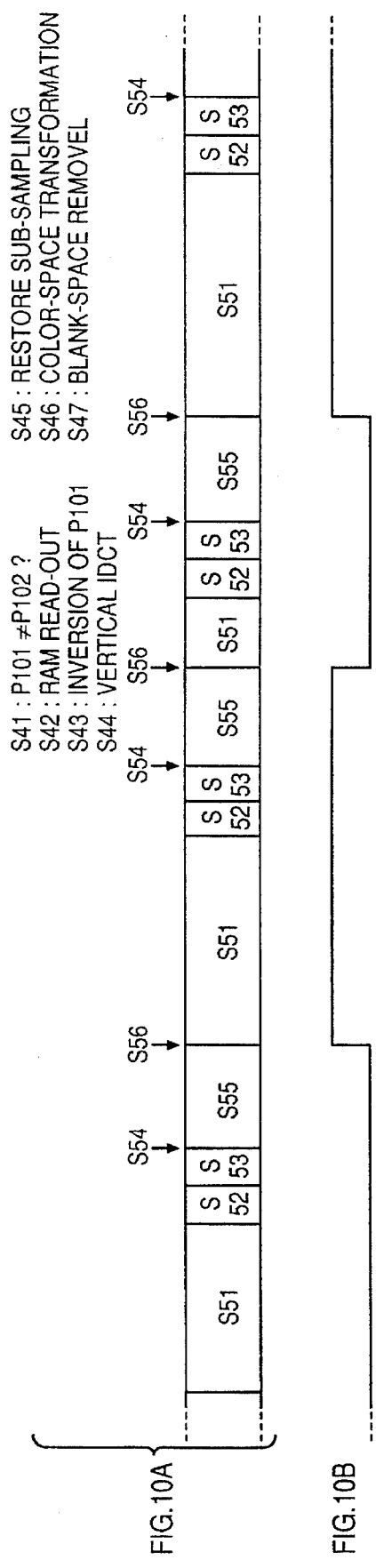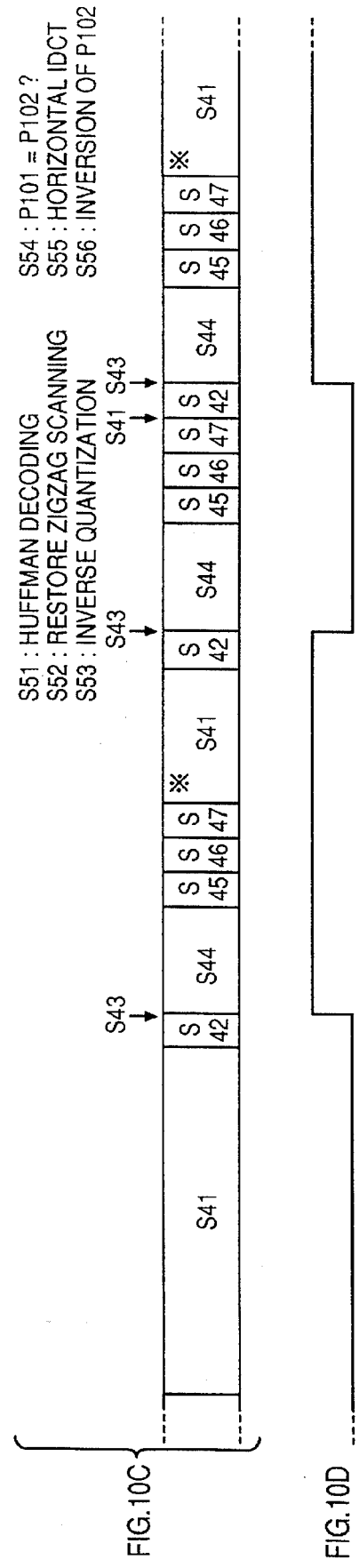

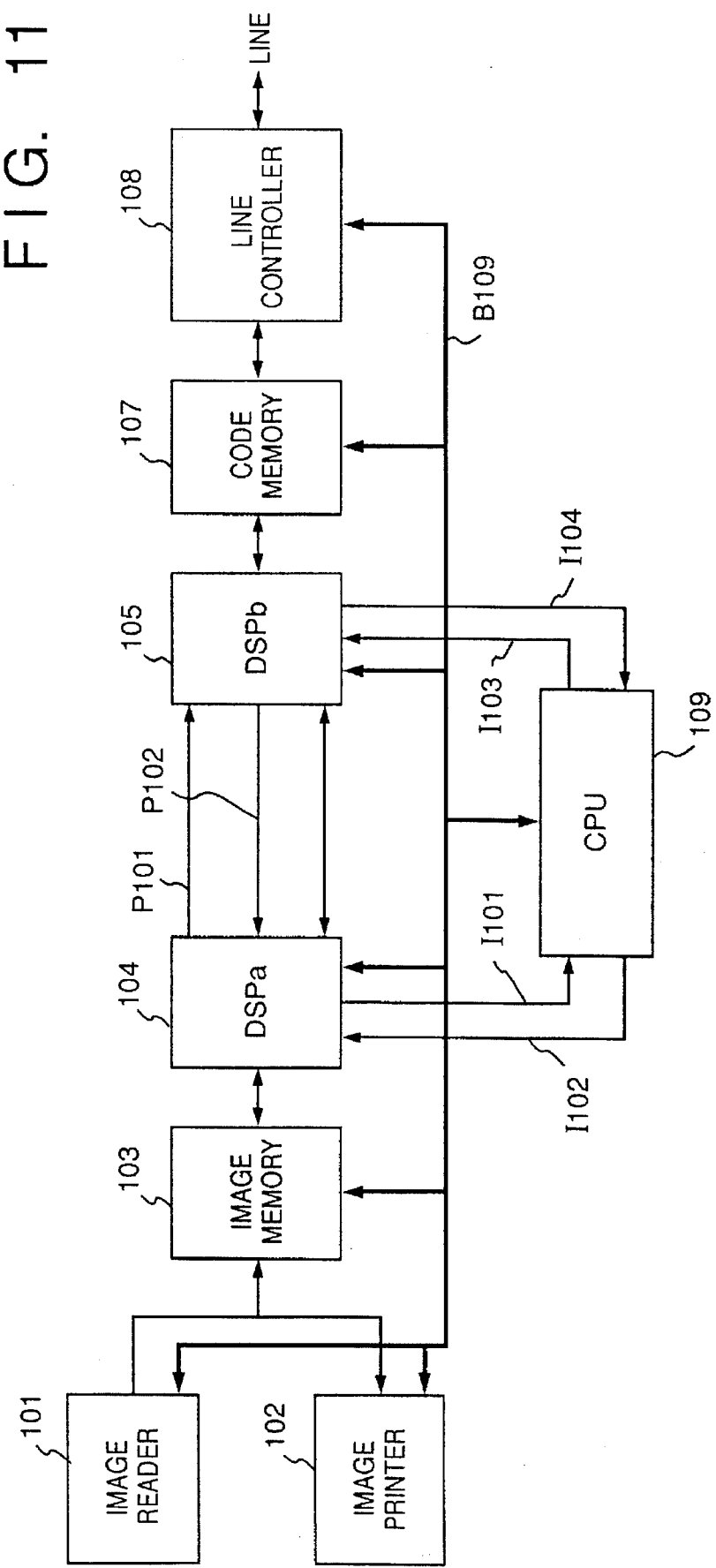

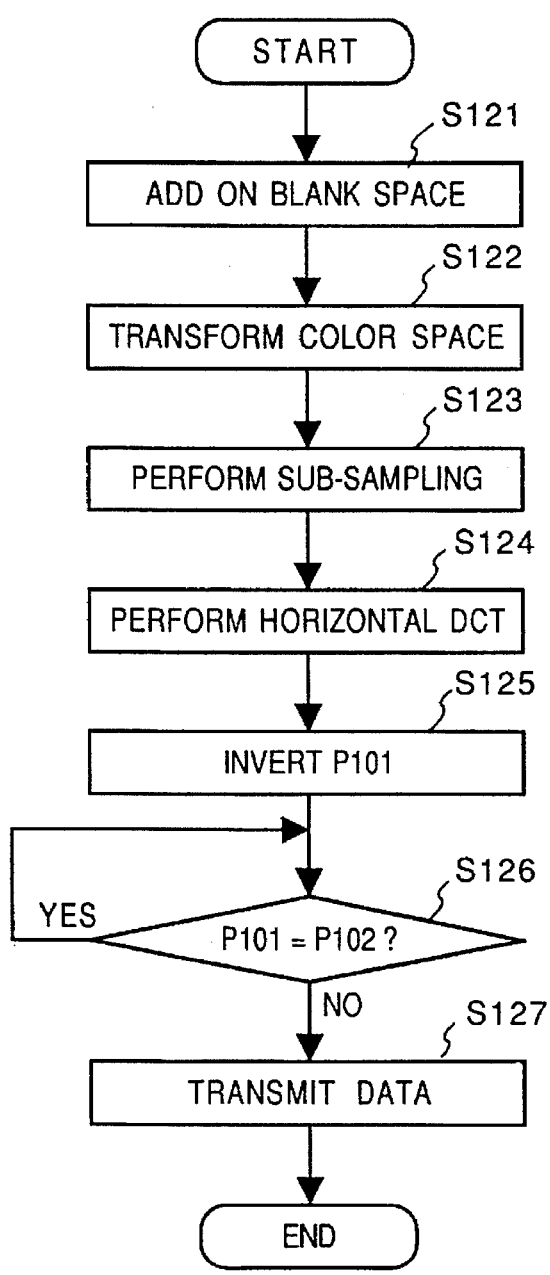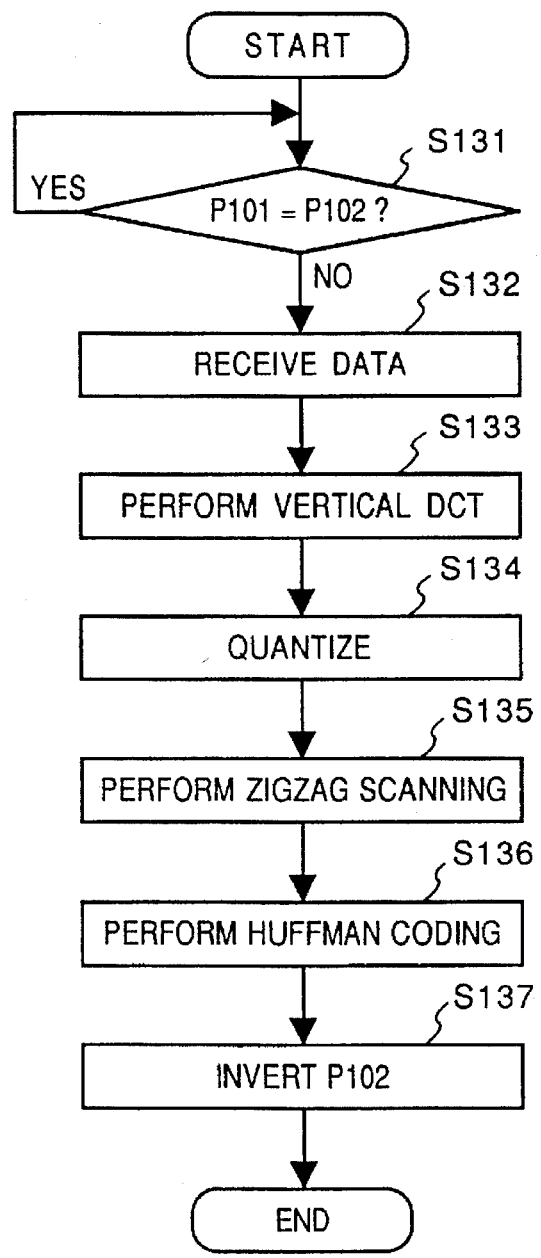
FIG. 12A
FIG. 12B

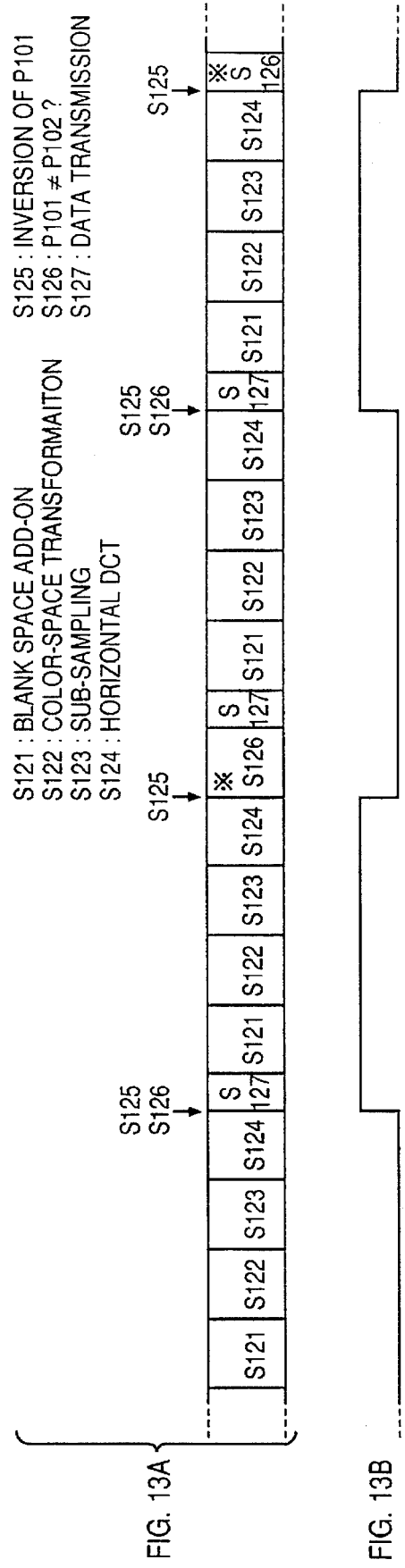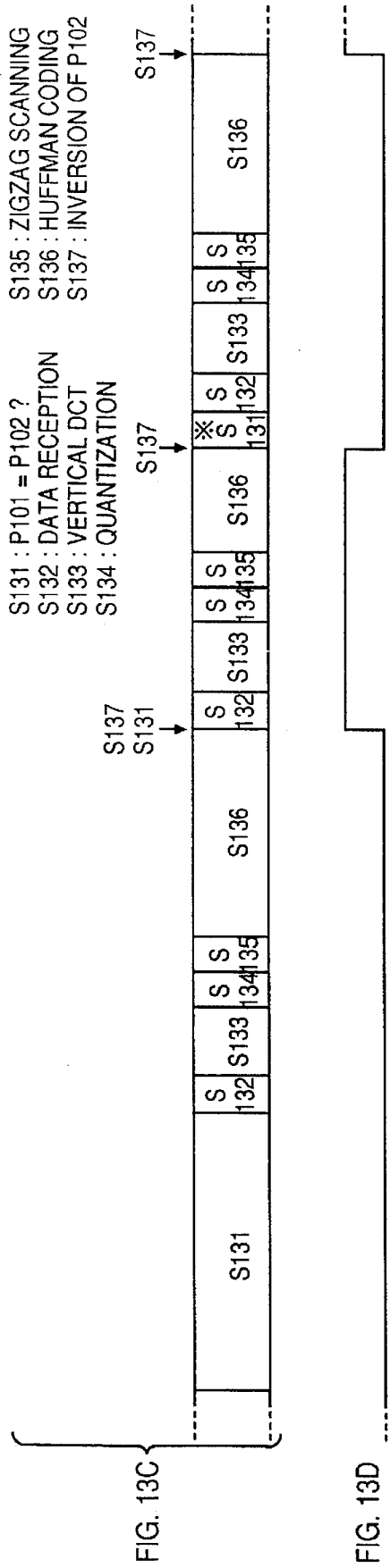
FIG. 13A / FIG. 13B / FIG. 13C / FIG. 13D

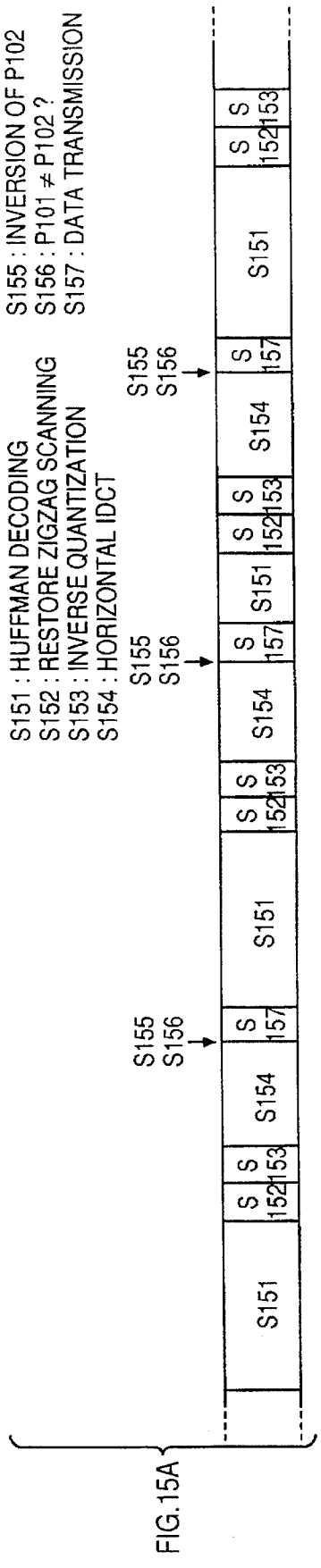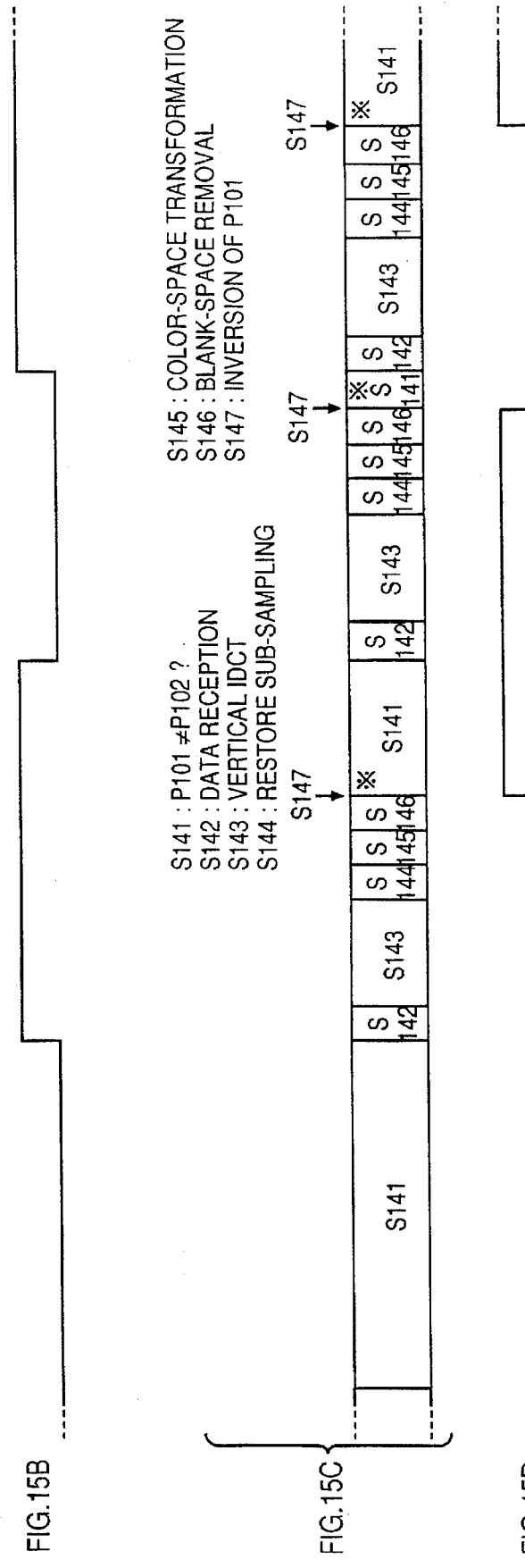
FIG.15A FIG.15B FIG.15C FIG.15D

FIG. 34

| CODE INDICATING THAT DC DIFFERENCE OF LUMINANCE COMPONENT IS 0 | EOB (END OF BLOCK) CODE OF LUMINANCE-COMPONENT BLOCK | CODE INDICATING THAT DC DIFFERENCE OF COLOR COMPONENT IS 0 | EOB (END OF BLOCK) CODE OF COLOR-COMPONENT BLOCK | CODE INDICATING THAT DC DIFFERENCE OF COLOR COMPONENT IS 0 | EOB (END OF BLOCK) CODE OF COLOR-COMPONENT BLOCK |
|---|---|---|---|---|---|
| 0 0 | 1 0 1 0 | 0 0 | 0 0 | 0 0 | 0 0 |

CODE IN CASE OF YCbCr
(JPEG-RECOMMENDED HUFFMAN TABLE USED)

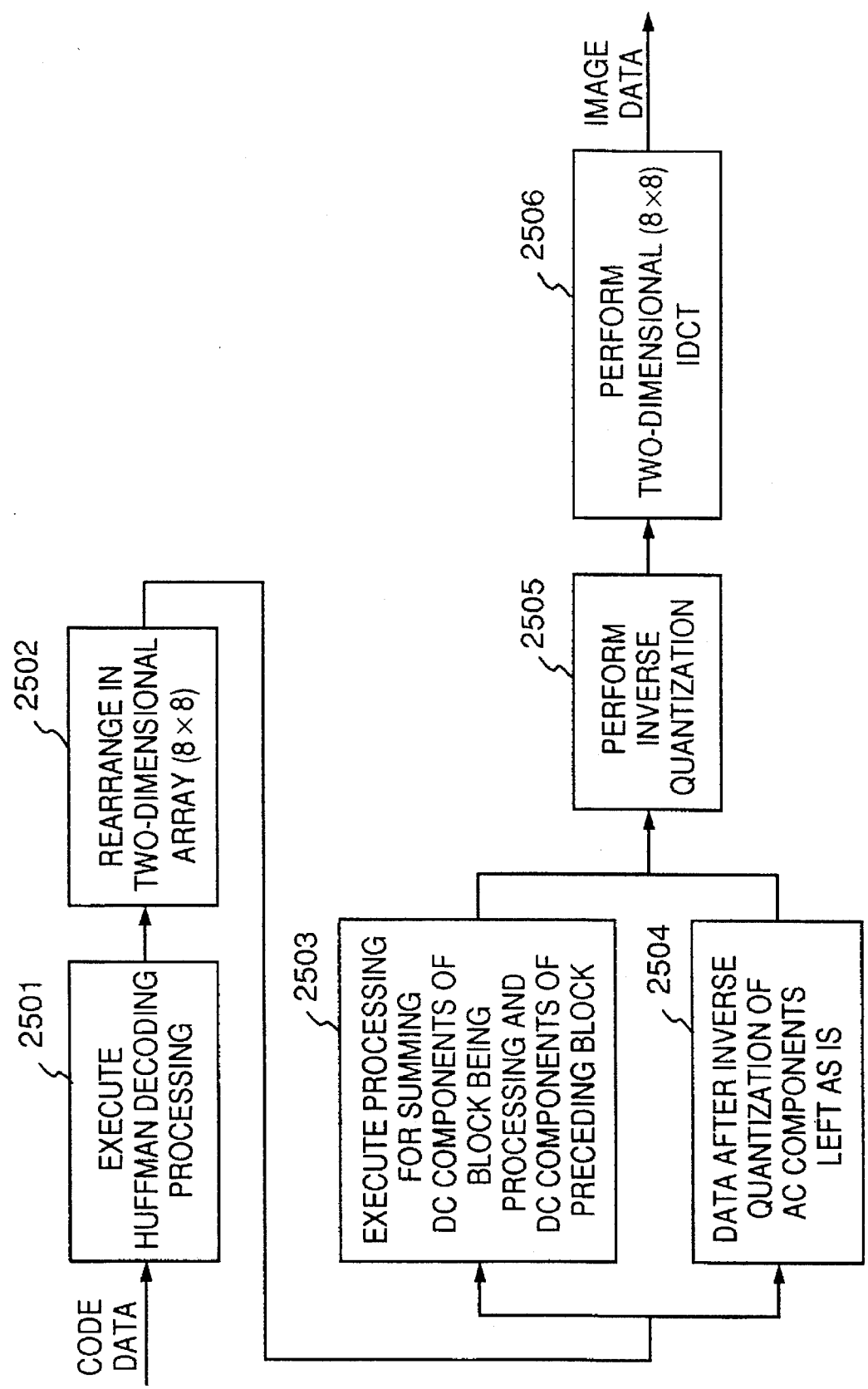

FIG. 40

| 1,1 | 2,1 | 3,1 | 4,1 | 5,1 | 6,1 | 7,1 | 8,1 | 9,1 | ...... | m,1 |
|-----|-----|-----|-----|-----|-----|-----|-----|-----|--------|-----|
| 1,2 | 2,2 | 3,2 | 4,2 | 5,2 | 6,2 | 7,2 | 8,2 | 9,2 | ...... | m,2 |
| 1,3 | 2,3 | 3,3 | 4,3 | 5,3 | 6,3 | 7,3 | 8,3 | 9,3 | ...... | m,3 |
| 1,4 | 2,4 | 3,4 | 4,4 | 5,4 | 6,4 | 7,4 | 8,4 | 9,4 | ...... | m,4 |
| 1,5 | 2,5 | 3,5 | 4,5 | 5,5 | 6,5 | 7,5 | 8,5 | 9,5 | ...... | m,5 |
| 1,6 | 2,6 | 3,6 | 4,6 | 5,6 | 6,6 | 7,6 | 8,6 | 9,6 | ...... | m,6 |
| 1,7 | 2,7 | 3,7 | 4,7 | 5,7 | 6,7 | 7,7 | 8,7 | 9,7 | ...... | m,7 |
| 1,8 | 2,8 | 3,8 | 4,8 | 5,8 | 6,8 | 7,8 | 8,8 | 9,8 | ...... | m,8 |

FIG. 41

| 1,1 | 2,1 | 3,1 | 4,1 | 5,1 | 6,1 | 7,1 | 8,1 |
|-----|-----|-----|-----|-----|-----|-----|-----|
| 1,2 | 2,2 | 3,2 | 4,2 | 5,2 | 6,2 | 7,2 | 8,2 |
| 1,3 | 2,3 | 3,3 | 4,3 | 5,3 | 6,3 | 7,3 | 8,3 |
| 1,4 | 2,4 | 3,4 | 4,4 | 5,4 | 6,4 | 7,4 | 8,4 |
| 1,5 | 2,5 | 3,5 | 4,5 | 5,5 | 6,5 | 7,5 | 8,5 |
| 1,6 | 2,6 | 3,6 | 4,6 | 5,6 | 6,6 | 7,6 | 8,6 |
| 1,7 | 2,7 | 3,7 | 4,7 | 5,7 | 6,7 | 7,7 | 8,7 |
| 1,8 | 2,8 | 3,8 | 4,8 | 5,8 | 6,8 | 7,8 | 8,8 |

IMAGE PROCESSING METHOD AND APPARATUS FOR APPLICATION TO AN IMAGE FILE OR IMAGE COMMUNICATION APPARATUS

BACKGROUND OF THE INVENTION

1. Field of the Invention

This invention relates to an image processing method and apparatus for encoding or decoding image data. By way of example, the invention relates to an image processing method and apparatus for application to an image file or image communication apparatus.

2. Description of the Related Art

An international standard for compressing color image data of a natural picture, which contains an enormous amount of information, has been proposed in recent years by the JPEG (Joint Photographic Experts Group). The method according to this standard shall be referred to as the JPEG coding method below. Though the JPEG coding method is composed of a plurality of systems, the most fundamental is a baseline system.

FIG. 27 is a diagram illustrating the data compression procedure of a baseline system.

First, input image data read by an original reading device such as a scanner is partitioned into blocks each comprising 8×8 pixels, after which compression processing is executed in block units. According to the JPEG coding method, the image data that has been read in by the original reading device is not regulated with respect to the color space to be encoded. Often, however, color-space transformation processing is executed as processing which precedes encoding. As for the color space to undergo transformation, there are many color spaces in which it is possible to execute encoding processing highly efficiently. An example of one such color space is that comprising luminance signals and color signals ($YC_bC_r$, YIQ, Lab, etc.).

In a baseline system, the image data (image data of the original color space or that which results from transformation of the color space) in each block resulting from partitioning is subjected to a discrete cosine transform (hereinafter referred to as "DCT"), which is one type of orthogonal transform (1301). After the original input image data has been transformed to data of space frequency components by DCT, the coefficient at the upper left corner of the 8×8 block is referred to as a direct current (DC) component and is a value corresponding to the mean value of the image data of the block before transformation. The other 63 coefficients are referred to as alternating current (AC) components. These are values indicating how many space frequency components corresponding to these positions are contained in the image data of a block before transformation.

DCT coefficients after transformation are divided by values obtained by multiplying 8×8 threshold values by scale factors for deciding which values, which are a certain multiple of the threshold values, to use. Quantization is thus carried out (1302). The DCT coefficients after quantization are subjected to encoding processing, which is different for the DC and AC components. Specifically, for the DC components, the difference between a DC component of a processed block and the DC component of the preceding block is subjected to Huffman coding utilizing the strength of correlation between mutually adjacent blocks (1303, 1304). AC components are rearranged in a one-dimensional array by zigzag scanning from a low frequency region to a high frequency region of space frequencies within the block (1305). Further, two-dimensional Huffman coding is performed in sets of coefficients other than zero (these are valid coefficients) and number (run length) of consecutive zeros (non-valid coefficients) (1306–1309).

FIG. 16 is a diagram showing an example of an arrangement wherein consideration is given to a case where the above-described encoding method is applied to a color-image communication apparatus.

In FIG. 16, numeral 101 denotes an image reader for scanning the image of an original and outputting multivalued RGB digital color signals. Numeral 103 denotes an image memory for storing image data read by the image reader 101 or image data obtained by decoding encoded data received via a line. Numeral 102 denotes an image printer for printing, in color, an image represented by multivalued digital color signals that have entered from the image memory 103. Numeral 110 denotes a digital signal processor (hereinafter referred to as a "DSP") for encoding image data read out of the image memory 103 or decoding encoded data received via the line. Numeral 107 designates a code memory for storing code data encoded by the DSP 110 or code data received from the line. Numeral 108 denotes a circuit control unit for controlling transmission of code data to the line or reception of code data from the line. Numeral 109 denotes a CPU for monitoring and controlling each of these components via a CPU bus B109. An interrupt-signal line I111 extends from the CPU 109 to the DSP 110, and an interrupt-signal line I112 extends from the DSP 110 to the CPU 109.

The operation for encoding the image data will be described first. FIG. 17 is a flowchart illustrating the encoding processing procedure of the DSP 110. The flowchart illustrates the encoding of one block of image data.

The image of an original is scanned by the image reader 101 and the image data outputted by the image reader 101 is stored temporarily in the image memory 103. It should be noted that image memory 103 is a three-port memory capable of input/output with respect to the image reader 101 or image printer 102, the memory being accessible asynchronously from the CPU 109 and DSP 110.

The DSP 110 adds on a blank space as needed in order to achieve conformity with a prescribed size at step S1. In an image area other than the blank area, the DSP 110 reads one block of image data out of the image memory 103. At step S2 the DSP 110 transforms the color space of the image data to a color space on a circuit line, such as YCbCr color space.

Next, the DSP 110 subjects the image data, which has undergone the color-space transformation, to sub-sampling processing at step S3, to DCT processing at step S4, to quantization at step S5 and to zigzag scanning at step S6, after which it applies Huffman coding at step S7, stores the obtained code data in the code memory 107 and then ends the encoding of the one block of image data.

It should be noted that the code memory 107 also is a three-port memory capable of being accessed asynchronously from the DSP 110, circuit control unit 108 and CPU 109. The circuit control unit 108 reads code data out of the code memory 107 and sends it to the line.

The operation for decoding the received code data will be described next. FIG. 18 is a flowchart illustrating the decoding processing procedure of the DSP 110. The flowchart illustrates the decoding of one block of image data.

The code data received from the line by the circuit control unit 108 is stored in the code memory 107.

The DSP 110 reads the code data out of the code memory 107, performs Huffman coding at step S11 and restores the order of the data that was rearranged by zigzag scanning at the time of encoding.

Next, the DSP 110 subjects the data, which has been restored to the original order, to inverse quantization at step S13 and to inverse-DCT (referred to as "IDCT" hereinafter) at step S14, during which time the results of these operations are stored in an internal RAM.

The DSP 110 then reads out the operational results stored in the internal RAM, restores the sub-sampling, which prevailed at the time of encoding, at step S15, transforms the color space of the image data from the color space (e.g., the YCbCr color space) on the line to a color space (e.g., CMYK color space) capable of being printed out at step S16, and removes the blank space, which was added on at the time of encoding, at step S17, stores the results in the image memory 103 and ends the decoding of one block of image data.

It should be noted that the image data that has been stored in the image memory 103 is sent to the image printer 102, where the received image is printed.

The arrangement described involves a number of problems, which will now be set forth.

A drawback with the example of the arrangement described above is that processing requires an extended period of time owing to the fact that image processing is executed by a single DSP. More specifically, time needed for processing increases with an increase in the amount of calculation for processing by the DSP software. When there is a large amount of data, as in the case of a color image, the acquisition of processed results is delayed.

The processing for adding on the blank space in the above-described arrangement is such that the blank space, which is necessary to achieve conformity with the size of the reproduced image on the receiving side, is added on to the data on the transmitting side. Accordingly, in a case where the baseline system of the JPEG coding system is applied, the processing for transforming the color space and the processing such as DCT is not applied solely to the image data read in by the image reader such as a scanner; processing similar to that applied to the image data must also be applied to the blank-space data added on to the image on the transmitting side.

Accordingly, in a color-image communication apparatus to which the JPEG coding method is applied, processing for transforming the color space, DCT processing and quantizing processing must be applied to the blank-space data indicative of the blank areas and to the color image data read in by the scanner or the like. When an attempt is made to realize this by the above-mentioned DSP, encoding takes a long period of time since the same operations must be performed regardless of the fact that identical code data is obtained for all of the blank-space data within a block.

Further, the decoding processing procedure is the reverse of the above-mentioned encoding processing. FIG. 35 illustrates the conventional decoding procedure of a baseline system. Here code data sent (transmitted) to another apparatus via a communication transmission line is decoded by Huffman decoding processing, as shown at 2501 in FIG. 35. Data in a one-dimensional array that has been subjected to the decoding processing is rearranged into data of a two-dimensional array at 2502.

With regard to DC components, processing is executed to sum the DC components of a block undergoing processing and the DC components of the preceding block, as indicated at 2503, and the results are adopted as the DC components of the block being processed. As for the AC components, the data after rearrangement is accepted as being valid as is at 2504 since subtraction processing is not carried out at the time of encoding processing. This data is subjected to subsequent processing.

More specifically, both the DC and AC components undergo inverse quantizing processing at 2505 and then a two-dimensional inverse discrete cosine transform at 2506 to complete the decoding processing of one block. In a case where a color-space transformation is necessary, the decoding processing of one block is terminated after the color space transformation.

The encoding/decoding processor of the color-image communication apparatus is necessary for performing blank-space processing in addition to encoding or decoding processing. In blank-space processing, a blank space or margin required on the receiving side is added on to an image on the transmitting side. In many cases the blank-space data added on as a blank is "white". Accordingly, in a case where a baseline system according to the JPEG coding method is applied to a color-image communication apparatus, the processing for transforming the color space and the processing such as DCT is not applied solely to the image data read in by the image reader such as a scanner; processing similar to that applied to the image data must also be applied to the blank-space data (white data) added on to the image on the transmitting side.

Further, in the decoding processing also, the above-mentioned series of decoding processing operations, namely Huffman decoding processing, inverse quantizing processing, IDCT processing and color-space transformation processing, must be executed regardless of the code data to be decoded.

Accordingly, the conventional color-image communication apparatus to which the JPEG coding method is applied subjects blank-area block data (white data) of a blank area and white block image data read in by a scanner, etc., or block image data other than that of a white block, to color-space transformation processing, DCT processing, quantizing processing and Huffman coding processing. At the time of decoding processing, the apparatus subjects all of the code data to Huffman decoding processing, inverse quantizing processing, IDCT processing and color-space transformation processing.

Thus, in the encoding processor of the conventional color-image communication apparatus, even white-block image data or blank-space block data (white data) of a blank area read in by an original reader such as a scanner is subjected to processing similar to that applied to block image data other than that of white blocks, namely color-space transformation processing, DCT processing, quantizing processing and Huffman coding processing, block by block. As a result, the time needed for encoding processing of all image data inclusive of blank-space data is prolonged.

SUMMARY OF THE INVENTION

An object of the present invention is to provide an image processing method and apparatus through which high-speed encoding/decoding can be executed.

According to the present invention, the foregoing object is attained by providing An image processing apparatus including, input means for inputting image data representing an image, and encoding means for dividing the image data into a plurality of blocks and encoding the image data by calculation, wherein the encoding means discriminates whether pixels in a block have a predetermined value and encodes the image data in the block without performing a calculation when it is determined that the pixels in the block have the predetermined value.

According to the present invention, the foregoing objects are attained by providing an image processing method including an input step of inputting image data representing an image, an encoding step of dividing the image data into a plurality of blocks and encoding the image data by a calculation based upon computer software, and the encoding step discriminating whether pixels in a block have a predetermined value and encoding the image data in the block without performing calculation based upon the computer software when it is determined that the pixels in the block have the predetermined value.

Another object of the present invention is to achieve high-speed encoding/decoding by deleting prescribed operations.

A further object of the present invention is to achieve efficient encoding/decoding using a plurality of processors.

According to the present invention, the foregoing objects are attained by providing an image processing apparatus including input means for inputting image data representing an image, and encoding means for encoding the image data by a calculation based upon computer software, wherein the encoding means includes a plurality of a calculation means each of which performs calculation based on a supplied program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing an example of the construction of a color-image communication apparatus according to a first embodiment of the present invention;

FIGS. 4A and 4B are diagrams showing an example of a quantization table according to this embodiment;

FIG. 5 is a diagram showing an example of the order of zigzag scanning according to this embodiment;

FIG. 6 is a diagram showing an example of the relationship among DC differences, group numbers and number of add-on dots according to this embodiment;

FIG. 7 is a diagram showing an example of the relationship among AC coefficients, group numbers and number of add-on dots according to this embodiment;

FIGS. 8A to 8D are timing charts showing an example of a parallel operation in encoding according to this embodiment;

FIGS. 10A to 10D are timing charts showing an example of a parallel operation in decoding according to this embodiment;

FIG. 11 is a block diagram showing an example of the construction of a color-image communication apparatus according to a second embodiment of the present invention;

FIGS. 12A and 12B are flowcharts showing an example of an encoding processing procedure according to the second embodiment;

FIGS. 13A to 13D are timing charts showing an example of a parallel operation in encoding according to the second embodiment;

FIGS. 15A to 15D are timing charts showing an example of a parallel operation in decoding according to the second embodiment;

FIG. 34 is a diagram showing an example of a code in a case where a DC difference relative to a preceding block is "0" and all AC components are "0" according to the seventh embodiment;

FIG. 35 is a processing block diagram at the time of decoding according to the JPEG coding method;

FIG. 40 is a diagram showing units of a pixel group when it is judged whether original image data is all white or not;

FIG. 41 is a diagram showing units of a pixel group when it is judged whether original image data is all white or not;

DESCRIPTION OF THE PREFERRED EMBODIMENTS

An image processing apparatus of embodiments according to the present invention will now be described in detail with reference to the drawings.

<First Embodiment>

Figure 16:
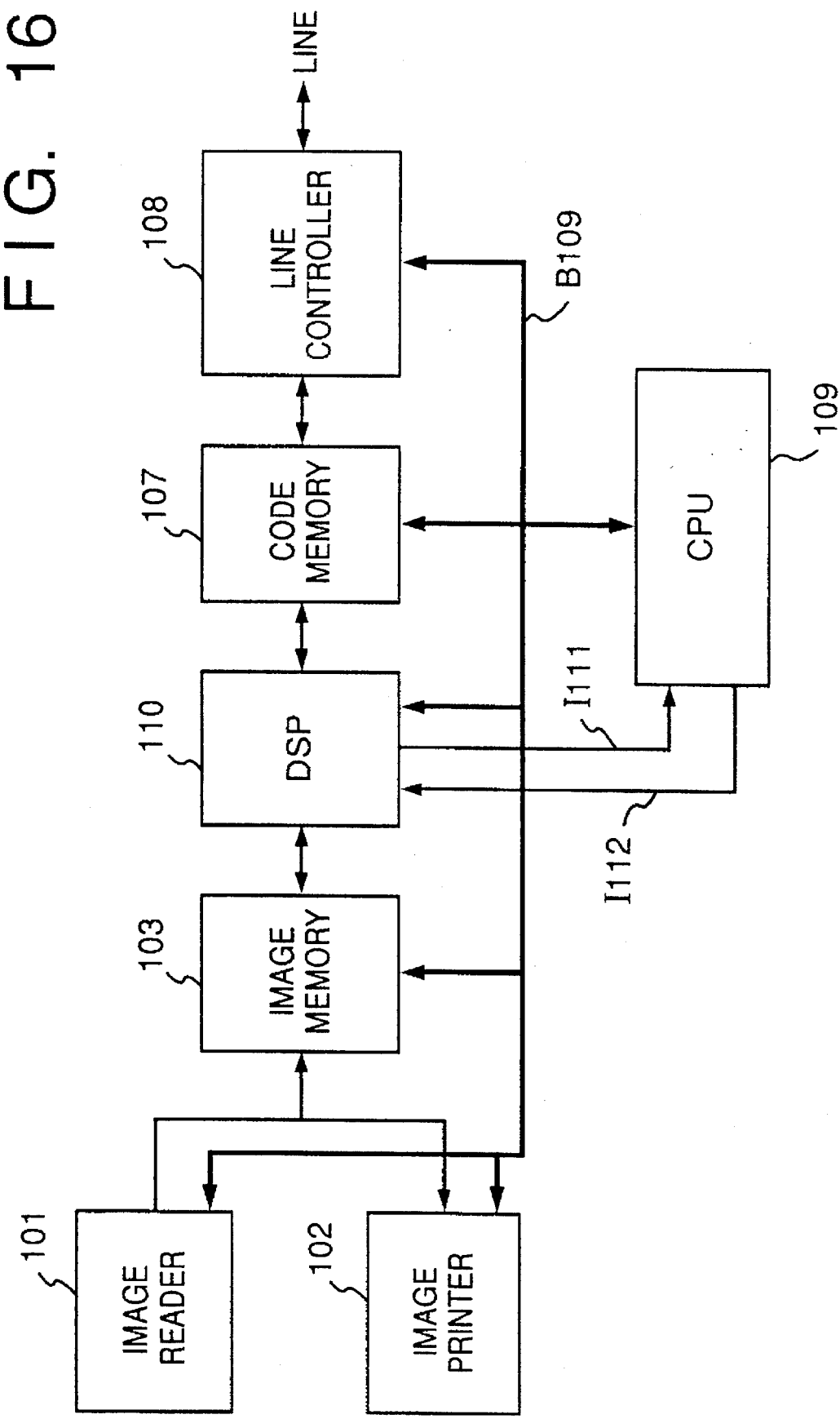
FIG. 16 is a diagram showing an example of an arrangement wherein consideration is given to a case where JPEG coding is applied to a color-image communication apparatus.
Figure 17:
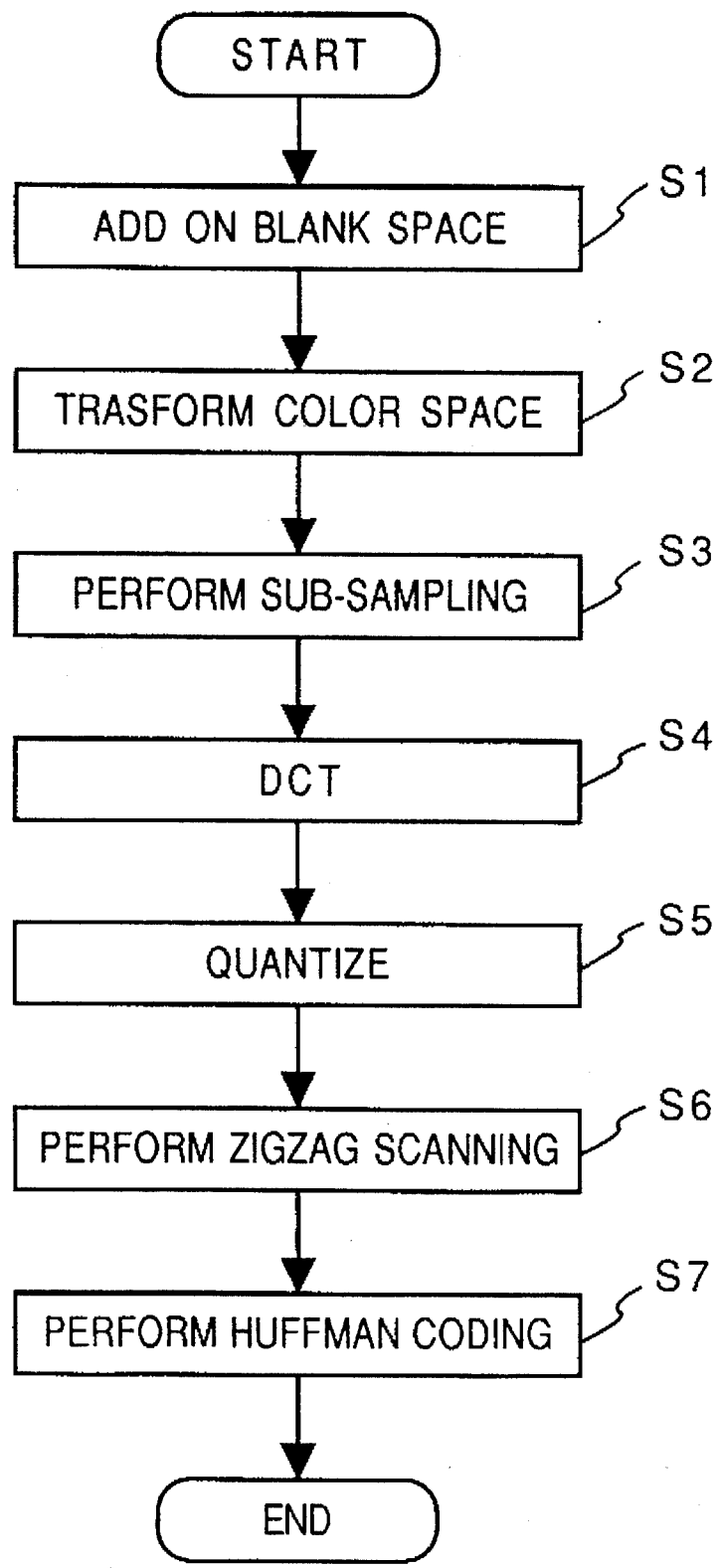
FIG. 17 is a flowchart showing the encoding processing procedure of a DSP in FIG. 16.
Figure 18:
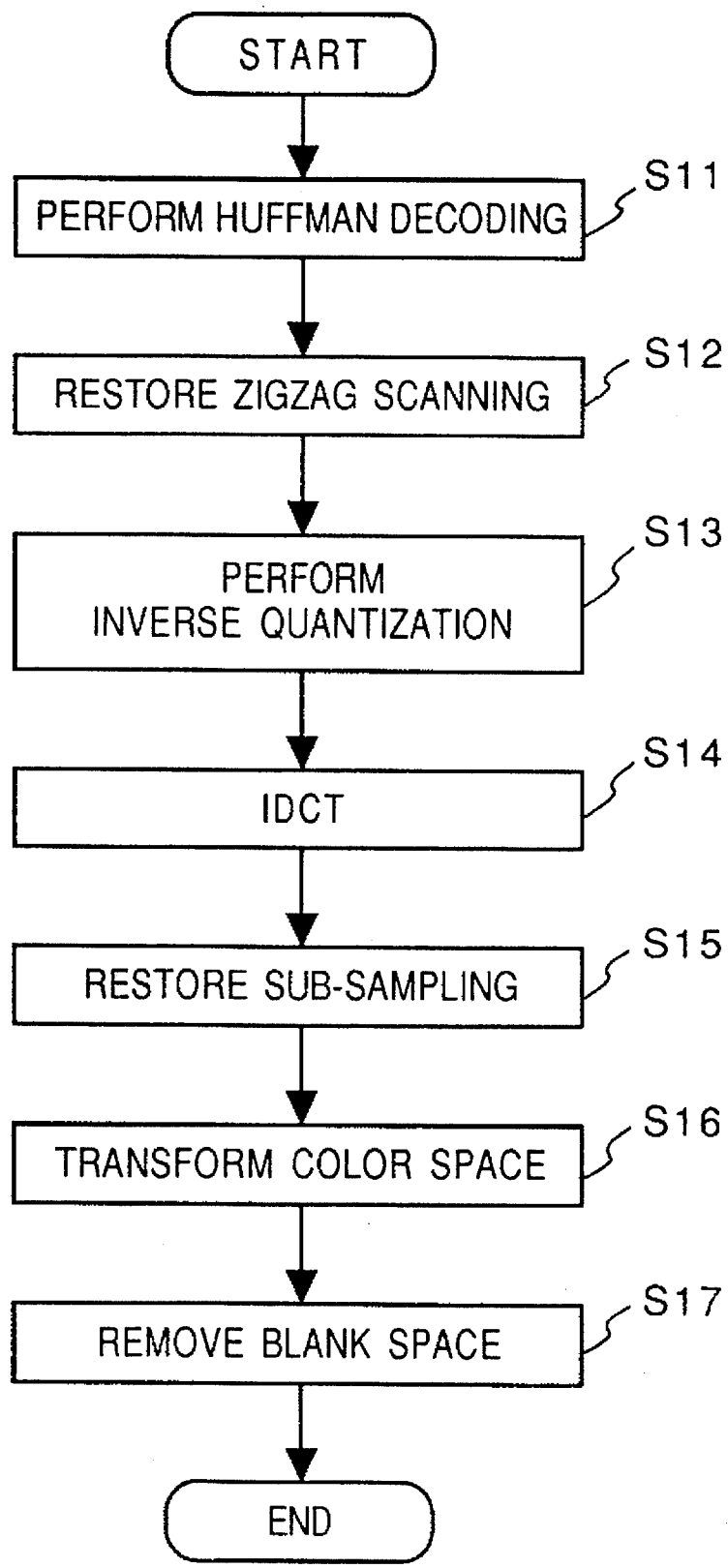
FIG. 18 is a flowchart showing the decoding processing procedure of a DSP in FIG. 16.

FIG. 1 is a block diagram showing an example of the construction of a color-image communication apparatus according to a first embodiment of the present invention. Components in FIG. 1 substantially the same as those shown in the arrangement of FIG. 16 are designated by like reference characters and need not be described again.

In the Figure, numeral 104 denotes a DSPa, which is for executing pre-processing in advance of encoding or post-processing following decoding, as will be described later, and numeral 105 denotes a DSPb, which is for executing post-processing following encoding or pre-processing in advance of decoding, as will be described later.

Numeral 106 denotes a RAM, which is constituted by a dual-port RAM or the like, serving as an intermediary for data between the DSPa 104 and DSP5 105.

The signal lines associated with the two DSPs are as follows: P101 is a signal line for sending status from the DSPa 104 to the DSPb 105, P102 is a signal line for sending status from the DSPb 105 to the DSPa 104, I101 is an interrupt-signal line from the CPU 109 to the DSPa 104, I102 is an interrupt-signal line from the DSPa 104 to the CPU 109, I103 is an interrupt-signal line from the CPU 109 to the DSPa 105, and I104 is an interrupt-signal line from the DSPb 105 to the CPU 109.

Figure 2A:
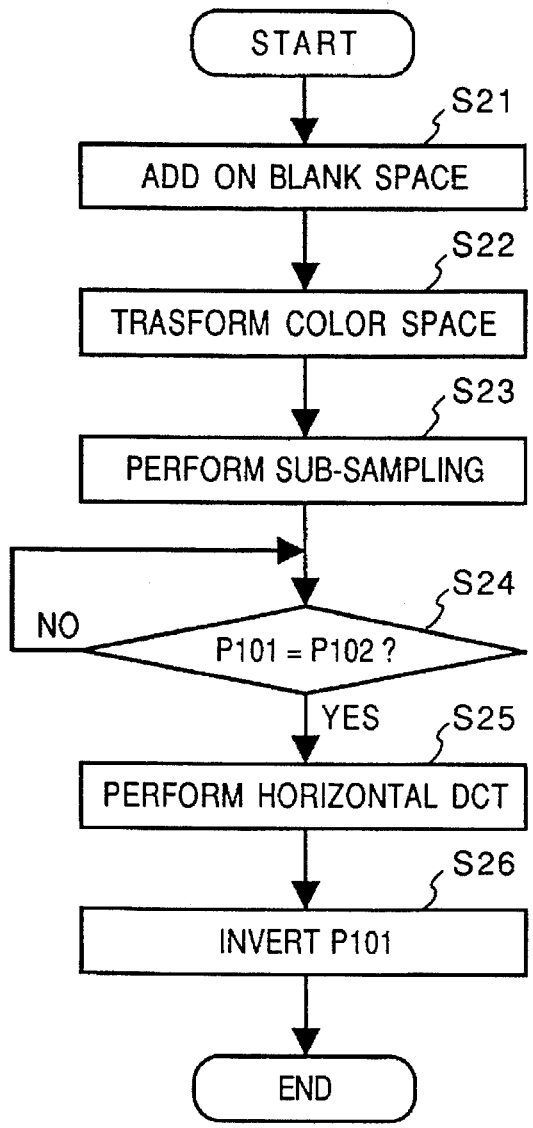
FIGS. 2A and 2B are flowcharts showing an example of an encoding processing procedure according to this embodiment.
Figure 2B:
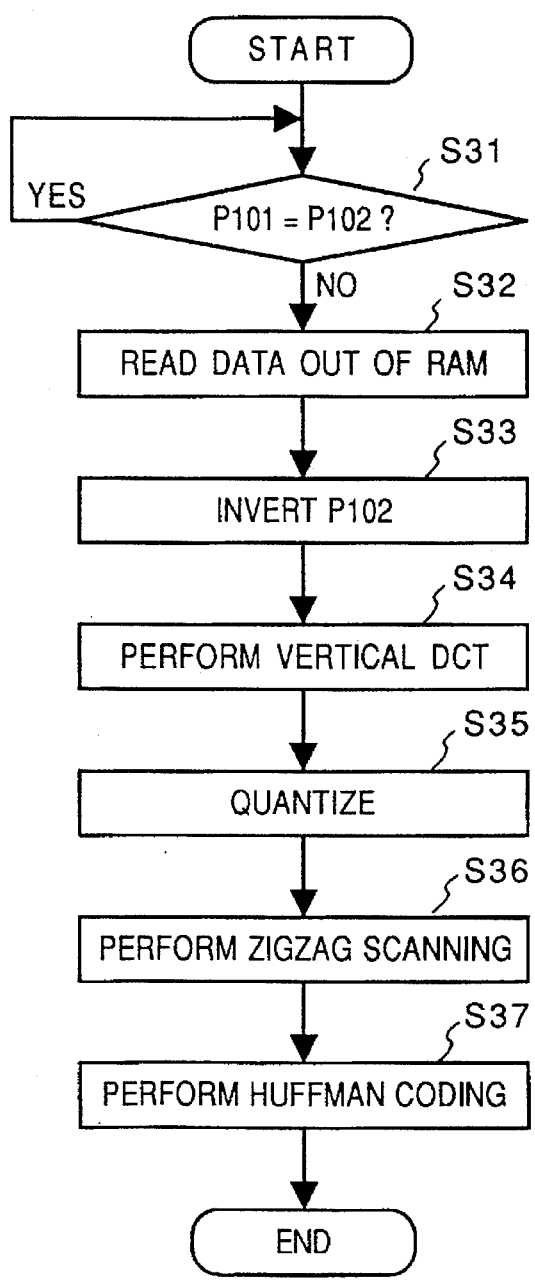

The operation for encoding image data will be described first. FIGS. 2A and 2B are flowcharts illustrating an example of encoding processing procedure according to this embodiment. The flowchart illustrates the encoding of one block of image data. The processing of FIG. 2A is executed by the DSPa 104, and processing of FIG. 2B is executed by the DSPb 105. In the description that follows, an example is illustrated in which one block is composed of 8×8 pixels. However, this does not impose a limitation upon block size.

The image of an original is scanned by the image reader 101 and RGB image data outputted by the image reader 101 is stored temporarily in the image memory 103.

The DSPa 104 adds on blank spaces as needed in order to achieve conformity with a prescribed size at step S21. In an image area other than the blank areas, the DSPa 104 reads one block of image data out of the image memory 103.

Figure 3:
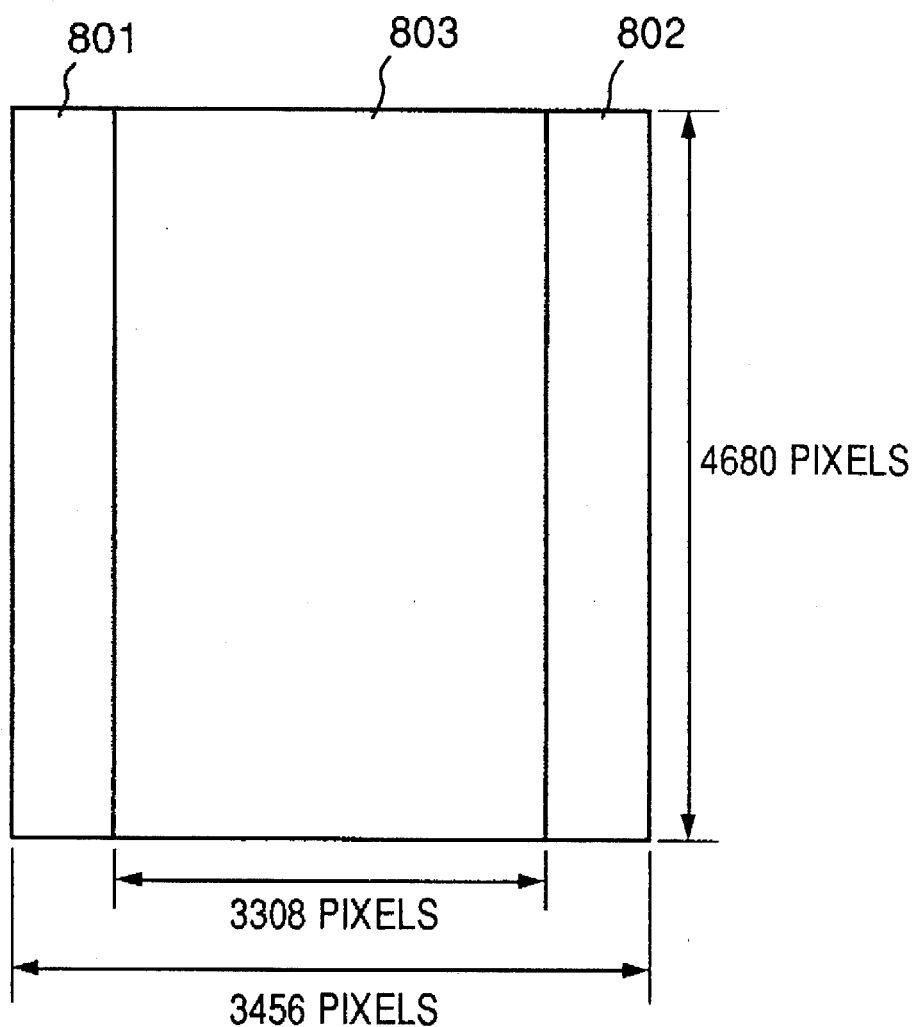
FIG. 3 is a diagram showing an example of blank spaces added on by "blank add-on"

FIG. 3, which is a diagram showing an example of blank spaces added on at step S21, illustrates an example in which blank areas 801 and 802 are added on to an image area 803 read by the image reader 101 at a reading size of A4 and a reading resolution of 400 dpi to achieve conformity with size A4 of a G4 facsimile.

Next, at step S22, the DSPa 104 transforms the color space of the image data to color space, such as YCbCr color space, on a circuit line. This transformation is performed in accordance with the following equation:

$$\begin{bmatrix} Y \\ Cb \\ Cr \end{bmatrix} = \begin{bmatrix} 2.2990 & 0.5870 & 0.1140 \\ -0.1690 & -0.3310 & 0.5000 \\ 0.5000 & -0.4186 & -0.0814 \end{bmatrix} \begin{bmatrix} R \\ G \\ B \end{bmatrix} \quad (1)$$

Next, the DSPa 104 performs sub-sampling processing at step S23. This processing reduces the color-difference data Cb, Cr utilizing a characteristic according to which the human eye is sensitive to luminance but insensitive to a difference in color. For example, by taking the mean value of two mutually adjacent items of color-difference data and reducing the amount of color-difference data by half, the ratio of each item of data is made Y:Cb:Cr=1:1:1, 2:1:1 or 4:1:1, etc.

Next, at step S24, the DSPa 104 compares status signals P101, P102 and waits for the state of these two signals to agree. When the state of the two signals agree, the DSPa 104 executes one-dimensional DCT processing in the horizontal direction at step S25 and stores the operational results successively in the RAM 106. Though DCT processing in ADCT is two-dimensional, in this embodiment one dimensional DCT is performed twice, namely in horizontal and vertical directions. The following equation is the transformation equation of one-dimensional DCT processing in the horizontal direction:

$$F(u) = \frac{1}{2} C(u) \sum_{i=0}^{7} F(i) \cos \frac{(2i+1)u\pi}{16} \quad (2)$$

$$\text{where } C(u) = \begin{cases} 1/\sqrt{2} & (u=0) \\ 1 & (u \neq 0) \end{cases}$$

When DCT processing ends, the DSPa 104 inverts the status signal P101 at step S26. From this point onward the processing relating to this data is executed by the DSPb 105 through the procedure shown in FIG. 2B.

The DSPb 105 waits for the state of the status signals P101 and P102 to fail to agree at step S31. When the two signals no longer agree, the DSPb 105 reads operational data out of the RAM 106 and stores the data in an internal RAM at step S32, after which it inverts the status signal P102 at step S33.

This is followed by step S34, at which the DSPb 105 subjects the operational data stored in the internal RAM to one-dimensional DCT processing in the vertical direction. The transformation equation is the same as that of Equation (2) above.

Next, using a Y-component quantization table and a C-component quantization table, examples of which are shown in FIGS. 4A and 4B, respectively, the DSPb 105 performs quantization by dividing each of the coefficients after DCT processing by threshold values of the corresponding positions in the two quantization tables.

The DSPb 105 then performs zigzag scanning in order from 0 to 63, as shown in the example of FIG. 5, at step S36, thereby rearranging the quantized data in one dimension, and applies Huffman coding to the one-dimensionally rearranged quantized data at step S37 and then stores the encoded data in the code memory 107.

In Huffman coding, the encoding for the DC coefficient at position "0" in FIG. 5 differs from the encoding for the AC coefficients at positions "1" to "63" in FIG. 5. First, with regard to the DC coefficient, the difference with respect to a DC coefficient of an identical component (Y, Cr or Cb) in the block just encoded is obtained, and a group number SSSS and number of add-on bits are decided in accordance with the relationship between the DC difference and group number SSSS, an example of which is illustrated in FIG. 6. The group number SSSS is subjected to Huffman coding by referring to a Huffman table, and the add-on bits are added on to the result of encoding. As for the AC coefficients, on the other hand, 0s are counted in regular order from "1" until a coefficient other than 0 is found, with the AC coefficients being in the state in which they are arranged in one dimension in order from "1" to "63", as illustrated in FIG. 5. When a coefficient other than 0 is found, a group number SSSS and number of add-on bits are decided in accordance with the relationship between the AC coefficients and the group number SSSS, an example of which is illustrated in FIG. 7. The group number SSSS and count NNNN of 0 coefficients are subjected to Huffman coding by referring to a Huffman table, and the add-on bits are added on to the result of encoding.

The foregoing describes the order of processing with regard to one block. In actuality, the DSPa 104 and DSPb 105 operate in parallel in accordance with pipeline processing. For example, when the DSPb 105 is processing an N-th block, the DSPa 104 is processing an (N+1)th block.

FIGS. 8A to 8D are timing charts illustrating an example of this parallel operation in encoding, in which FIG. 8A illustrates the contents of processing executed by the DSPa 104, FIG. 8B the state of the status signal P101, FIG. 8C the contents of processing executed by the DSPb 105 and FIG. 8D the state of the status signal P102.

In FIGS. 8A to 8D, the signals P101 and P102 initially are at the L level. The DSPa 104 executes blank add-on (S21), color-space transformation (S22) and sub-sampling (S23), after which it verifies that P101=P102 holds at S24, executes DCT (S25) in the horizontal direction and inverts the signal P101 at S26. The DSPa 104 then proceeds to processing of the next block.

The DSPb 105 stands by (S31) until the signal P101 is inverted. At inversion of the signal P101, the DSPb 105 executes read-out of the RAM 106 (S32), after which it inverts the signal P102 at S33. The DSPb 105 ends the preprocessing of one block upon executing DCT (S34) in the vertical direction, quantization (S35), zigzag scanning (S36) and Huffman coding (S37). The DSPb 105 then proceeds to processing of the next block. However, when P101≠P102 holds at S31, the DSPb 105 executes read-out of the RAM 106 immediately (S32).

The above-described processing is repeated by the DSPa 104 and DSPb 105. The processing time which fluctuates most widely in each of these processing operations is that for Huffman coding (S37). As a result, in a case where the Huffman coding (S37) of DSPb 105 is prolonged and the status signal P102 has not been inverted at the moment the sub-sampling (S23) performed by the DSPa 104 ends, the DSPa 104 stands by until P101=P102 is established, as at S24 indicated by the "X" mark in FIG. 8A. More specifically, the DSPa 104 and DSPb 105 monitor each other's status signals, thereby becoming mutually synchronized to realize parallel processing.

Figure 9A:
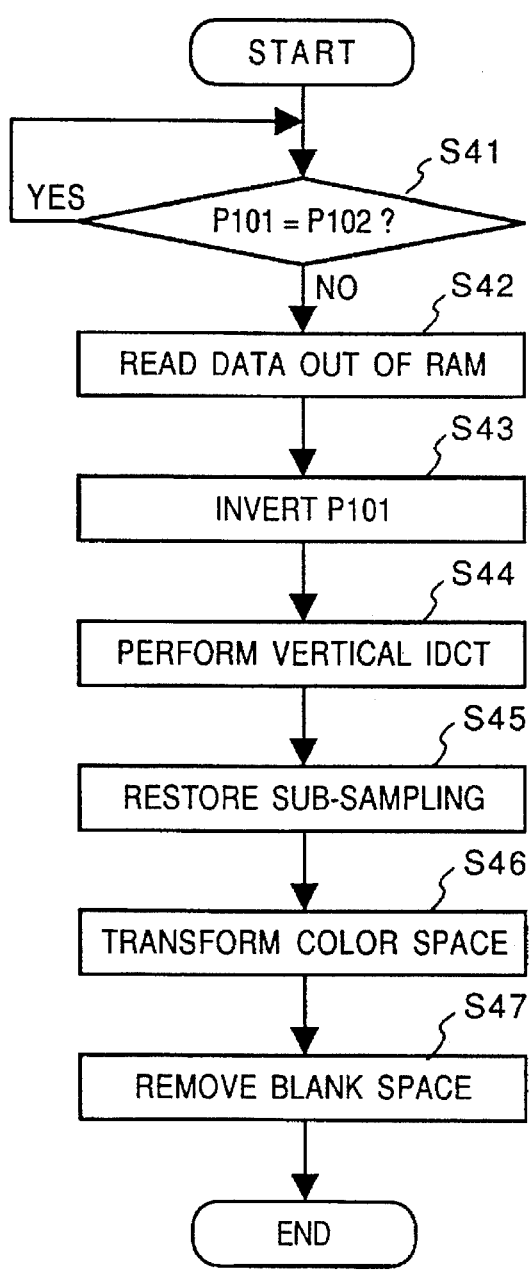
FIGS. 9A and 9B are flowcharts showing an example of a decoding processing procedure according to this embodiment.
Figure 9B:
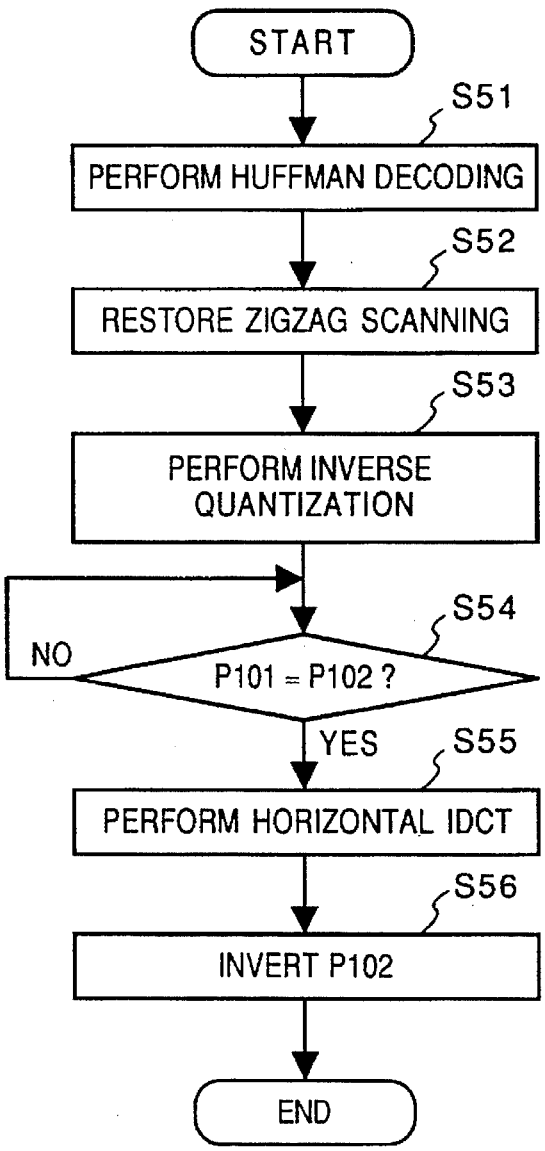

The operation for decoding code data will be described next. FIGS. 9A and 9B are flowcharts illustrating an example of decoding processing procedure according to this embodiment. The flowcharts illustrate the decoding of one block of image data. The processing of FIG. 9A is executed by the DSPa 104, and processing of FIG. 9B is executed by the DSPb 105. In the description that follows, an example is illustrated in which one block is composed of 8×8 pixels. However, this does not impose a limitation upon block size.

Code data received by the circuit control unit 108 via the line is stored in the code memory 107. The DSPb 105 reads the code data out of the code memory 107, performs Huffman coding at step S51 and, at step S52, restores the order of the data that was rearranged by zigzag scanning at the time of encoding. Using the Y-component quantization table and the C-component quantization table shown in FIGS. 4A and 4B, respectively, the DSPb 105 performs inverse quantization at step S53.

Next, at step S54, the DSPb 105 compares the status signals P101, P102 and waits for the state of these two signals to agree. When the state of the two signals agree, the DSPb 105 executes one-dimensional IDCT processing in the horizontal direction at step S55 and stores the operational results successively in the RAM 106. The following equation is the transformation equation of one-dimensional IDCT processing in the horizontal direction:

$$f(i) = \frac{1}{2} \sum_{u=0}^{7} C(u)F(u)\cos\frac{(2i+1)u\pi}{16}$$

$$\text{where } C(u) = \begin{cases} 1/\sqrt{2} & (u=0) \\ 1 & (u \neq 0) \end{cases}$$

When IDCT processing ends, the DSPb 105 inverts the status signal P102 at step S56. From this point onward the processing relating to this data is executed by the DSPa 104 through the procedure shown in FIG. 9B.

The DSPa 104 waits for the state of the status signals P101 and P102 to fail to agree at step S41. When the two signals no longer agree, the DSPa 104 reads operational data out of the RAM 106 and stores the data in an internal RAM at step S42, after which it inverts the status signal P101 at step S43.

This is followed by step S44, at which the DSPa 104 subjects the operational data stored in the internal RAM to one-dimensional IDCT processing in the vertical direction. The transformation equation is the same as that of Equation (3) above.

The DSPa 104 then restores sub-sampling, which prevailed at the time of encoding, at step S45. Next, at step S46, the DSPa 104 transforms the color space of the image data to color space on a line. For example, the transformation is made from YCbCr color space to a color space, such as CMY color space, that is convenient for printing.

Next, at step S47, the DSPa 104 removes the blank spaces that were added on at the time of encoding and then stores the image data in the image memory 103. The image data that has been stored in the image memory 103 is sent to the image printer 102, where the received image is printed out.

The foregoing describes the order of processing with regard to one block. In actuality, the DSPb 105 and DSPa 104 operate in parallel in accordance with pipeline processing. For example, when the DSPa 104 is processing an N-th block, the DSPb 105 is processing an (N+1)th block.

FIGS. 10A to 10D are timing charts illustrating an example of this parallel operation in decoding, in which 10A illustrates the contents of processing executed by the DSPb 105, FIG. 10B the state of the status signal P102, FIG. 10C the contents of processing executed by the DSPa 104 and FIG. 10D the state of the status signal P101.

In FIGS. 10A to 10D, the signals P101 and P102 initially are at the L level. The DSPb 105 executes Huffman decoding (S51), restoration of zigzag scanning (S52) and inverse quantization (S53), after which it verifies that P101=P102 holds at S54, executes IDCT (S55) in the horizontal direction and inverts the signal P102 at S56.

The DSPb 105 then proceeds to processing of the next block.

The DSPa 104 stands by (S41) until the signal P102 is inverted. At inversion of the signal P102, the DSPa 104 executes read-out of the RAM 106 (S42), after which it inverts the signal P101 at S43. The DSPa 104 ends the processing of one block upon executing IDCT (S44) in the vertical direction, restoration of sub-sampling (S45), color-space transformation (S46) and blank removal (S47). The DSPa 104 then proceeds to processing of the next block. However, when P101≠P102 holds at S41, the DSPa 104 executes read-out of the RAM 106 immediately (S42).

The above-described processing is repeated by the DSPb 105 and DSPa 104. The processing time which fluctuates most widely in each of these processing operations is that for Huffman decoding (S51). As a result, in a case where the Huffman decoding (S51) of DSPb 105 is prolonged and the status signal P102 has not been inverted at the moment blank removal (S47) performed by the DSPa 104 ends, the DSPa 104 stands by until P101≠P102 is established, as at S41 indicated by the "X" mark in FIG. 10C. More specifically, as in the manner of encoding processing, the DSPb 105 and DSPa 104 monitor each other's status signals, thereby becoming mutually synchronized to realize parallel processing.

It should be noted that the interface between the CPU 109 and DSPa 104 employs the interrupt-signal lines I101, I102 and part of the image memory 103.

In a case where the CPU 109 instructs the DSPa 104 to start processing, the CPU writes the necessary parameters, such as whether this processing is encoding or decoding, the sub-sampling ratio and the image size, in a predetermined area of the image memory 103 and starts processing via the interrupt-signal line I101. Further, in a case where processing ends, the DSPa 104 so informs the CPU 109 via the interrupt-signal line I102.

The interface between the CPU 109 and DSPb 105 employs the interrupt-signal lines I103, I104 and part of the code memory 107, whereby the transfer of parameters and the command to start processing are carried out in the same manner as in the case of the DSPa 104.

In accordance with this embodiment, as described above, pipeline processing is executed using two DSPs. As a result, image processing such as encoding/decoding processing by ADCT, color-space transformation, sub-sampling and blank add-on/removal is speeded up overall.

In accordance with this embodiment, operations up to the one-dimensional DCT are performed by a first DSP, and remaining operations following the one-dimensional DCT is performed by a second DSP. As a result, it is unnecessary for the first DSP to have an internal memory for storing the results of the DCT operations. This makes it possible to simplify the construction of this DSP.

<Second Embodiment>

A second embodiment of the present invention will now be described. Components in the second embodiment substantially the same as those in the first embodiment are designated by like reference characters and need not be described in detail again.

FIG. 11 is a block diagram showing an example of the construction of a color-image communication apparatus according to a second embodiment of the present invention.

According to the first embodiment illustrated in FIG. 1, the RAM 106 serving as a data intermediary is present between the DSPa 104 and DSPb 105. In this embodiment, however, the DSPa 104 and DSPb 105 exchange data directly.

The operation for encoding image data will be described first. It should be noted that the processing operations described below are substantially similar to the processing operations of the same step numbers in the first embodiment and need not be described in detail again.

FIGS. 12A and 12B are flowcharts illustrating an example of encoding processing procedure according to this embodiment. The flowchart illustrates the encoding of one block of image data. The processing of FIG. 12A is executed by the DSPa 104, and processing of FIG. 12 B is executed by the DSPb 105. In the description that follows, an example is illustrated in which one block is composed of 8×8 pixels. However, this does not impose a limitation upon block size.

The image of an original is scanned by the image reader 101 and the RGB image data outputted by the image reader 101 is stored temporarily in the image memory 103.

The DSPa 104 adds on blank spaces as needed in order to achieve conformity with a prescribed size at step S121. In an image area other than the blank areas, the DSPa 104 reads one block of image data out of the image memory 103.

Next, at step S122, the DSPa 104 transforms the color space of the image data to a color space, such as YCbCr color space, on a circuit line. This transformation is performed in accordance with Equation (1).

Next, the DSPa 104 performs sub-sampling processing at step S123 and executes one-dimensional DCT processing in the horizontal direction at step S124. The transformation equation is identical with Equation (2) above.

When DCT processing ends, the DSPa 104 inverts the status signal P101 at step S125, compares the state of the status signals P101 and P102 and waits for the state of these two signals to fail to agree. When the two signals no longer agree, the DSPa 104 sends operational data to the DSPb 105 at step S127. From this point onward the processing relating to this data is executed by the DSPb 105 through the procedure shown in FIG. 12B.

The DSPb 105 waits for the state of the status signals P101 and P102 to fail to agree at step S131. When the two signals no longer agree, the DSPb 105 receives operational data from the DSPa 104 at step S132 and executes one-dimensional DCT processing in the vertical direction at step S133. The transformation equation is the same as that of Equation (2) above. Next, using a Y-component quantization table and a C-component quantization table, examples of which are shown in FIGS. 4A and 4B, respectively, the DSPb 105 performs quantization by dividing each of the coefficients after DCT processing by threshold values of the corresponding positions in the two quantization tables.

The DSPb 105 then performs zigzag scanning in order from 0 to 63, as shown in FIG. 5, at step 131, thereby rearranging the quantized data in one dimension, and applies Huffman coding to the one-dimensionally rearranged quantized data at step S136 and then stores the encoded data in the code memory 107.

The foregoing describes the order of processing with regard to one block. In actuality, the DSPa 104 and DSPb 105 operate in parallel in accordance with pipeline processing. For example, when the DSPb 105 is processing an N-th block, the DSPa 104 is processing an (N+1)th block.

FIGS. 13A to 13D are timing charts illustrating an example of this parallel operation in encoding, in which FIG. 13A illustrates the contents of processing executed by the DSPa 104, FIG. 13B the state of the status signal P101, FIG. 13C the contents of processing executed by the DSPb 105 and FIG. 13D the state of the status signal P102.

In FIGS. 13A to 13D, the signals P101 and P102 initially are at the L level. The DSPa 104 executes blank add-on (S121), color-space transformation (S122), sub-sampling (S123) and DCT (S124) in the horizontal direction, after which it inverts the signal P101 at S126, verifies that P101≠P102 holds at step S127 and transmits the data (S127). The DSPa 104 then proceeds to processing of the next block.

The DSPb 105 stands by (S131) until the signal P101 is inverted. At inversion of the signal P101, the DSPb 105 receives data (S132). The DSPb 105 then executes DCT (S133) in the vertical direction, quantization (S134), zigzag scanning (S135) and Huffman coding (S136, after which it inverts P102 at S137, thus ending the processing of one block. The DSPb 105 then proceeds to processing of the next block. However, when P101≠P102 holds true at S131, the DSPb 105 executes data reception immediately (S132).

The above-described processing is repeated by the DSPa 104 and DSPb 105. The processing time which fluctuates most widely in each of these processing operations is that for Huffman coding (S136). As a result, in a case where the Huffman coding (S136) of DSPb 105 is prolonged and the status signal P102 has not been inverted at the moment the status signal P101 is inverted by the DSPa 104 (S125), or in a case where Huffman coding by the DSPb 105 (S136) ends in a short period of time and DCT processing by the DSPa 104 (S124) has not ended, etc., the DSPa 104 or DSPb 105 stands by until P101≠P102 is established, as at S126 or S131 indicated by the "X" mark in FIGS. 13A and 13C. More specifically, the DSPa 104 and DSPb 105 monitor each other's status signals, thereby becoming mutually synchronized to realize parallel processing.

The operation for decoding image data will be described next. It should be noted that the processing operations described below are substantially similar to the processing operations of the same step numbers in the first embodiment and need not be described in detail again.

Figure 14A:
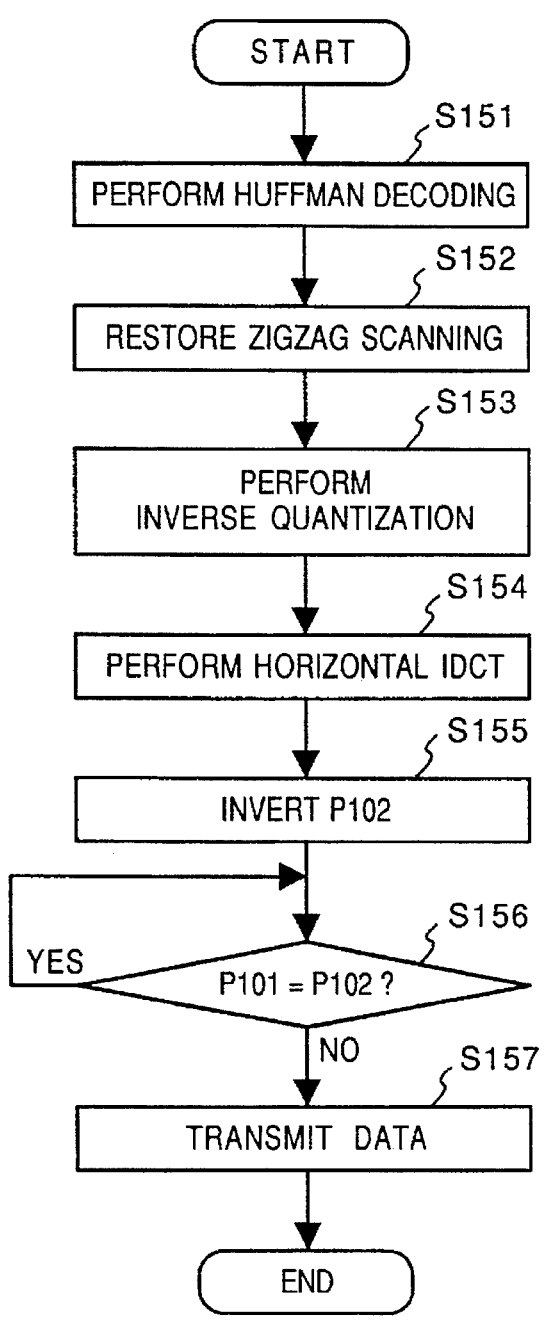
FIGS. 14A and 14B are flowcharts showing an example of a decoding processing procedure according to the second embodiment.
Figure 14B:
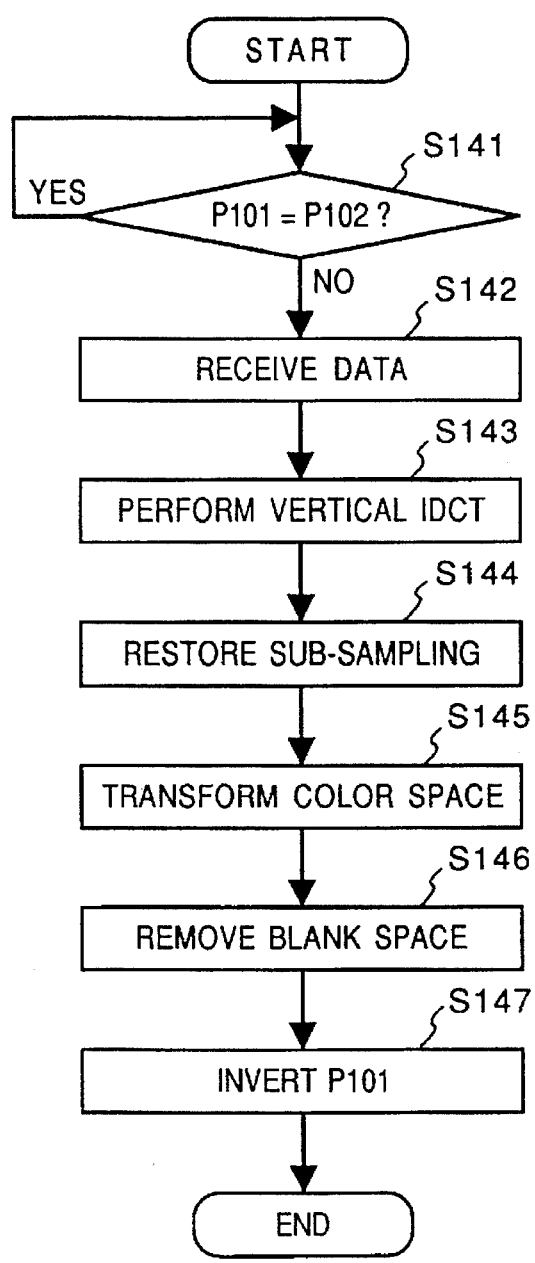

FIGS. 14A and 14B are flowcharts illustrating an example of decoding processing procedure according to this embodiment. The flowchart illustrates the decoding of one block of image data. The processing of FIG. 14A is executed by the DSPb 105, and processing of FIG. 14B is executed by the DSPa 104. In the description that follows, an example is illustrated in which one block is composed of 8×8 pixels. However, this does not impose a limitation upon block size.

Code data received by the circuit control unit 108 via the line is stored in the code memory 107. The DSPb 105 reads the code data out of the code memory 107, performs Huffman coding at step S151 and, at step S152, restores the order of the data that was rearranged by zigzag scanning at the time of encoding. Using the Y-component quantization table and the C-component quantization table shown in FIGS. 4A and 4B, respectively, the DSPb 105 performs inverse quantization at step S153.

Next, the DSPb 105 executes one-dimensional IDCT processing in the horizontal direction at step S154. The transformation equation is the same as Equation (3) above.

When IDCT processing ends, the DSPb 105 inverts the status signal P102 at step S155, compares the status signals P101 and P102 at step S156 and waits for the state of the two signals to fail to agree. When the two signals no longer agree, the operational data is transmitted to the DSPb 105 at step S157. From this point onward the processing relating to this data is executed by the DSPa 104 through the procedure shown in FIG. 14B.

The DSPa 104 waits for the state of the status signals P101 and P102 to fail to agree at step S141. When the two signals no longer agree, the DSPa 104 receives operational data from the DSPb 105 and executes one-dimensional IDCT processing in the vertical direction at step S143. The transformation equation is the same as that of Equation (3) above.

When IDCT processing ends, the DSPa 104 restores sub-sampling, which prevailed at the time of encoding, at step S144. Next, at step S145, the DSPa 104 transforms the color space of the image data to color space on a line. For example, the transformation is made from YCbCr color space to a color space, such as CMYK color space, that is convenient for printing.

Next, at step S146, the DSPa 104 removes the blank spaces that were added on at the time of encoding, stores the image data in the image memory 103 and inverts the status signal P101 at step S147. The image data that has been stored in the image memory 103 is sent to the image printer 102, where the received image is printed out.

The foregoing describes the order of processing with regard to one block. In actuality, the DSPb 105 and DSPa 104 operate in parallel in accordance with pipeline processing. For example, when DSPa 104 is processing an N-th block, DSPb 105 is processing an (N+1)th block.

FIGS. 15A to 15D are timing charts illustrating an example of this parallel operation in decoding, in which FIG. 15A illustrates the contents of processing executed by the DSPb 105, FIG. 15B the state of the status signal P102, FIG. 15C the contents of processing executed by the DSPa 104 and FIG. 15D the state of the status signal P101.

In FIGS. 15A to 15D, the signals P101 and P102 initially are at the L level. The DSPb 105 executes Huffman decoding (S151), restoration of zigzag scanning (S152), inverse quantization (S153) and IDCT (S154) in the horizontal direction, and inverts the signal P102 at S155, after which it verifies that P101≠P102 holds at S156 and transmits data (S157). The DSPb 105 then proceeds to processing of the next block.

The DSPa 104 stands by (S141) until the signal P102 is inverted. At inversion of the signal P102, the DSPa 104 receives data (S142).

The DSPa 104 ends the processing of one block upon executing IDCT (S143) in the vertical direction, restoration of sub-sampling (S144), color-space transformation (S145) and blank removal (S146), and inverting the status signal P101 at step S147. The DSPa 104 then proceeds to processing of the next block. However, when P101≠P102 holds at S141, the DSPa 104 executes reception of the next item of data immediately (S142).

The above-described processing is repeated by the DSPb 105 and DSPa 104. The processing time which fluctuates most widely in each of these processing operations is that for Huffman decoding (S151). As a result, in a case where the Huffman decoding (S151) of DSPb 105 is prolonged and the status signal P102 has not been inverted at the moment blank removal (S47) performed by the DSPa 104 ends, the DSPa 104 stands by until P101≠P102 is established, as at S141 indicated by the "X" mark in FIG. 15C. More specifically, as in the manner of encoding processing, the DSPb 105 and DSPa 104 monitor each other's status signals, thereby becoming mutually synchronized to realize parallel processing.

Thus, in accordance with the second embodiments, as described above, the effects are substantially similar to those of the first embodiment. However, since the RAM 106 is not required, cost can be lowered correspondingly.

In accordance with the first and second embodiments of the present invention, there can be provided an image processing apparatus in which, by virtue of at least two digital signal processing means and intermediary means for mediating exchange of data between these digital signal processing means, image data that has been stored in first memory means is processed and stored in second memory means and code data that has been stored in the second memory means is processed and stored in the first memory means. For example, by executing pipeline processing using two DSPs, an effect obtained is higher image processing speed.

Though a plurality of DSPs are used in the above-described embodiments, similar processing can be realized using a plurality of CPUs and their peripherals.

Further, which of the plurality of steps necessary for encoding is executed by which DSP can be changed in a simple manner by modifying the program.

<Third Embodiment>

Figure 19:
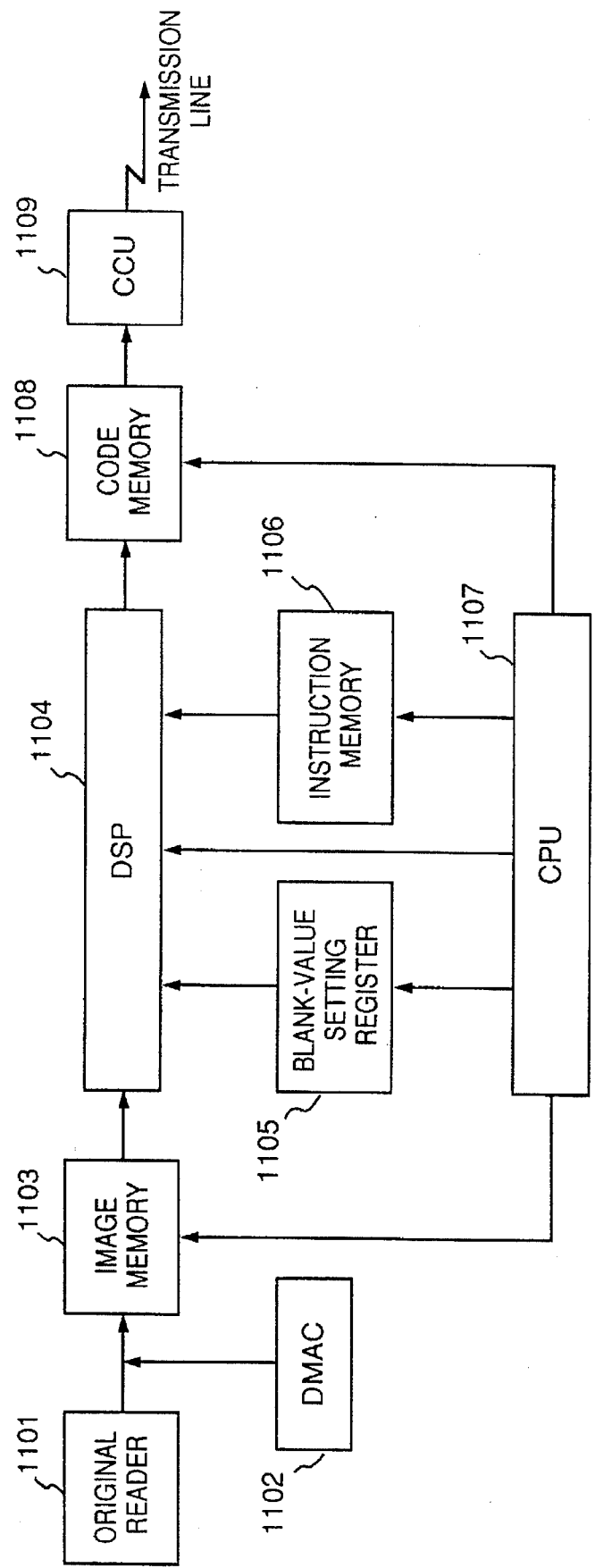
FIG. 19 is a block diagram showing an example of the construction of a color-image communication apparatus according to a third embodiment of the present invention.

FIG. 19 is a block diagram showing the construction of a color-image communication apparatus according to a third embodiment.

In FIG. 19, numeral 1101 denotes an original reader for reading image data of an original by a scanner or the like. Numeral 1102 denotes a direct memory-access controller (hereinafter referred to as a "DMAC") for transferring the image data, which has been read in by the original reader 1101, to an image memory 1103. The image memory 1103 stores the image data read in by the original reader 1101. Numeral 1104 designates a digital signal processor (hereinafter referred to as a "DSP") for subjecting the image data, which has been stored in the image memory 1101, to encoding processing. Numeral 1105 denotes a blank-value setting register for storing data added on as a blank space.

Numeral 1106 denotes an instruction memory for storing the processing program of the DSP 1104, 108 a code memory for storing data encoded by the DSP 1104, 1109 a circuit control unit (hereinafter referred to as a "CCU") for reading in the code data stored in the code memory 1108 and sending the code data to a communication transmission line, and 1107 a microprocessor (hereinafter referred to as a "main CPU") for controlling the image memory 1103, code memory 1108 and DSP 1104, writing data, which is added on as a blank space, in the blank-value setting register 1105 and downloading the processing program of the DSP 1104 to the instruction memory 1106.

Figure 20:
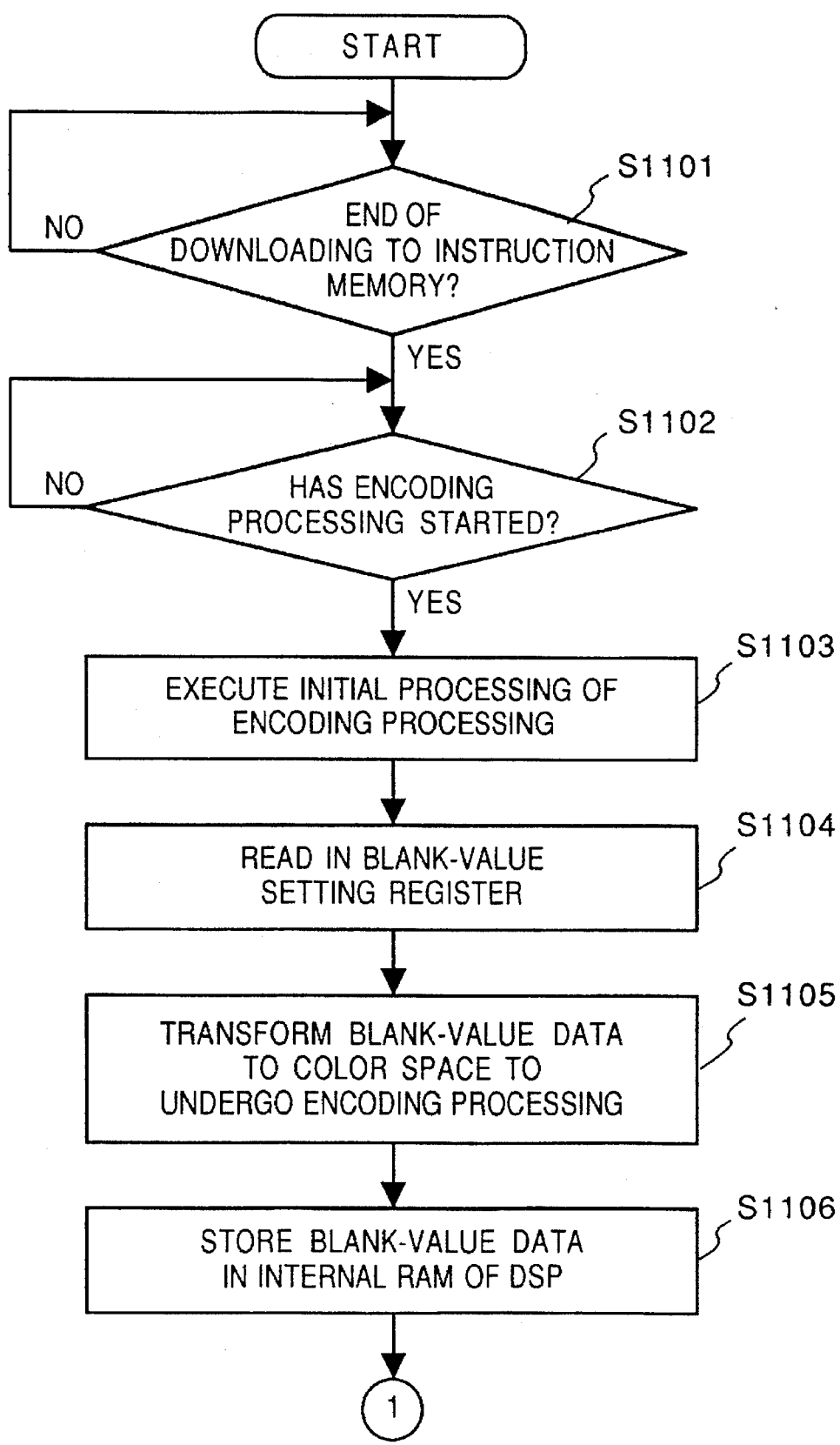
FIG. 20 is a flowchart showing an example of an encoding processing procedure according to the third embodiment.
Figure 21:
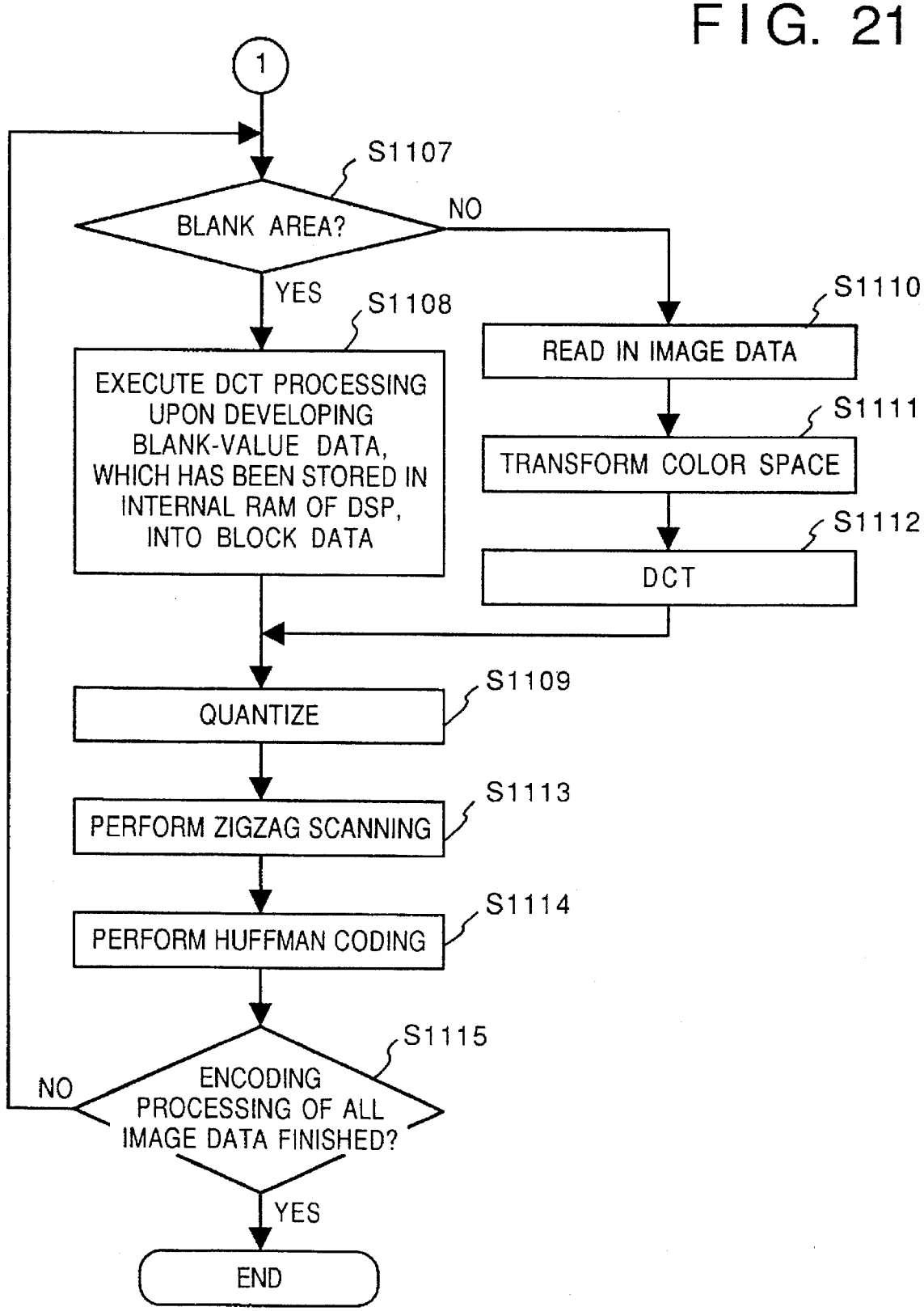
FIG. 21 is a flowchart showing an example of an encoding processing procedure according to the third embodiment.

Encoding processing according to the third embodiment in the arrangement set forth above will now be described in accordance with the flowcharts illustrated in FIGS. 20 and 21.

At system start-up, the main CPU 1107 downloads the processing program of the DSP 1104 to the instruction memory 1106 and simultaneously writes the blank-space data, which is added on as a blank space, in the blank-value setting register 1105. This is performed for each color component. For example, in a case where the data added on as a white area is "white", the color space read in by the original reader 1101 is red (R), green (G) and blue (B) and the data precision of each color signal is eight bits, R=G=B=255 (0FFH) is written in the blank-value register 1105.

Accordingly, when the processing program of the DSP 1104 is downloaded by the main CPU 1107 (step S1101), the DSP 1104 performs initial settings and holds encoding processing in the standby state. When the main CPU 1107 causes encoding processing to start (step S1102), the DSP 1104 executes initialization processing for encoding processing (step S1103). In a case where encoding processing is not started, the DSP 1104 continues to hold the encoding processing in the standby state.

Next, the DSP 1104 reads in the blank-space value set in the blank-value setting register 1105 (step S1104). In this example, the data R=G=B=255 (0FFH) is written in a memory such as an internal register of the DSP 1104. The DSP 1104 transforms the accepted blank-value data into data of a color space, such as YCbCb color space, to undergo encoding processing (step S1105), and stores the resulting data in an internal RAM of the DSP 1104 (step S1106). Further, in a case where the color space to undergo encoding processing is RGB color space, the blank-value data accepted from the blank-value setting register 1105 is stored in the internal RAM of the DSP 1104 and the subsequent processing is executed. That is, the processing of step S1106 is executed without executing the processing of step S1105.

In a case where the area to undergo encoding processing is a blank area (step S1107), the DSP 1104 forms the blank-value data, which has been stored in the internal RAM of the DSP 1104 by the above-mentioned processing, into data composed of block units of 8×8 pixels each and then executes the ensuing processing, namely DCT processing (step S1108). Next, the DSP 1104 quantizes the data that has been subjected to DCT processing (step S1109), rearranges the quantized data in a one-dimensional array by zigzag scanning (step S1113) and applies Huffman coding processing (S1114).

In a case where the encoding processing of all image data has ended, the DSP 1104 terminates encoding processing. In a case where encoding processing is in progress, however, processing is executed following return to step S1107. In a case where the area to undergo encoding processing is found not to be a blank area at step S1107, the DSP 1104 reads in the image data from the image memory 1103 in block units (step S1110). The image data that has been read in is converted to data in the color space to undergo encoding processing (step S1111).

In a case where the color space to undergo encoding processing is identical with the color space read in by the original reader 1110, the processing of step S1111 is not executed.

Next, the DSP 1104 applies DCT processing to the data composed of the block units processed at step S1110 or S1111 (step S1112) and successively executes the processing of quantization (step S1109), zigzag scanning (step S1113) and Huffman coding (step S1114) in the same manner as when the blank-value data was processed above.

Thereafter, the code data encoded by the DSP 1104 is written in the code memory 1108, the data is read out of the code memory 1108 by the CCU 1109 and is transmitted to the communication line. The DSP 1104 executes the processing of steps S1107~S1114 with regard to blank areas or image-data areas until the encoding of all image data is concluded. When the encoding processing of the entire image is terminated, the DSP 1104 again holds the encoding processing in the standby state.

Thus, in accordance with the third embodiment, the data of a blank-space area is subjected to DCT processing and the like using blank-value data that has undergone a color-space transformation in advance. Consequently, color-space transformation processing applied to data of blank-space areas is unnecessary. As a result, the number of processing steps, in the DSP processing program, necessary for transformation of color space is reduced and it is possible to shorten the time required for the encoding processing of all image data.

<Fourth Embodiment>

A fourth embodiment according to the present invention will now be described in detail with reference to the drawings.

Figure 22:
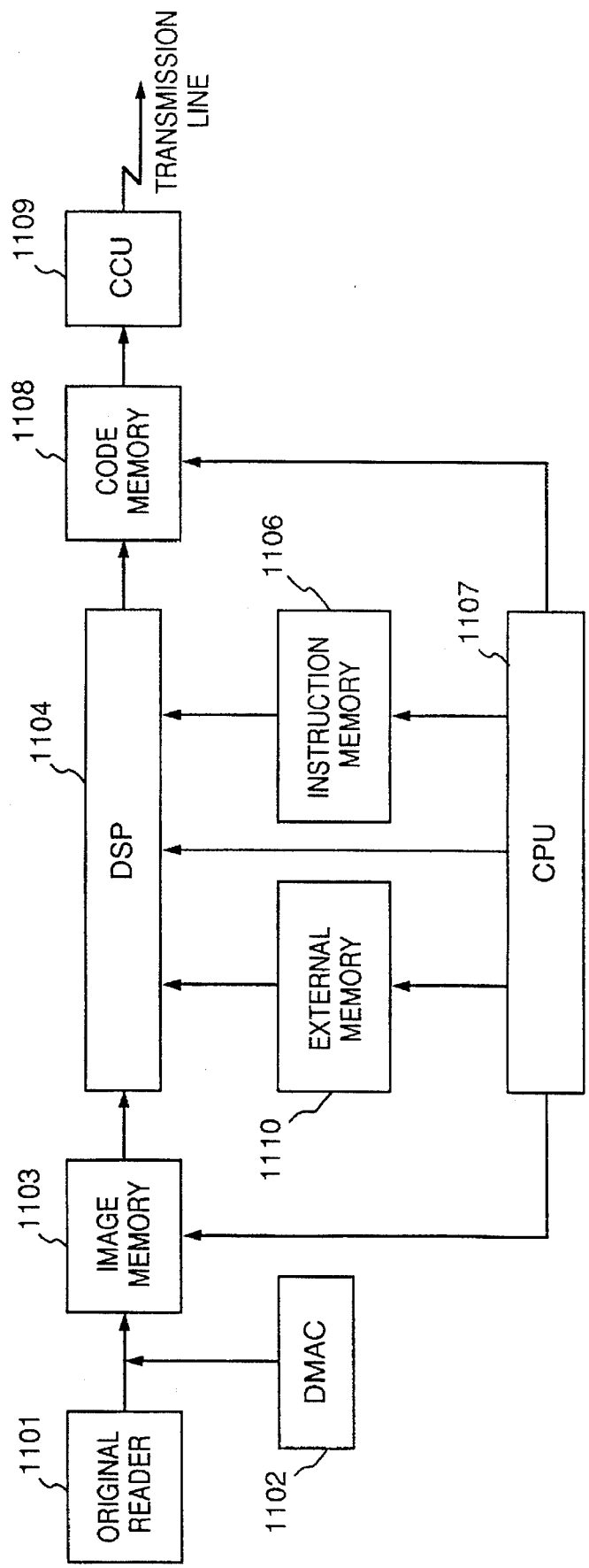
FIG. 22 is a block diagram showing an example of the construction of a color-image communication apparatus according to a fourth embodiment of the present invention.

FIG. 22 is a block diagram showing the construction of a color-image communication apparatus according to a fourth embodiment. Components identical with those shown in FIG. 19 are designated by like reference characters and need not be described again.

In FIG. 22, numeral 1110 denotes an external memory for storing data that has been subjected to processing for color-space transformation of blank-space values and to DCT processing. The external memory 1110 is a memory capable of being accessed at high speed by the main CPU 1107 and DSP 11004.

Figure 23:
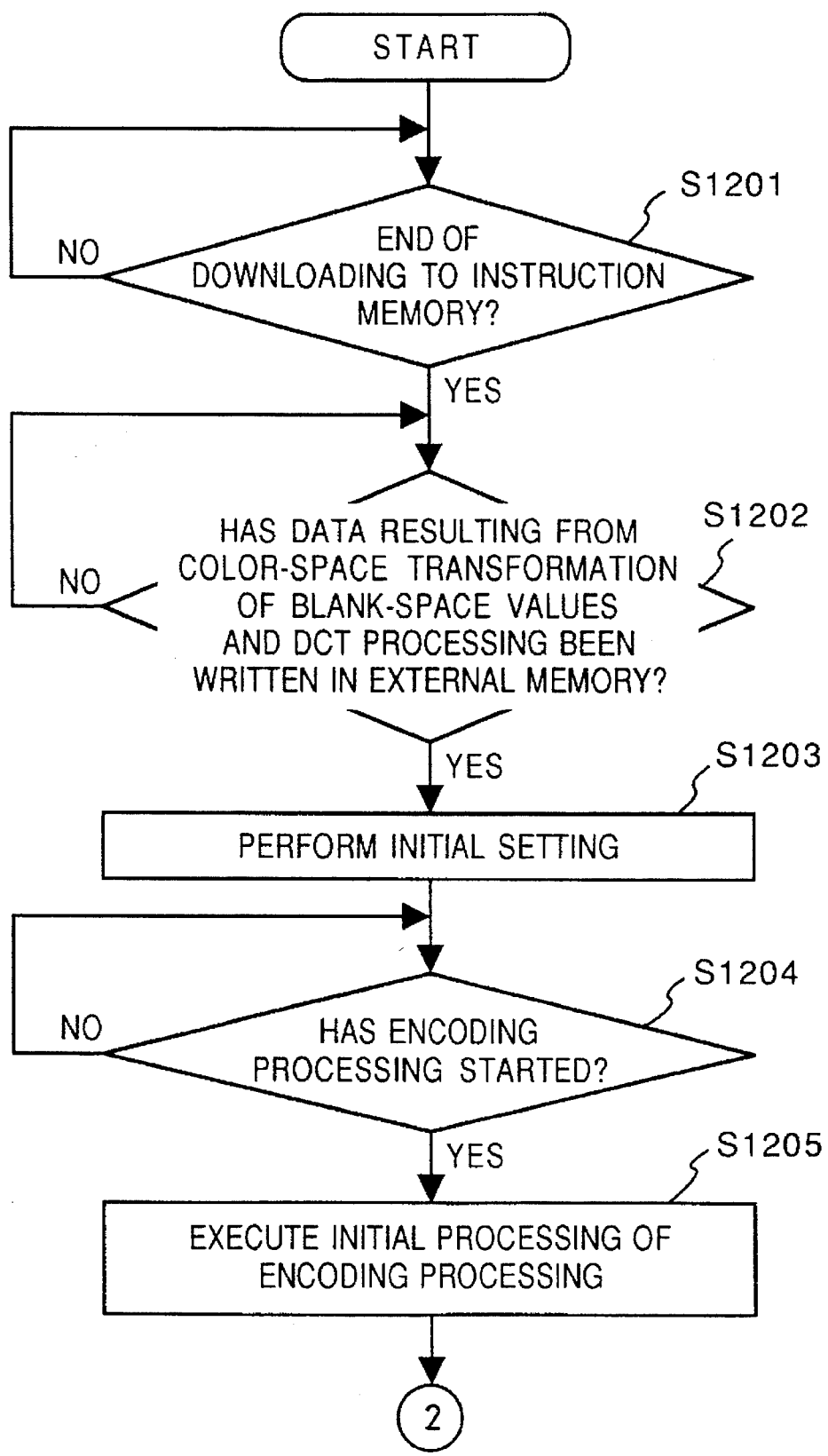
FIG. 23 is a flowchart showing an example of an encoding processing procedure according to the fourth embodiment.
Figure 24:
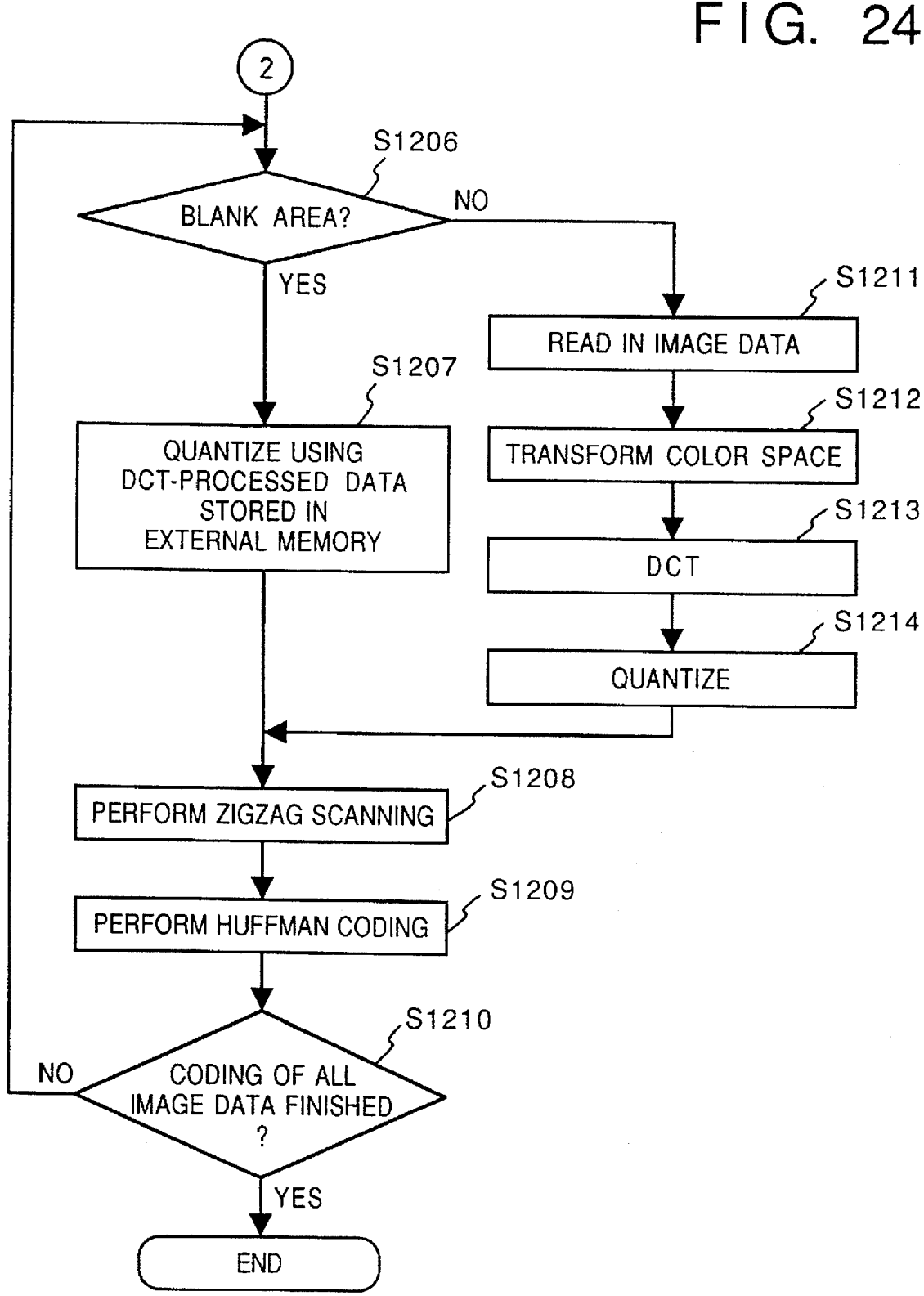
FIG. 24 is a flowchart showing an example of an encoding processing procedure according to the fourth embodiment.

Encoding processing according to the fourth embodiment in the arrangement set forth above will now be described in accordance with the flowcharts illustrated in FIGS. 23 and 24.

At system start-up, the main CPU 1107 downloads the processing program of the DSP 1104 to the instruction memory 1106 and simultaneously writes the add-on data, which has been subjected to processing for color-space transformation of blank-space values and to DCT processing, in the external memory 1110. This is performed for each color component.

Accordingly, when downloading of the processing program of the DSP 1104 by the main CPU 1107 is concluded (step S1201) and the data subjected to processing for color-space transformation of blank-space values and to DCT processing has been written in the external memory 1110 (step S1202), the DSP 1104 performs initial settings (step S1203) and holds encoding processing in the standby state. When the main CPU 1107 causes encoding processing to start as by an interrupt (step S1204), the DSP 1104 executes initialization processing for encoding processing (step S1205). In a case where encoding processing is not started, the DSP 1104 continues to hold the encoding processing in the standby state.

In a case where the area to undergo encoding processing is a blank area (step S1206), the DSP 104 executes the ensuing processing, in the JPEG coding method, using the data, which has been subjected to processing for color-space transformation of blank-space values and to DCT processing, written in the external memory 1110 by the CPU 1107. Specifically, the DSP 1104 reads in the DCT-processed blank-value data from the external memory 1110 for each and every color signal, applies quantization to the read-in data (step S1207), rearranges the two-dimensionally arrayed data in a one-dimensional array by zigzag scanning (step S1208) and executes Huffman coding processing (step S1209).

In a case where the encoding processing of all image data has ended, the DSP 1104 terminates encoding processing. In a case where encoding processing is in progress, however, processing returns to step S1206 to continue the encoding processing (step S1210). In a case where the area to undergo encoding processing is found not to be a blank area at step S1206, the DSP 1104 reads in image data, in block units, read in the original character reader 1101 and transferred to the image memory 1103 by the DMAC 1102 (step S1211). The image data that has been read in is converted to data in the color space to undergo encoding processing (step S1212).

Next, the DSP 1104 applies DCT processing (step S1213) to the image data that has undergone the color-space transformation and then performs quantizing (step S1214). The DSP 1104 successively applies the processing of zigzag scanning (step S1208) and Huffman coding (step S1209) to the quantized data in the same manner as when the blank-value data was processed above.

Thereafter, the code data encoded by the DSP 1104 is written in the code memory 1108, the data is read out of the code memory 1108 by the CCU 1109 and is transmitted to the communication line. The DSP 1104 executes the processing of steps S1206–S1210 with regard to blank areas or image-data areas until the encoding of all image data is concluded. When the encoding processing of the entire image is terminated, the DSP 1104 again holds the encoding processing in the standby state.

In the fourth embodiment, the apparatus is described in relation to a method in which the main CPU 1107 writes the data, which has been subjected to processing for color-space transformation of blank-space values and to DCT processing, in the external memory 1110. However, an arrangement may be adopted in which, when the color space to be encoded by the DSP 1104 is identical with the color space read in by the original reader 1101, the data obtained by applying DCT processing to the blank-value data is written in the external memory 1110 by the main CPU 1107.

<Fifth Embodiment>

A fifth embodiment according to the present invention will now be described in detail with reference to the drawings.

According to the fourth embodiment, the main CPU 1107 writes the data, which has been subjected to processing for color-space transformation of blank-space values and to DCT processing, in the external memory 1110, and the DSP 1104 encodes the blank areas using this data. However, it is possible to perform similar processing by a method other than this method.

Figure 25:
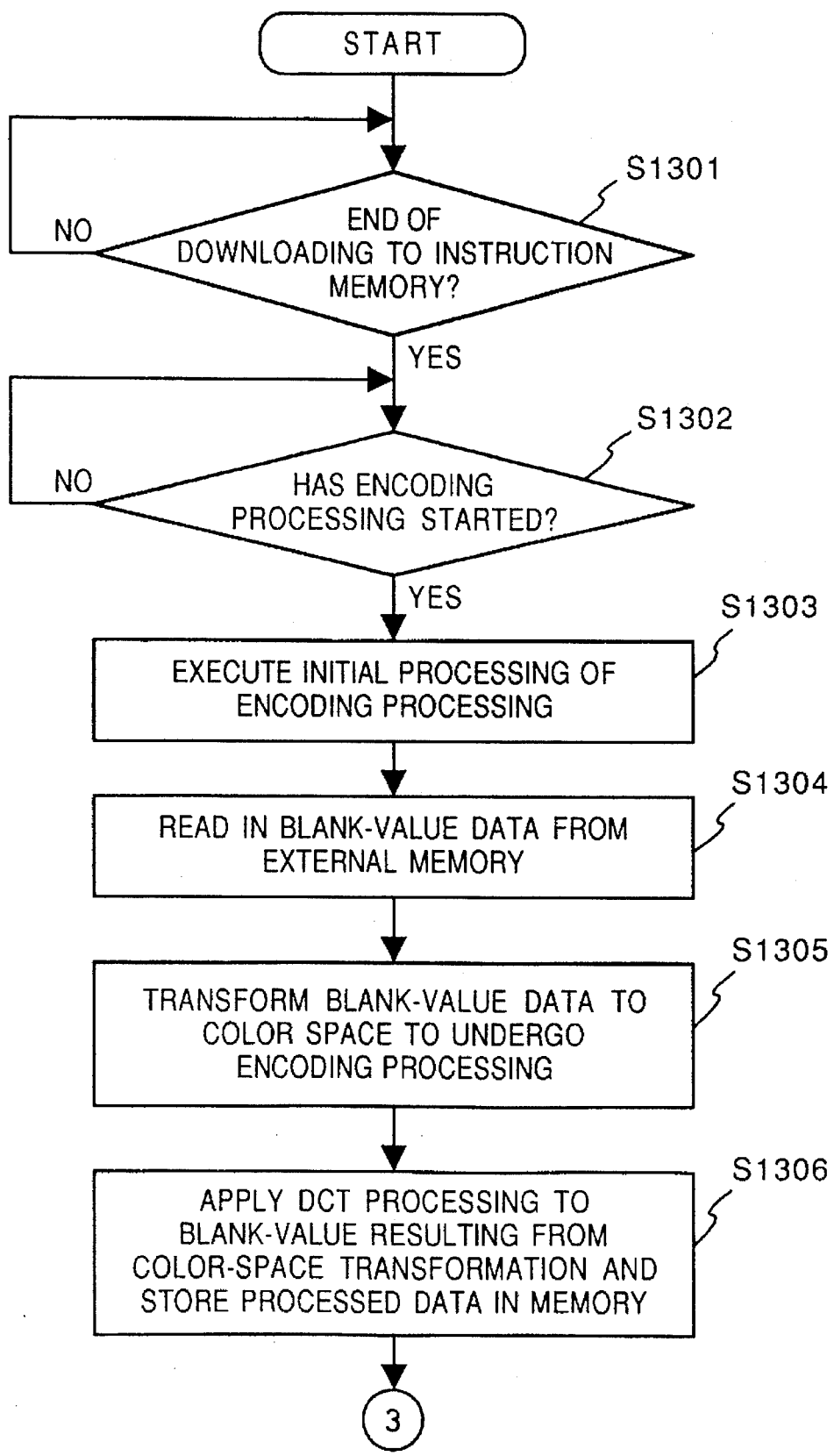
FIG. 25 is a flowchart showing an example of an encoding processing procedure according to the fourth embodiment.
Figure 26:
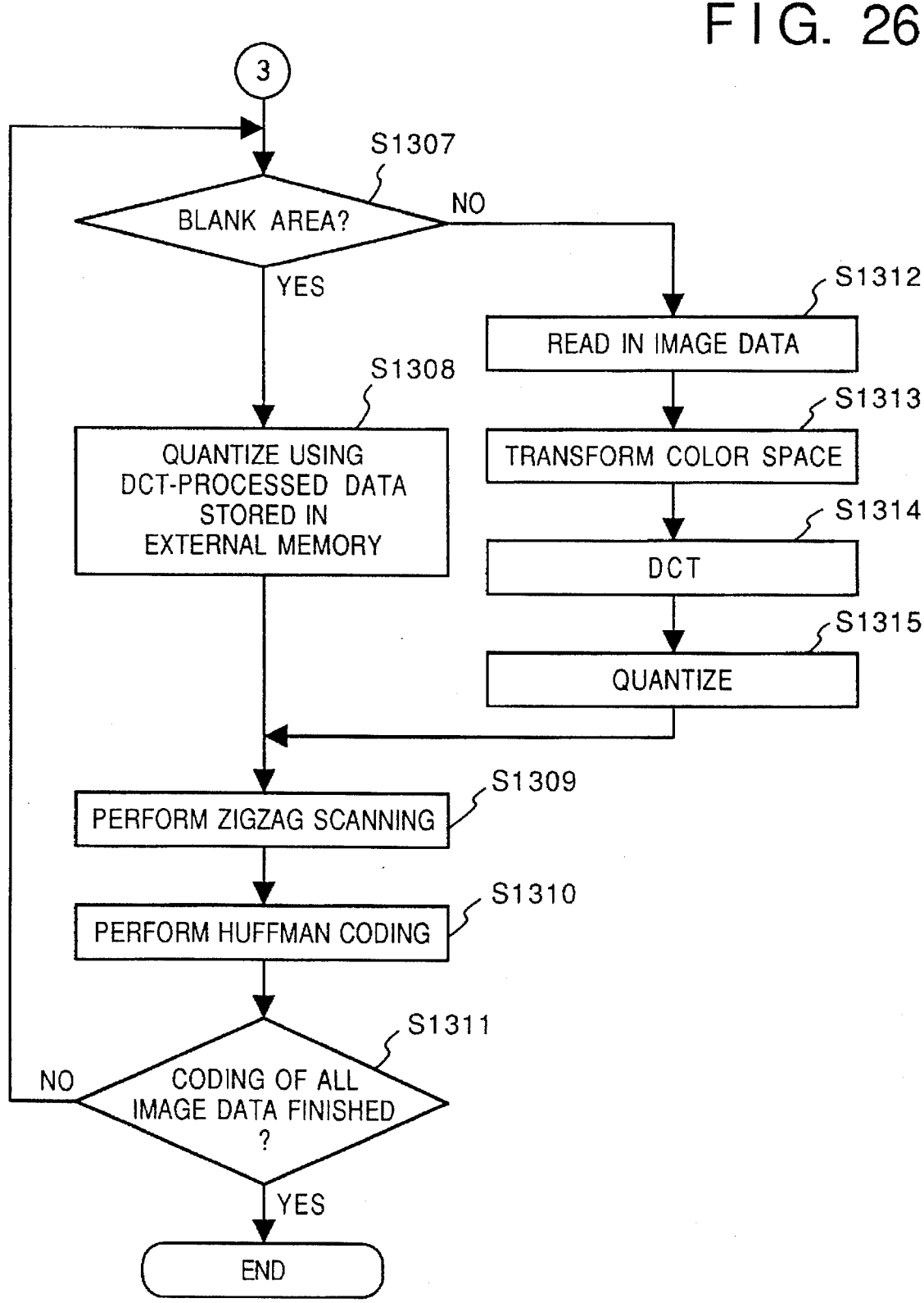
FIG. 26 is a flowchart showing an example of an encoding processing procedure according to the fourth embodiment.
Figure 27:
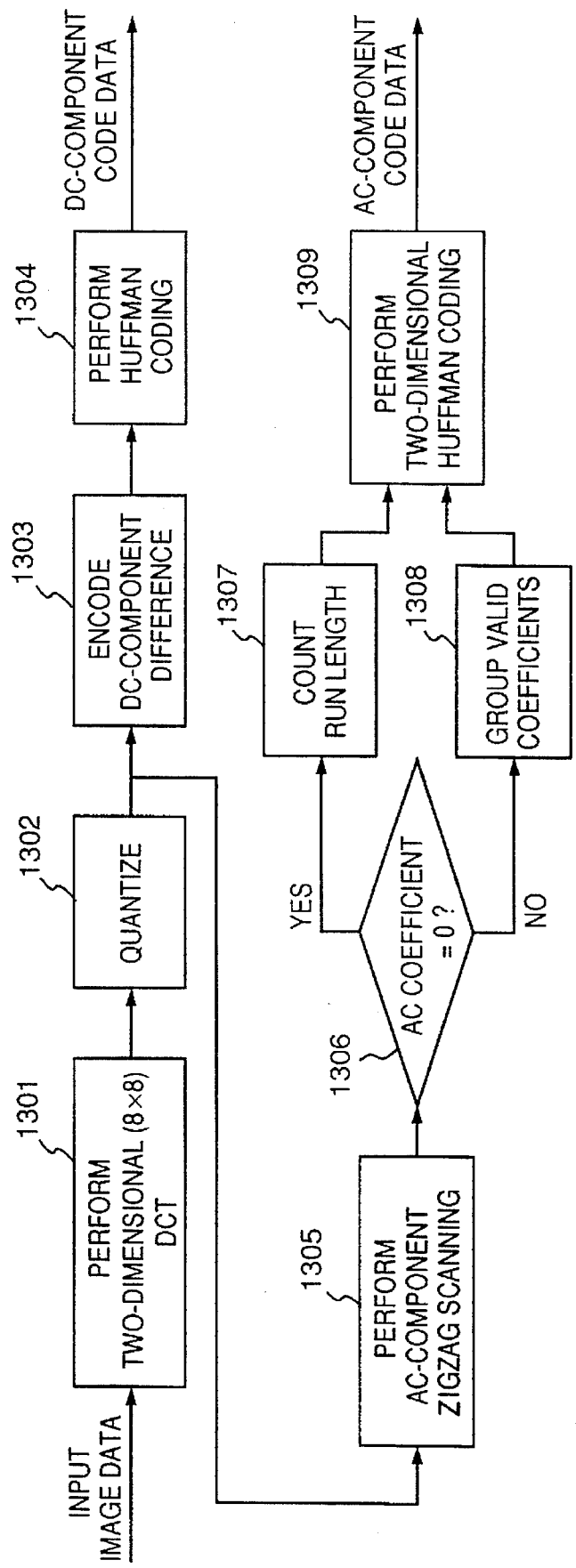
FIG. 27 is a processing block diagram at the time of encoding according to the JPEG coding method.

Encoding processing according to the fifth embodiment will now be described in accordance with the flowcharts illustrated in FIGS. 25 and 26.

At system start-up, the main CPU 1107 downloads the processing program of the DSP 1104 to the instruction memory 1106 and simultaneously writes the blank-space data, which is added on as a blank space, in the blank-value setting register 1105. This is performed for each color component. For example, in a case where the data added on as a white area is "white", the color space read in by the original reader 1101 is red (R), green (G) and blue (B) and the data precision of each color signal is eight bits, R=G=B=255 (OFFH) is written in the external memory 1110.

Accordingly, when the processing program of the DSP 1104 is downloaded by the main CPU 1107 (step S1301), the DSP 1104 performs initial settings and holds encoding processing in the standby state. When the main CPU 1107 causes encoding processing to start as by an interrupt (step S1302), the DSP 1104 executes initialization processing for encoding processing (step S1303). In a case where encoding processing is not started, the DSP 1104 continues to hold the encoding processing in the standby state.

Next, the DSP 1104 reads in the blank-space value set in the external memory 1110 (step S1304). In this example, the data R=G=B=255 (OFFH) is accepted in a memory such as an internal register of the DSP 1104. The DSP 1104 transforms the accepted blank-value data into data of a color space to undergo encoding processing (step S1305), and stores the resulting data in an internal RAM of the DSP 1104. At this time the R, G, B data of the blank spaces read in at the preceding stage may be erased. In other words, it will suffice if the blank-space data that has undergone color-space transformation is stored in the internal RAM of the DSP 1104. Further, in a case where the color space to undergo encoding processing is RGB color space, the blank-value data accepted from the blank-value setting register 1105 is stored in the internal RAM of the DSP 1104 and the subsequent processing is executed. That is, the processing of step S1106 is executed without executing the processing of step S1105. The DSP 1104 develops the stored blank-value data into block data, which is the unit of subsequent encoding processing, for each and every color component and then applies DCT processing to the developed data. The blank-space data resulting from DCT processing is stored by the DSP 1104 in the external memory 1110, which is capable of being accessed at high speed by the DSP 1104 (step S1306).

The processing from step S1307 is similar to the processing from step S1206 onward in the fourth embodiment. Accordingly, the DSP 1104 performs subsequent processing under conditions similar to those of the second embodiment.

Specifically, the DSP 1104 executes the processing of steps S1307~S1315 with regard to blank areas or image-data areas until the encoding of all image data is concluded. Thereafter, the code data encoded by the DSP 1104 is written in the code memory 1108, the data is read out of the code memory 1108 by the CCU 1109 and is transmitted to the communication line. When the encoding of all image data is concluded, the DSP 1104 again holds the encoding processing in the standby state.

In the description of the third embodiment, it is so arranged that the DSP 1104 applies color-space transformation processing and DCT processing to the blank-space data that has been set in the external memory 1110 and then writes the data resulting from processing in the external memory 1110. However, in a case where the color space to be encoded by the DSP 1104 is the same as the color space read in by the original reader 1101, it may be so arranged that the result obtained by applying only DCT processing to the blank-space data that has been set in the external memory 1110 is written in the external memory 1110 by the DSP 1104.

Thus, in accordance with the fourth and fifth embodiments, when encoding processing based upon the JPEG coding method is carried out, the data of a blank-space area is subjected to quantization, zigzag scanning and Huffman coding processing using blank-value data that has undergone color-space transformation processing and DCT processing in advance. Consequently, color-space transformation processing and DCT processing applied to data of blank-space areas is unnecessary. As a result, the number of steps, in the DSP processing program, necessary for color-space transformation processing and DCT processing is reduced. This makes it possible to shorten the time required for the encoding processing of all image data.

In accordance with the present invention as described above, data representing blank areas added on to color image data is stored and the stored data is used to perform encoding separate from that of color image data, thereby making possible the high-speed encoding of all image data.

<Sixth Embodiment>

Figure 28:
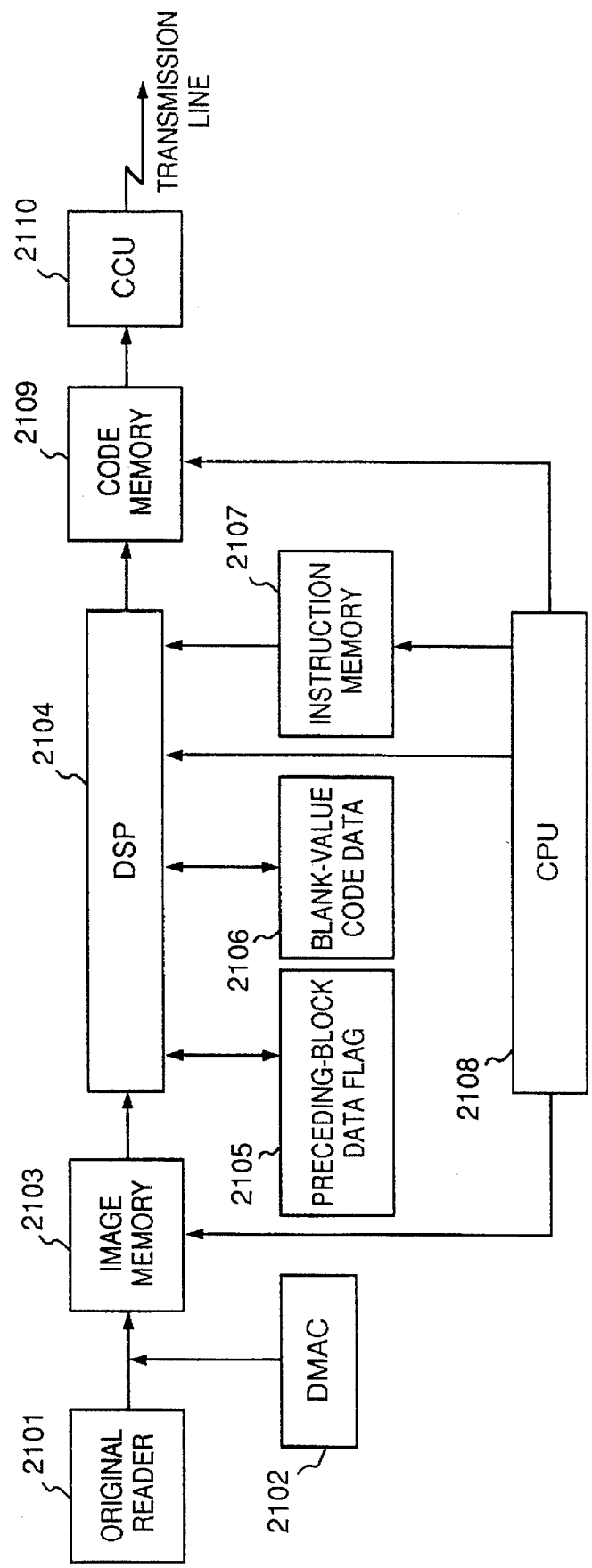
FIG. 28 is a block diagram showing the construction of an embodiment according to the present invention.

FIG. 28 is a block diagram showing the construction of an embodiment according to the present invention. In FIG. 28, numeral 2101 denotes an original reader for reading image data of an original by a scanner or the like, 2103 an image memory for storing color image read by the original reader 2101, 2102 a direct memory-access controller (hereinafter referred to as a "DMAC") for transferring the color image data, which has been read in by the original reader 2101, to the image memory 2103, and 2104 a digital signal processor (hereinafter referred to as a "DSP") for performing encoding processing.

Numeral 2105 denotes a preceding-block data flag register for storing the data constitution of the block preceding the block to be subjected to encoding processing by the DSP 2104. Numeral 2106 designates a blank-value code memory for storing encoded data in a case where the image data of the block undergoing encoding processing is identical with the image data of the block preceding this block, 2107 an instruction memory for storing the processing program of the DSP 2104, 2109 a code memory for storing code data encoded by the DSP 2104, 2110 a circuit control unit (hereinafter referred to as a "CCU") for reading in the code data stored in the code memory 2109 and sending the code data to a communication transmission line, and 2108 a microprocessor (hereinafter referred to as a "main CPU") for controlling the image memory 2103, the DSP 2104 and the code memory 2109 and downloading the processing program of the DSP 2104 to the instruction memory 2107.

The contents of processing according to this embodiment having the foregoing construction will now be described in detail. In the description that follows, image data of a specific block shall be taken as being white image data.

Figure 29:
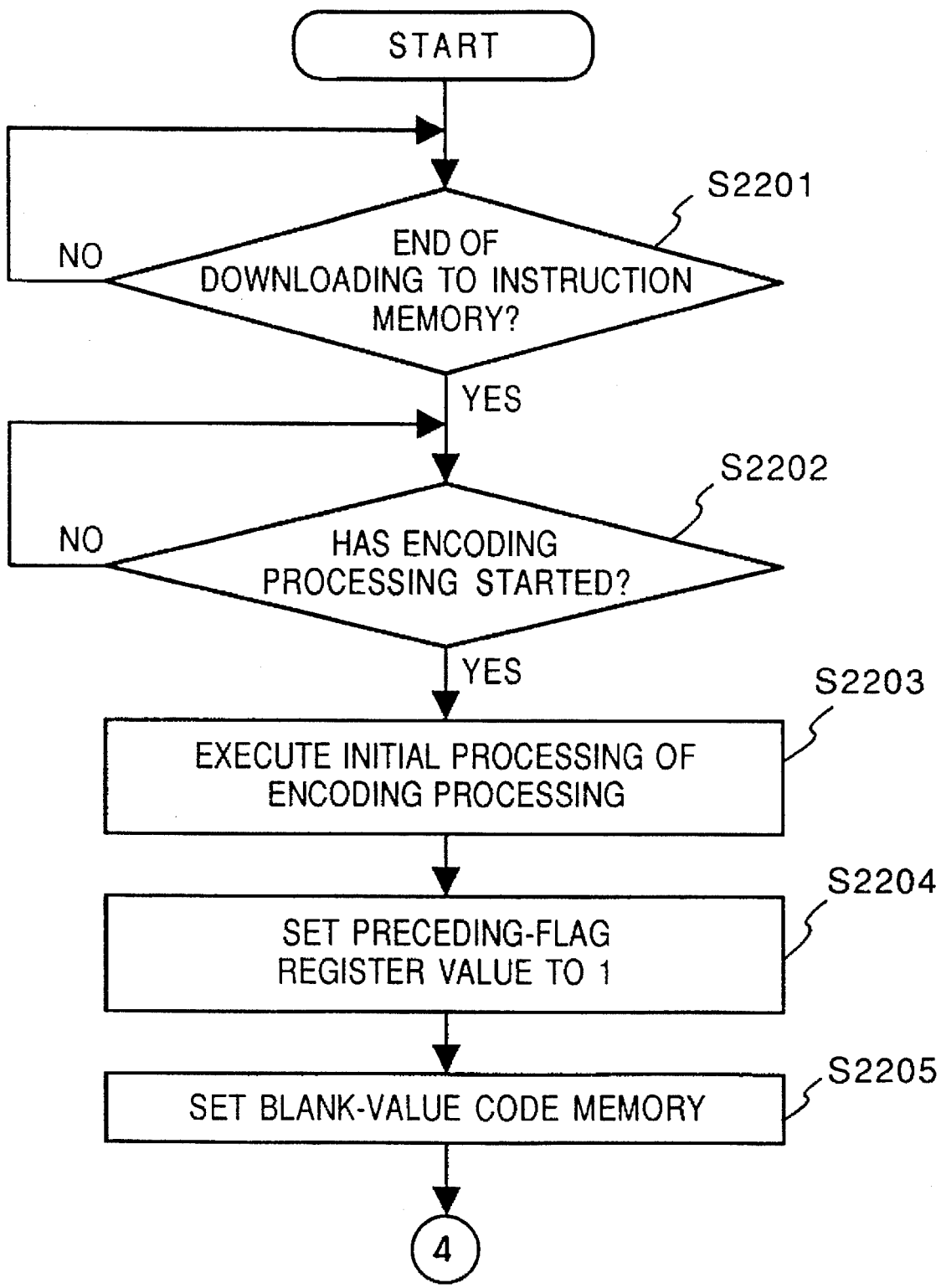
FIG. 29 is a flowchart showing encoding processing according to this embodiment.
Figure 30:
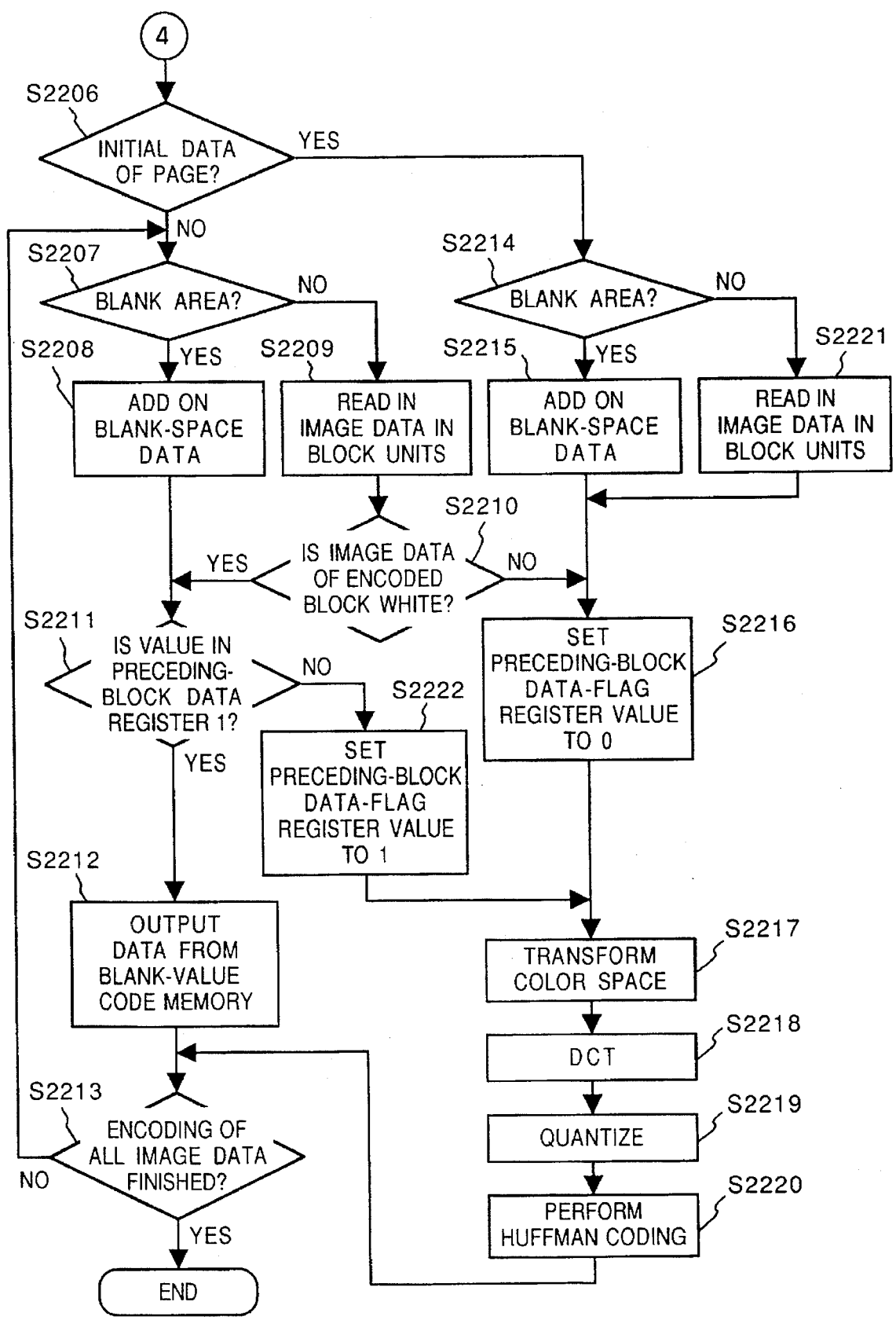
FIG. 30 is a flowchart showing encoding processing according to this embodiment.

FIGS. 29 and 30 are diagrams illustrating the processing steps of this embodiment. When the apparatus is started up in this embodiment, the main CPU 2108 downloads the processing program of the DSP 2104 in the instruction memory 2107 at the time of start-up.

When the processing program of the DSP 2104 is downloaded by the main CPU 2108, the DSP 2104 performs initial settings and holds encoding processing in the standby state. As a result, the program proceeds from step S2201 in FIG. 29 to step S2202, where the DSP awaits start-up of encoding processing in response to an interrupt or the like from the main CPU 2108.

When the main CPU 2108 causes encoding processing to start as by an interrupt, the program proceeds from step S2202 to step S2203, at which the DSP 2104 performs initial processing for encoding processing. That is, the DSP 2104 sets parameters, which are necessary for encoding processing, in the internal memory of the DSP 2104.

When the initial processing for encoding processing ends, the DSP 2104 sets "1" in the preceding-block data flag register 2105 at step S2204 and sets a code in the blank-value code memory 2106 for a case where the block data to undergo encoding processing is the same as the data of the preceding block. The program then proceeds to step S2206 shown in FIG. 30.

The code set in a case where the signals to undergo encoding processing are three in number and the form of encoding processing is block interleaving according to the JPEG coding method is a code obtained by connecting a code indicating that the DC difference of the first signal is (0), a code indicating that the AC components of the first signal are all (0) (EOB; end of block), a code indicating that the DC difference of the second signal is (0), a code indicating that the AC components of the second signal are all (0) (EOB), a code indicating that the DC difference of the third signal is (0) and a code indicating that the AC components of the third signal are all (0) (EOB).

In a case where the color space to undergo encoding processing is YCbCr and the Huffman table referred to at the time of encoding processing is one recommended by the JPEG, the codes connected are the code "00" indicating that the DC difference of the Y signal is (0), the code "1010" indicating that the AC components of the Y signal are all (0), the code "00" indicating that the DC difference of each of the Cb and Cr signals is (0), and the code "00" indicating that the AC components of each of the Cb and Cr signals are all (0). Accordingly, "00101000000000" is set in the blank-value code memory 106.

Figure 31:
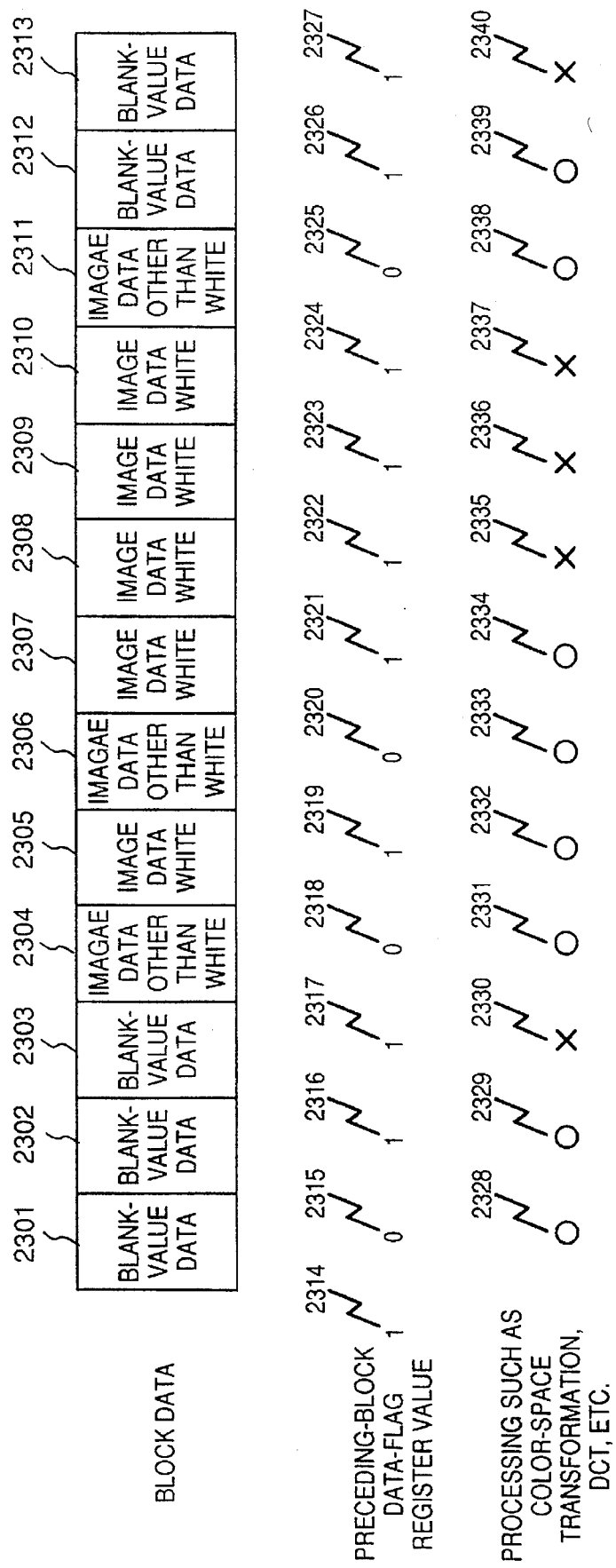
FIG. 31 is a diagram for describing an example of the contents of processing in this embodiment corresponding to the data in a block to undergo encoding processing.

The following description is also associated with FIG. 31, which is a diagram showing the composition block image data to be subjected to encoding processing. In FIG. 31, data indicated at 2301~2313 is block data (8×8 pixels) processed according to the JPEG coding method. Numeral 2314 denotes the initial value of the preceding-block data flag register 2105, and numerals 2315~2327 denote data values, which are stored in the preceding-block data flag register, after the encoding processing of the data indicated at 2301~2313.

Furthermore, numerals 2328~2340 indicate whether color-space transformation processing, DCT processing, quantizing processing and Huffman coding processing is performed at the time of encoding processing of each of the items of data 2301~2313. In this embodiment, in a case where the block image data to undergo encoding processing is all white image data or blank-space data, color-space transformation processing, DCT processing, quantizing processing and Huffman coding processing is not carried out if the value in the preceding-block data flag register 2105 at this time is "1". Further, the data of 2301 is assumed to be the initial data of the page to undergo encoding processing.

The processing executed by the DSP 2104 at step S2206 in FIG. 30 is for determining whether the data is the initial data of the page. Since the image data 2301 subjected to encoding processing is the initial data of the page, the program proceeds from step S2206 to step S2214, at which it is determined whether this data is blank-space data.

For example, if the initial data is blank-space data, as is the case with data of code 2301 in FIG. 31, the program proceeds to step S2215. In this embodiment, the add-on of the blank-space data is performed by the DSP 2104. Accordingly, the DSP 2104 generates one block (three signal components) of the blank-space data (white image data) at step S2215. As for the generated block image data of the blank space, the preceding-block data flag register 2105 is set to "0" (code 2315 in FIG. 31) by the DSP 2104 at the following step S2216.

If the initial data is found not to be a blank area at step S2214, on the other hand, the program proceeds to step S2221, where the image data that has been stored in the image memory 2103 by the original reader 2101 is read in block by block, upon which the program proceeds to step S2216.

Thereafter, processing similar to that applied to the image data read in by the original reader 2101, namely color-space transformation processing, is applied at step S2217. Then, in similar fashion, DCT processing is executed at step S2218, quantizing processing at step S2219 and Huffman coding processing at step S2220 (code 2328), after which the program proceeds to step S2213. Furthermore, the encoded data is written in the code memory 2109 by the DSP 2104.

It is then determined at step S2213 whether the encoding processing of all image data has ended. In a case where the encoding processing of all image data has not been concluded, the program proceeds to step S2207. If the encoding processing of all image data has ended, on the other hand, the DSP 2104 terminates the encoding processing and informs the main CPU 2108, as by an interrupt, of the fact that encoding processing has ended, and again holds the encoding processing in the standby state. In the case of FIG. 31, encoding processing of image data blocks from 2302 onward is required and therefore the program proceeds to the processing of step S2207.

It is determined at step S2207 whether the area is a blank area. In the example of FIG. 31, the data of 2302 is blank-space data and, hence, the program proceeds to step S2208, where the DSP 2104 generates one block (three signal components) of the blank-space data in the same manner as at step S2215. Next, at step S2211, it is determined whether the value of the preceding-block data flag register 2105 is "1" or not. In the example of FIG. 31, the value of the preceding-block data flag register 2105 is "0" in accordance with code 2315, and therefore the program proceeds from step S2211 to step S2222. Here the DSP 2104 sets the value of the preceding-block data flag register 2105 to "1" (code 2316). A transition is then made to the processing from step S2217 onward.

More specifically, the processing from color-space transformation processing to Huffman coding processing is executed in regular order (code 2329), the program returns from step S2213 to step S2207 and a transition is made to processing for encoding the image data of 2303. Since the image data of 2303 is blank-space data, the program proceeds from step S2207 to step S2208, where one block (three signal components) of blank-space data is generated in the encoding processing by the DSP 2104.

Now the image data to undergo encoding processing is blank-space data and the value in the preceding-block data flag register 2105 is "1" owing to code 2316. Consequently, in this case the DSP 2104 advances the program from step S2211 to step S2212, where the data that has been set in the blank-value code memory 2106 is outputted to the code memory 2109. The program then proceeds to step S2213.

In the example of FIG. 31, the encoding processing of all image data is still unfinished, and therefore the encoding processing by the DSP 2104 again proceeds to step S2207. Since the image data of 2304 is now blank-space data, the processing by the DSP 2104 proceeds from step S2207 to step S2209. Here the image data that has been stored in the image memory 2103 by the original reader 2101 is read in block by block. It is then determined at step S2210 whether all of the block image data read in is white data or not. If all of the block image data read in white data, then the program proceeds to step S2211, where the value in the preceding-block data flag register 2105 is verified. Processing is executed in regular order in accordance with the value verified. Specifically, if the value in the preceding-block data flag register 2105 is "0", the set value is changed to "1", after which the processing from the color-transformation processing of step S2217 to the Huffman coding processing of step S2220 is executed in order. If the value in the preceding-block data flag register 2105 is "1", the code data that has been set in the blank-value code memory 2106 is outputted to the code memory 2109 at step S2212.

If all of the block image data read in is found not to be white data at step S2210 (i.e., if the value in the preceding-block data flag register 2105 is "1"), the program proceeds to the processing of step S2216. Here the value in the preceding-block data flag register 2105 is set to "0" (code 2318) and processing is performed in order from the color-space transformation processing of step S2217 to the Huffman coding processing of step S2220 (code 2331).

Thus, by virtue of the foregoing control, the code data encoded by the DSP 2104 is stored successively in the code memory 2109. In accordance with the control performed by the CPU 2108, a communication channel is formed with another communication apparatus connected to the transmission line by the CCU 2110, and the code data read out and stored in the code memory 2109 is transmitted to the other party's apparatus via the communication line by means of the CCU 2110.

In the sixth embodiment described above, the code memory written by the CCU 2101 is constructed separately of the image memory written by the DSP 2104. However, it goes without saying that the teaching of this embodiment can be realized even if these memories are constructed as a single memory.

In accordance with the embodiment as described above, control is performed in such a manner that code data resulting from encoding processing executed in advance is outputted in a case where specific block image data (white image data) set at the start of encoding processing continues for two or more blocks. Consequently, color-space transformation processing, DCT processing, quantizing processing and Huffman coding processing applied to the set specific block image data (block data of a white image) becomes unnecessary. As a result, the number of steps necessary for the above-mentioned processing in the DSP processing program is reduced. This makes it possible to shorten the time needed for the encoding processing of all image data.

<Seventh Embodiment>

The foregoing description deals mainly with encoding processing. However, the present invention is not limited to the foregoing example. It is possible to simultaneously receive and decode encoded data from another apparatus and output the decoded data from an image output unit. A decoding processing section according to a seventh embodiment of the invention will now be described. In the seventh embodiment, components identical with those of the sixth embodiment shown in FIG. 28 are designated by like reference characters and need not be described again.

Figure 32:
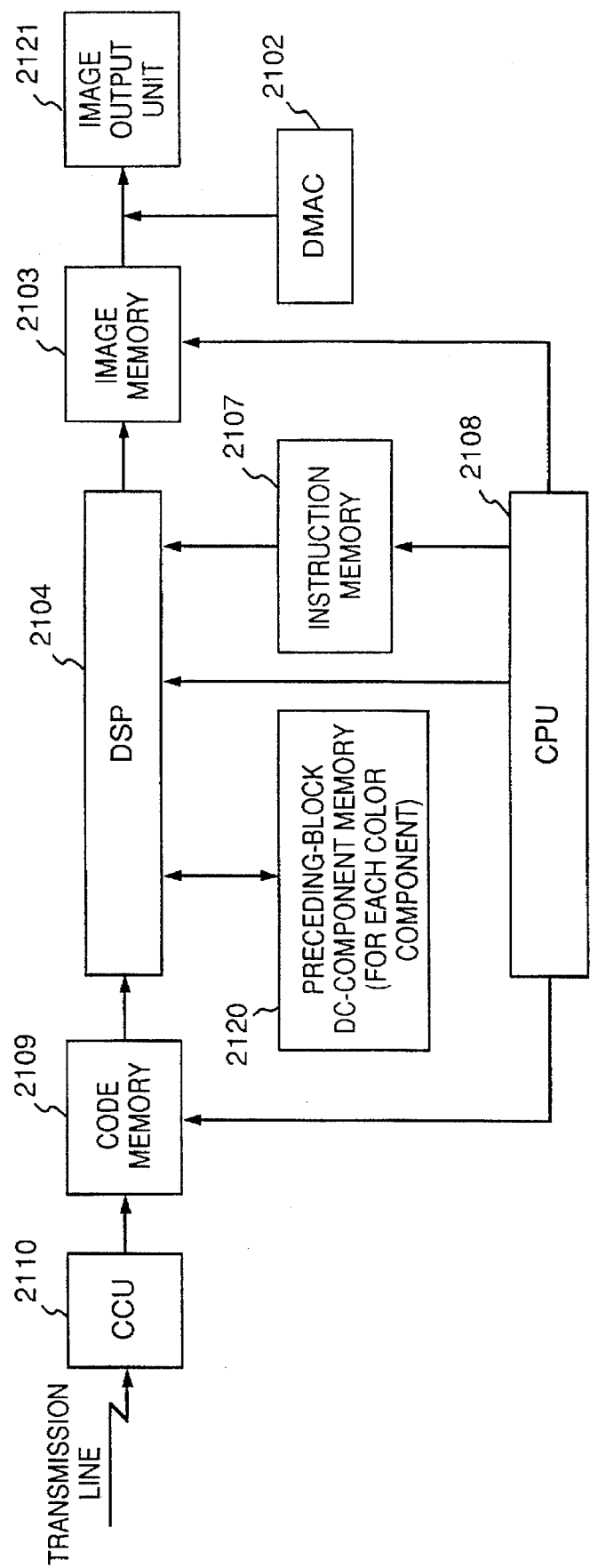
FIG. 32 is a block diagram showing the construction of a seventh embodiment according to the present invention.

FIG. 32 is a block diagram showing the construction of a seventh embodiment according to the present invention. In FIG. 32, the DMAC 2102, image memory 2103, DSP 2104, instruction memory 2107, CPU 2108, code memory 2109 and CCU 2110 are arranged in a manner that same as that shown in FIG. 28 and are used in decoding processing. However, the present invention is not limited to the foregoing example; an arrangement may be adopted in which the above-mentioned components are provided entirely separately.

In FIG. 32, numeral 2120 denotes a preceding-block DC-component memory for storing the DC difference value of each color signal of a block preceding the block undergoing decoding processing, and numeral 2121 denotes an image output unit for outputting a decoded image obtained by image data stored in the image memory 103.

The CCU 2110 receives code data from another apparatus, which data has been sent through a communication transmission line, in accordance with a prescribed communication control procedure and stores the data in the code memory 2109. The DSP 2104 reads in and decodes the code data that has been stored in the code memory 2109. The image memory 2103 stores the image data decoded by the DSP 2104. The DMAC 2102 transfers the image data stored in the image memory 2103 to the image output unit 2121.

The instruction memory 2107 stores the processing program of the digital signal processor 2104. The main CPU 2108 controls the code memory 2109, DSP 2104 and image memory 2103 and downloads the processing program of the DSP 2104 to the instruction memory 2107.

Figure 33:
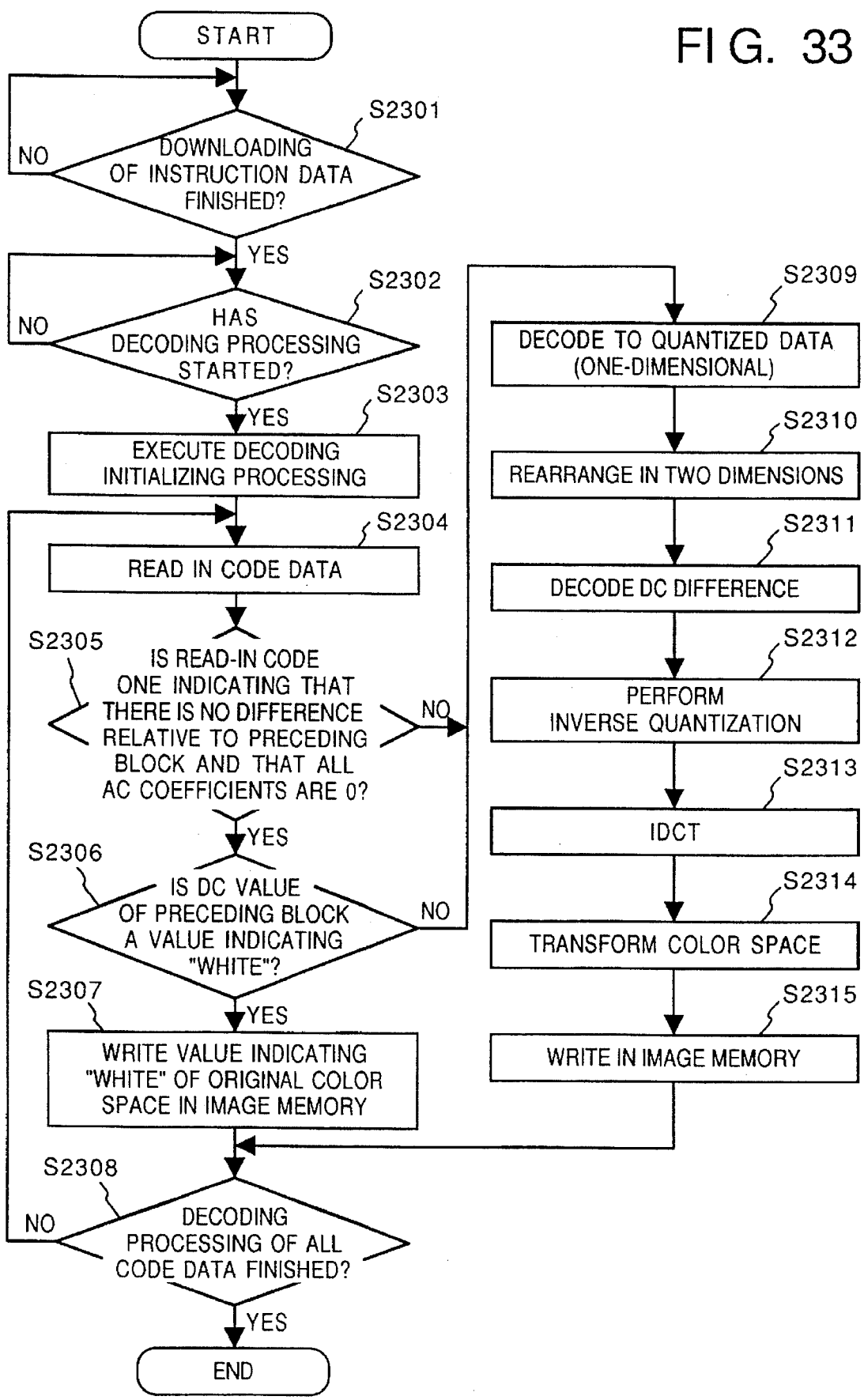
FIG. 33 is a flowchart showing decoding processing according to the seventh embodiment.

The operation of the seventh embodiment having the foregoing construction will now be described with reference to the flowchart of FIG. 33, which illustrates the decoding processing steps of the seventh embodiment.

At start-up of the apparatus according to this embodiment, the main CPU 2108 downloads the processing program of the DSP 2104 to the instruction memory 1207. When the processing program of the DSP 2104 is downloaded by the main CPU 2108, the processing of the DSP 2104 proceeds from step S2301 to step S2302, at which initial settings are made and the decoding processing is held in the standby state. When decoding processing is caused to start by the main CPU 2108 as by an interrupt, the program proceeds from step S2302 to step S2303, at which the DSP 2104 executes initial processing for decoding processing.

More specifically, the DSP 2104 sets, in the internal memory of the DSP 2104, the parameters necessary for decoding processing as well as a code indicating that the DC difference between the block undergoing decoding processing and the preceding block is (0) and that all coefficients of the AC components are (0). The code set in a case where the signals to undergo decoding processing are three in number and the form of decoding processing is block interleaving according to the JPEG coding method, is a code obtained by connecting a code indicating that the DC difference of the first signal is (0), a code indicating that the AC components of the first signal are all (0) (EOB; end of block), a code indicating that the DC difference of the second signal is (0), a code indicating that the AC components of the second signal are all (0) (EOB), a code indicating that the DC difference of the third signal is (0) and a code indicating that the AC components of the third signal are all (0) (EOB).

In a case where the color space to undergo decoding processing is YCbCr and the Huffman table referred to at the time of decoding processing is one recommended by the JPEG, the codes connected are the code "00" indicating that the DC difference of the Y signal is (0), the code "1010" indicating that the AC components of the Y signal are all (0), the code "00" indicating that the DC difference of each of the Cb and Cr signals is (0), and the code "00" indicating that the AC components of each of the Cb and Cr signals are all (0). Accordingly, the code set in this example is "00101000000000". An example of this code is illustrated in FIG. 34.

The description below is rendered on the assumption that the color space to be subjected to decoding processing is YCbCr color space.

At the end of initial processing for decoding at step S2303, the DSP 2104 starts reading in the code data, which has been stored in the code memory 2109, at step S2304. This is followed by step S2305, at which it is determined whether the code read in is the set code, namely "00101000000000". The program proceeds to step S2309 in a case where the code read in is not the set code.

Ordinary decoding processing in accordance with the JPEG coding method is executed from step S2309 onward. Specifically, a restoration is made to quantized data (one-dimensional data) by Huffman decoding processing at step S2309, and the data is rearranged as two-dimensional data at the following step S2310. The DC component is subjected to difference decoding processing at step S2311, after which inverse quantizing processing is executed at step S2312, IDCT processing at step S2313 and color-space transformation processing at step S2314. The processing image data is then written in the image memory 2103 at step S2315, after which the program proceeds to step S2308. Here it is determined whether the decoding processing of all code data has ended. If the decoding processing of all code data has not ended, the program returns again to step S2304, where the code data is read in and subjected to decoding processing again.

If the decoding processing of all code data is found to have ended at step S2308, the DSP 2104 so informs the main CPU 2108 as by an interrupt and again holds coding or decoding processing in the standby state.

In a case where the code data read in at step S2305 is identical with the set code data, then the program proceeds to step S2306, where the DSP 2104 checks the set value in the preceding-block DC-component memory 2120 to determine whether there is code data in which the value in the preceding-block DC-component memory 2120 indicates "white". If the code data is not code data in which the value in the preceding-block DC-component memory 2120 indicates "white", the program proceeds to step S2309.

On the other hand, in a case where the set value of the DC component of each color signal in the preceding-block DC-component memory 2120 is a value indicating "white"

in transmission color space, the DSP 2104 advances the program to step S2307 without executing the processing of steps S2309 to S2314. At step S2307, one block of the signal indicating "white" according to the data in color space outputting the decoded image is written in the image memory 2103. This is performed for each signal component. For example, in a case where the color space in which the decoded image is outputted is red (R), green (G) and blue (B) and the data precision of each color signal is eight bits, "OFF"H is written in the image memory 2103 for R, G, B. The program then proceeds to step S2308.

The image data decoded by the decoding processing of the DSP 2104 and stored in the image memory 2103 is transferred from the image memory 2103 to the image output unit 2121 under the control of the DMAC 2102. The image output unit 2121 successively outputs the transferred image data as a decoded image.

In the seventh embodiment described above, the code memory written by the CCU 2101 is constructed separately of the image memory written by the DSP 2104. However, it goes without saying that the teaching of this embodiment can be realized even if these memories are constructed as a single memory.

In accordance with the seventh embodiment as described above, if the DC component (DC difference) of each color signal in the preceding block indicates "white" in the transmission color space in a case where DSP 2104 performing decoding processing has read in a code indicating that the DC difference with respect to the preceding block is (0) and that the AC components are all (0), one block of the image data representing "white" in the color space in which the decoding image is outputted is written in the image memory without execution of Huffman decoding processing, inverse quantizing processing, IDCT processing and color-space transformation processing. As a result, the number of steps necessary for the above-mentioned processing in the DSP processing program is reduced. This makes it possible to shorten the time needed for the decoding processing of all image data.

Further, though the invention is described above based upon the separate sixth and seventh embodiments, in an actual apparatus the overall arrangement is such that the aforementioned operations are capable of being performed in parallel simultaneously. For example, when reading from the original reader 2101 has started, the encoding processing of the sixth embodiment is executed and the read data is transmitted to another apparatus. When encoded data from another apparatus has been received by the CCU 2110, control is performed in such a manner that the decoding processing of the seventh embodiment is executed and the decoded image data is outputted by the image output unit 2121.

The foregoing embodiment can be applied to a system constituted by a plurality of devices such as an image scanner, host computer or printer, etc., or to an apparatus comprising a single device, such as a copier or image file. Furthermore, it goes without saying that the invention is applicable also to a case where the object of the invention is attained by supplying a program to a system or apparatus.

Thus, in accordance with the present invention as described above, a code for a case in which specific block image data (e.g., white data, etc.) continues for two blocks is set beforehand at the time of encoding processing by the digital signal processor that performs the encoding processing. As a result, if the set specific block data continues for two blocks or more, the set code data is used to perform encoding, thereby making it possible to curtail various ordinary encoding processing operations and perform processing at high speed.

This code data is utilized on the decoding side also to make high-speed processing possible. That is, if, at the time of decoding processing, the digital signal processor that performs decoding processing reads in a code for a case in which the difference between the DC component of the current block and the preceding block is zero and all AC components within the block are zero, then, when the value of the DC component of the preceding block is indicative of a specific color, the image data representing this specific color (e.g., "white") in the color space in which the decoded image is outputted is delivered as decoded image for each and every color signal. As a result, ordinary decoding processing can be curtailed and high-speed processing is made possible <Eighth Embodiment>

Figure 36:
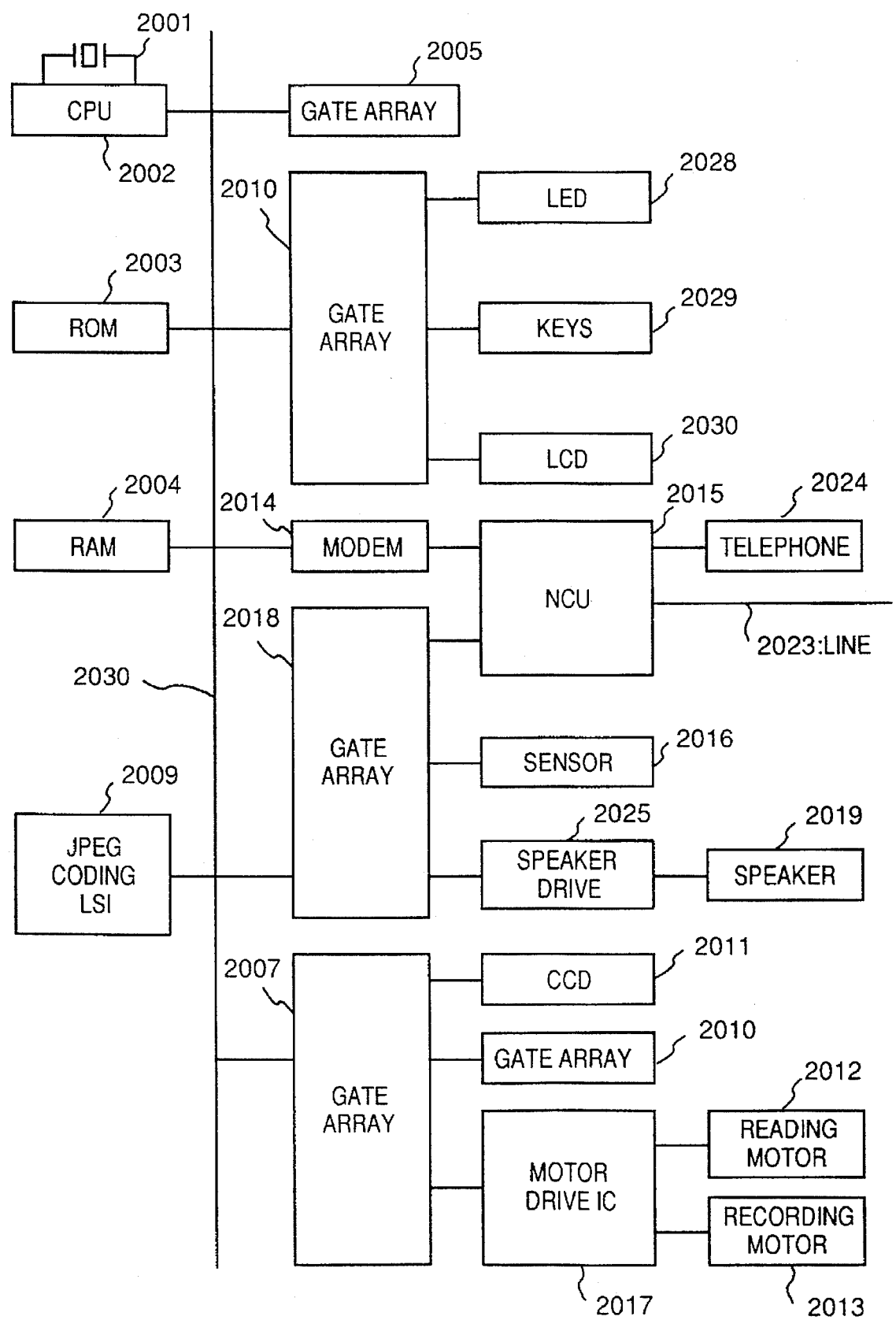
FIG. 36 is a block diagram showing the construction of a facsimile apparatus serving as a communication apparatus according to an embodiment of the present invention.

FIG. 36 is a block diagram illustrating the construction of a facsimile apparatus serving as a communication apparatus according to an embodiment of the present invention. In FIG. 36, numeral 200 denotes a central processing unit (CPU), which is connected to a ROM 2003 and a RAM 2004 via a bus 2030. A program for operating the CPU 2002 is stored in the ROM 2003. The CPU 2002 controls the operation of the overall apparatus in accordance with this program. The RAM 2004 is used as the work area of the CPU 2004. A quartz oscillator 2001 for generating the operating clock is connected to the CPU 2002.

The reader in the facsimile apparatus of this embodiment reads the image of an original mainly by a CCD line sensor 2001 and is equipped with a reading motor 2012. Further, an image recorder is constituted by a recording head 2010 comprising a thermal head, a recording motor 2013 and a motor driver IC2017 for driving the recording motor 2013. By using the reader and the image recorder, the facsimile apparatus records an image that has been received or an image that has been read.

A modem 2014, which modulates/demodulates image data and control procedure data, is connected to a line 2023 by a network control unit (NCU) 2015. The NCU maintains the loop current of the line 2023 or performs line exchange with respect to a telephone 2024. Numeral 2009 denotes a JPEG coding LSI. In order to execute JPEG coding, described later, the LSI internally incorporates a plurality of DSPs, as in the first embodiment set forth earlier.

Figure 37:
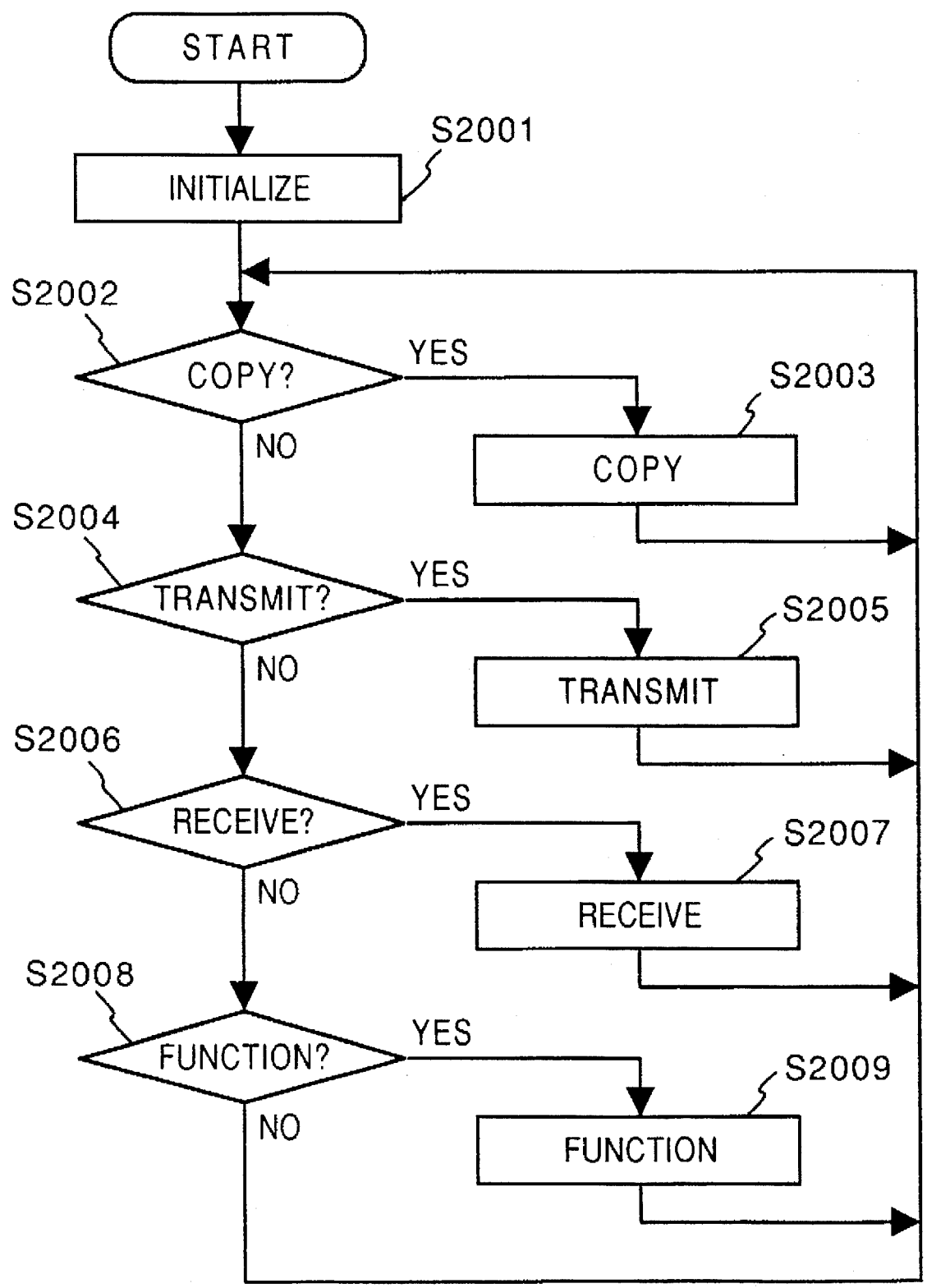
FIG. 37 is a general flowchart showing the communication control procedure of the facsimile apparatus according to this embodiment.

FIG. 37 is a general flowchart showing the communication control procedure of the facsimile apparatus according to this embodiment. When the power supply of the facsimile apparatus in FIG. 37 is turned on, the CPU 2002 initializes parameters at step S2001. Next, at steps S2002, S2004, S2006, S2008, the CPU 2002 determines whether copying, transmission or reception has been selected as the operating mode and whether a function has been selected, namely whether the apparatus has been started. On the basis of this decision, the CPU executes copying processing (step S2003), transmission processing (step S2005), reception processing (step S2007) and function processing (step S2009). For example, when an original is set in the apparatus and the CPU 2002 senses, via a gate array 2010, the fact that a single-touch key (not shown) constituting keys 2029 has been pressed at step S2004, the program proceeds to the transmission processing of step S2005.

Figure 38:
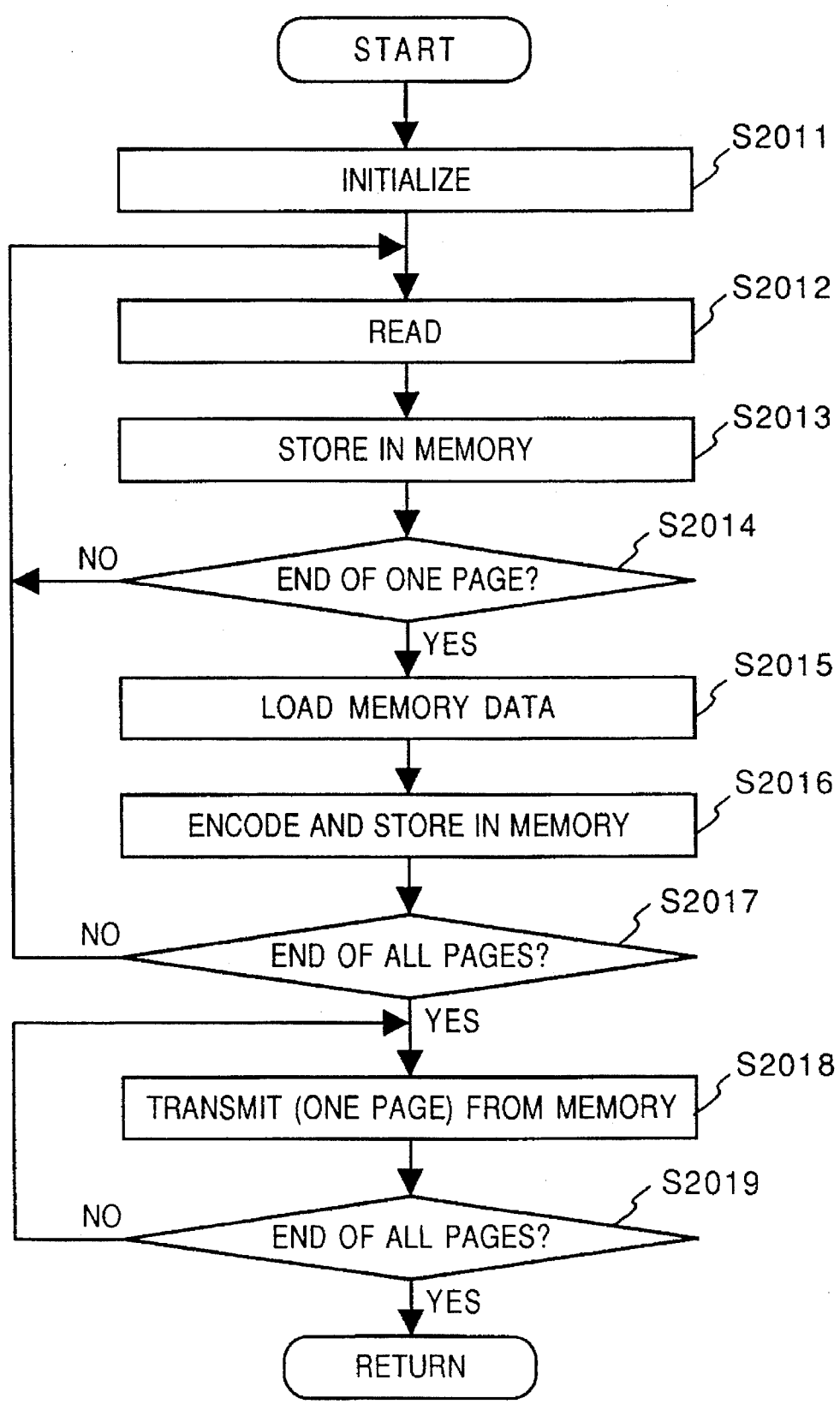
FIG. 38 is a detailed flowchart of transmission processing indicated at step S2005 in the communication control procedure illustrated in FIG. 37.

FIG. 38 is a detailed flowchart of transmission processing indicated at step S2005 in the communication control procedure illustrated in FIG. 37. In FIG. 38, the CPU 2002 initializes parameters at step S2011 and then executes the loop composed of steps S2012, S2013, S2014. Specifically, the CPU 2002 reads an image in single-page units and executes processing for storing the image information in memory. If the processing of one page ends, i.e., if the decision rendered at step S2014 is "YES", the CPU downloads memory data at step S2015 and executes coding and storage in memory at step S2016. At step S2017 the CPU checks whether the processing of all pages has ended.

It should be noted that whenever the processing of steps S2015 and S2016 is traversed, one page of image processing is performed.

If the processing of all pages has ended, then the program proceeds to step S2018, where processing for transmission from memory is executed in page units. Next, at step S2019, a check is performed to determine whether transmission from memory is finished. When it is judged that this processing is finished, return processing is executed.

Figure 39:
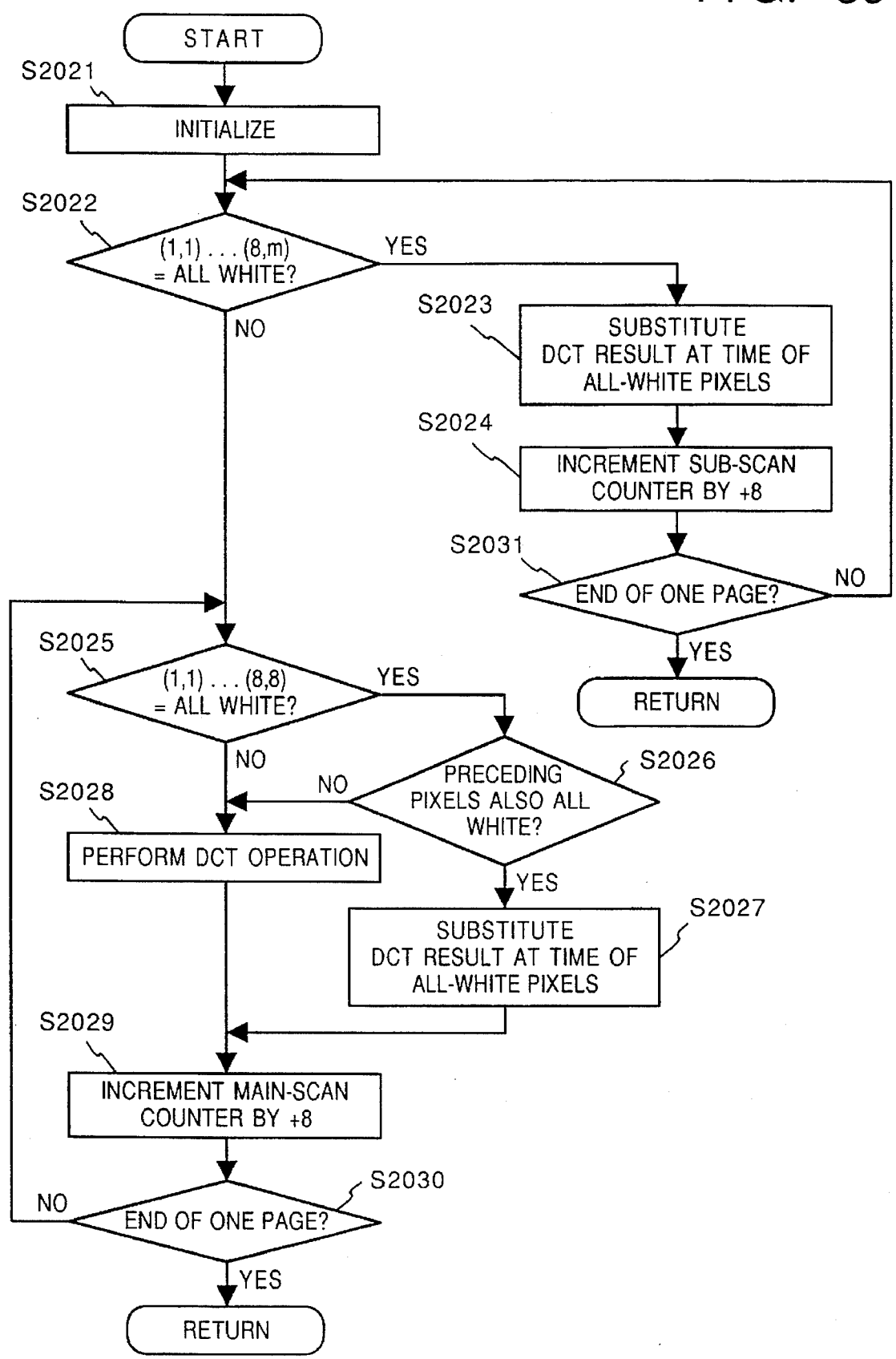
FIG. 39 is a detailed flowchart regarding judgment of end of page processing at step S2014 in the transmission processing procedure illustrated in FIG. 38.

FIG. 39 is a detailed flowchart regarding judgment of the end of page processing at step S2014 in the transmission processing procedure illustrated in FIG. 38. Further, FIGS. 40 and 41 are diagrams showing units of pixel groups when it is judged whether all original image data is white data (hereinafter referred to as "all white") or not. Each box corresponds to one pixel unit when a DCT operation is performed.

Parameters are initialized at step S2021 in FIG. 39, and it is determined at step S2022 whether eight lines of pixels in the main-scan direction of the image data are all white or not. This determination is performed with the group of pixels shown in FIG. 40 serving as the unit.

If the decision rendered at step S2022 is "YES", then processing proceeds to step S2023. Here values, stored in the ROM 2003 in advance, resulting from execution of a DCT operation in a case where eight lines of pixels in the main-scan direction are all white, are accumulated in memory. This is followed by step S2024, at which a sub-scan pointer serving as a control parameter is incremented by +8.

At step S2031, a check is made to determine whether the processing of one page is finished. If it is determined that the processing of one page is finished, then return processing is executed.

A check is performed at step S2025 to determine whether 8×8 pixels serving as the unit in JPEG coding are all white or not. At this time the group of pixels shown in FIG. 41 serves as the unit. If the result of the check is "YES", then a check is made at step S2026 to determine whether the 8×8 pixels (the unit in JPEG coding) immediately preceding the above-mentioned 8×8 pixels also are all white. If the decision rendered at step S2026 is "YES", then the results for the case in which the 8×8 pixels were all white, namely the values stored in the ROM 2003 in advance, are accumulated in memory at step S2027, after which processing proceeds to step S2029.

In a case where the 8×8 pixels currently undergoing processing are not all white (i.e., when the decision rendered at step S2025 is "NO"), or in a case where these pixels are all white but the immediately preceding 8×8 pixels are not all white, a well-known DCT operation is performed at step S2028 and the results of JPEG coding are accumulated in memory. The value of a main-scan pointer serving as a control parameter is incremented (by +8) at step S2029, after which a check is made at step S2030 to determine whether the processing of one page is finished. If it is determined that the processing of one page is finished, then return processing is executed.

Thus, according to the JPEG method, encoding is performed by applying a DCT operation to an 8×8 pixel block of the original image. However, in a case where the 8×8 pixel block of the original image is all white, the result of the DCT operation is already evident. Moreover, the probability that an all white portion will appear in the original is generally very high.

Accordingly, if the processing speed for encoding of an image portion having a very high probability of appearance, namely an all-white portion, is raised by executing processing in the manner described above, it will be possible to achieve a high processing speed for JPEG coding.

Further, according to this embodiment, the all-white judgment in block raster units and the all-white judgment in block units are performed in a stepwise fashion. In a case where all-white blocks continue for one line in the main-scan direction, therefore, coding can be performed in an extremely efficient manner.

Furthermore, according to this embodiment, the all-white judgment may be performed in units of one block raster (eight lines) or in units of plural block rasters [(8×n) lines].

In addition, according to this embodiment, it is determined at step S2026 whether the immediately preceding block is all white or not. If the determination is "NO", the DCT operation is performed. Accordingly, if the immediately preceding block is a color block and a DC difference has developed, normal encoding can be performed without making a substitution.

Even if the immediately preceding block is a color block, normal encoding can be performed by resetting the immediately preceding coefficient using a restart marker code at step S2023.

Figure 42:
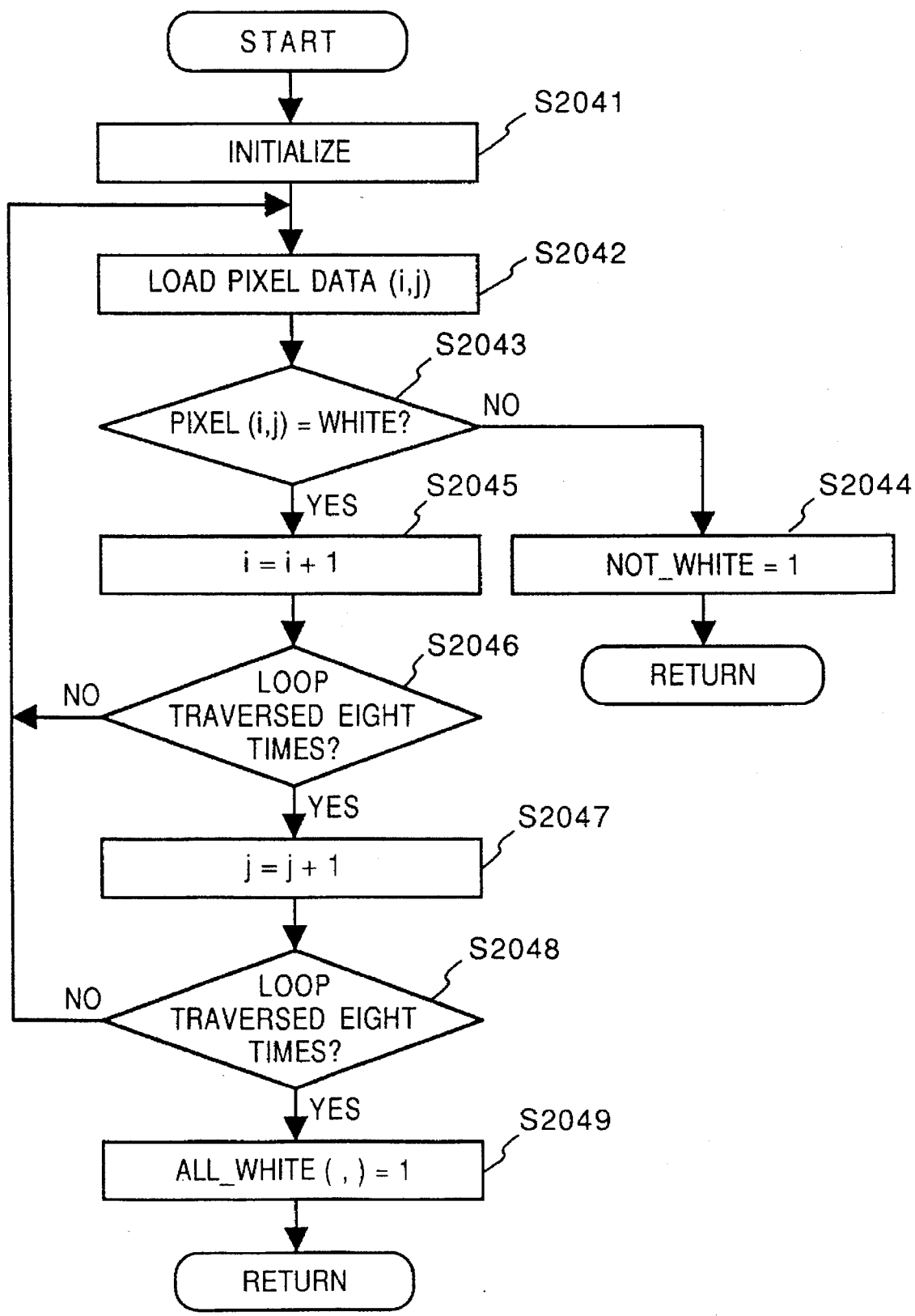
FIG. 42 is a detailed flowchart showing all-white judgment processing at step S2025 shown in FIG. 39.

FIG. 42 is a detailed flowchart showing all-white judgment processing at step S2025 in FIG. 39.

Parameters (i, j ... ) are initialized at step S2041 in FIG. 42, one pixel of image data (i,j) is loaded at step S2042 and a check is performed at step S2043 to determine whether this pixel is white or not. If the result of checking is that the pixel is not white, then "1" is set as a NOT-WHITE flag, which is a control parameter, and return processing is executed.

If the decision at step S2043 is "YES", a pixel pointer (i) serving as a control parameter is incremented by +1 at step S2045 and processing proceeds to step S2046. A check is made at step S2046 to determine whether the processing of steps S2042, S2043, S2045 has been carried out a total of eight times. If the processing of these steps has not been executed eight times, then processing returns to step S2042.

If the result of the decision at step S2046 regarding execution of the loop eight times is "YES", a pixel pointer (j) serving as a control parameter is incremented by +1 at step S2047, after which the program proceeds to the processing of step S2048. It is determined at step S2048 whether the processing of steps S2042, S2043, S2045, S2046 and S2047 has been executed with regard to 8×8 pixels. If the result is "NO", the processing proceeds from step S2048 to step S2042.

If the result of the determination at step S2048 is "YES", "1" is set as an ALL-WHITE flag, which is a control parameter, at step S2049, and return processing is executed.

In a case where the program returns through the step S2049 in the processing shown in FIG. 42, the decision at step S2025 in FIG. 39 branches to the "YES" side. Further, in a case where the program returns through step S2044 in the processing shown in FIG. 42, the decision at step S2025 in FIG. 39 branches to the "NO" side.

Figure 43:
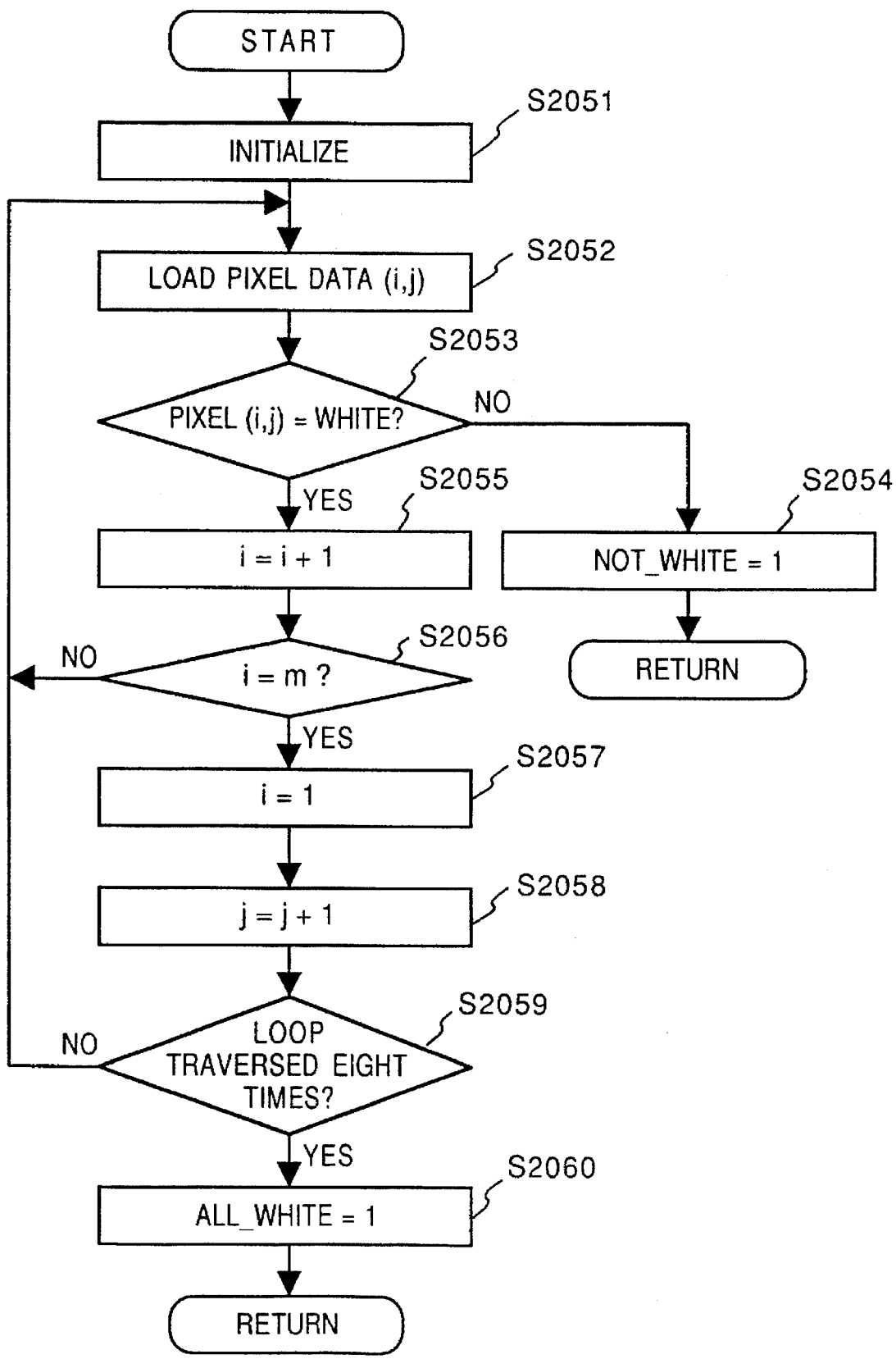
FIG. 43 is a detailed flowchart showing all-white judgment processing at step S2022 shown in FIG. 39.

FIG. 43 is a detailed flowchart showing all-white judgment processing at step S2022 in FIG. 39. In the processing illustrated in FIG. 42 and the processing illustrated in FIG. 43, the reading of one page and the accumulation in memory of uncompressed data at steps S2012 and S2013 in FIG. 38 is finished before this processing is executed. Accordingly, the processing of steps S2022, S2025 in FIG. 39 is batch processing for the all-white checking of uncompressed data in the RAM 2004.

Further, whereas the processing shown in FIG. 42 relates to an 8×8 pixel block corresponding to pixels from (1,1) to (8,8), the processing illustrated in FIG. 43 is for batch processing a pixel block of eight lines, in the main-scan direction, corresponding to pixels from (1,1) to (8,m).

Parameters (i, j . . . ) are initialized at step S2051 in FIG. 43, one pixel of image data (i,j) is loaded at step S2052 and a check is performed at step S2053 to determine whether this pixel is white or not. If the result of checking is that the pixel is not white, then "1" is set as the NOT-WHITE flag, which is the control parameter, and return processing is executed.

However, if the decision rendered at step S2053 is "YES", however, the pixel pointer (i) serving as the control parameter is incremented by +1 at step S2055. A check is made at step S2056 to determine whether the processing of steps S2052, S2053, S2055 has been carried out a total of m times. If the processing of this steps has not been executed m times, then processing returns to step S2052.

If the result of the decision at step S2056 regarding execution of the loop m times is "YES", the above-mentioned pixel pointer (i) is made 1 at step S2057. The pixel pointer (j) serving as a control parameter is incremented by +1 at step S2058, after which the program proceeds to the processing of step S2059. It is determined at step S2059 whether the processing of steps S2052, S2053, S2055~S2058 has been executed with regard to 8×8 pixels. If the result is "NO", the processing proceeds returns to step S2052.

If the result of the determination at step S2058 is "YES", "1" is set as an ALL-WHITE flag, which is a control parameter, at step S2060, and return processing is executed.

The difference between the processing shown in FIG. 42 and the processing shown in FIG. 43 is that whereas eight pixels are checked in the horizontal direction (main-scan direction) at step S2046 in FIG. 42, this is performed from end to end of the main scan at step S2056 in FIG. 43. Further, when a transition is made from one main-scan line to the next in FIG. 43, it is necessary to re-initialize the value of the control parameter (the pixel pointer) i at step S2057. This differs from the processing shown in FIG. 42.

Thus, in accordance with this embodiment as described above, attention is directed to the fact that the probability of the appearance of an all-white portion in the original image is high. By raising the processing speed for encoding of an all-white image portion using the results obtained by applying a DCT operation to an all white portion of a prescribed pixel block, it is possible to achieve a high processing speed for JPEG coding.

The foregoing embodiment can be applied to a system constituted by a plurality of devices, or to an apparatus comprising a single device. Furthermore, it goes without saying that the invention is applicable also to a case where the object of the invention is attained by supplying a program to a system or apparatus.

In accordance with the present invention as described above, when a prescribed pixel block is all white, encoding processing is executed using predetermined value without performing a DCT operation. This makes it possible to raise the speed of encoding processing.

Furthermore, a predetermined requisite value may be used even in cases other than that in which the interior of a block is all white.

The DSP used in the above-described embodiment is a special-purpose single-chip microprocessor for digital signal processing, as is well known. The DSP employs a circuit arrangement for repeatedly executing multiplication and addition operations at high speed. The DSP is capable of freely setting the contents of an operation based upon an externally supplied program and comprises a memory for storing the externally supplied program and an arithmetic circuit such as a multiplier and an adder.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting image data representing an image;

encoding means for dividing the image data into a plurality of blocks and encoding the image data by using a calculation;

discriminating means for discriminating whether pixels in a block have predetermined values;

storage means for storing data which is to be obtained by performing said encoding using the calculation by said encoding means, on said pixels in a block having the predetermined values; and output means for outputting the data stored in said storage means as encoded data corresponding to said pixels in a block, when said pixels in a block have the predetermined values, said output being performed without using the calculation by said encoding means.

2. The apparatus according to claim 1, wherein said encoding means is a DSP.

3. The apparatus according to claim 1, wherein said encoding means encodes the image data by using a discrete cosine transform, quantization and Huffman coding.

4. The apparatus according to claim 1, wherein the predetermined values represent white pixels.

5. The apparatus according to claim 1, wherein the block has n×n pixels.

6. The apparatus according to claim 1, further comprising supplying means for supplying a program for encoding the image data.

7. The apparatus according to claim 1, wherein said discriminating means further discriminates whether the plurality of blocks in which pixels have the predetermined values are successively arranged.

8. An image processing method comprising:

an input step of inputting image data representing an image;

an encoding step of dividing the image data into a plurality of blocks and encoding the image data by using a calculation;

a discriminating step of discriminating whether pixels in a block have predetermined values;

a storing step of storing data which is to be obtained by performing said encoding using the calculation in said encoding step, on said pixels in a block having the predetermined values; and an outputting step of outputting the data stored in said storing step as encoded data corresponding to said pixels in a block, when said pixels in a block have the predetermined values, said output being performed without using the calculation in said encoding step.

* * * * *

UNITED STATES PATENT AND TRADEMARK OFFICE
CERTIFICATE OF CORRECTION

PATENT NO. : 5,650,861

DATED : July 22, 1997

INVENTORS : TOSHIFUMI NAKAJIMA

It is certified that error appears in the above-identified patent and that said Letters Patent is hereby corrected as shown below:

COLUMN 3

Line 6, "Which" should read --which--.

COLUMN 4

Line 58, "An" should read --an--.

COLUMN 5

Line 9,  "performing" should read --performing a--;
  Line 23, "calculation" should read --calculations--.

COLUMN 12

Line 41, "above." should read --above. ¶ --.

COLUMN 20

Line 59, "composition" should read --composition of--.

UNITED STATES PATENT AND TRADEMARK OFFICE
CERTIFICATE OF CORRECTION

PATENT NO. : 5,650,861

DATED : July 22, 1997

INVENTORS : TOSHIFUMI NAKAJIMA

It is certified that error appears in the above-identified patent and that said Letters Patent is hereby corrected as shown below:

<u>COLUMN 22</u>

Line 26, "in" should read --in is--.

<u>COLUMN 23</u>

Line 21, "that" should read --that is the--.

<u>COLUMN 25</u>

Line 10, "OFF"H" should read --"OFFH"--.

Signed and Sealed this

Third Day of March, 1998

Attest:

BRUCE LEHMAN

Attesting Officer

Commissioner of Patents and Trademarks